United States Patent
Bono et al.

(10) Patent No.: US 11,922,071 B2
(45) Date of Patent: *Mar. 5, 2024

(54) METHODS AND SYSTEMS FOR STORING DATA IN A DISTRIBUTED SYSTEM USING OFFLOAD COMPONENTS AND A GPU MODULE

(71) Applicant: EMC IP Holding Company LLC, Hopkinton, MA (US)

(72) Inventors: Jean-Pierre Bono, Westboro, MA (US); Marc A. De Souter, Wayne, NJ (US); JoonJack Yap, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/512,615

(22) Filed: Oct. 27, 2021

(65) Prior Publication Data
US 2023/0128798 A1   Apr. 27, 2023

(51) Int. Cl.
*G06F 12/12* (2016.01)
*G06F 3/06* (2006.01)
(Continued)

(52) U.S. Cl.
CPC .......... *G06F 3/0664* (2013.01); *G06F 3/0604* (2013.01); *G06F 3/0644* (2013.01);
(Continued)

(58) Field of Classification Search
CPC ...... G06F 3/067; G06F 3/0644; G06F 3/0659; G06F 3/0664; G06F 9/45558;
(Continued)

(56) References Cited

U.S. PATENT DOCUMENTS

| | | |
|---|---|---|
| 1,651,470 A | 12/1927 | Sadtler |
| 5,394,537 A | 2/1995 | Courts et al. |

(Continued)

FOREIGN PATENT DOCUMENTS

| | | |
|---|---|---|
| WO | 2016196766 A2 | 12/2016 |
| WO | 2017079247 A1 | 5/2017 |

OTHER PUBLICATIONS

Adam Thompson et al., GPUDirect Storage: A Direct Path Between Storage and GPU Memory, Technical Blog, Aug. 6, 2019, 8 pages, NVIDIA Corporation, ttps://developer.nvidia.com/blog/gpudirect-storage/, accessed on May 20, 2022.

(Continued)

*Primary Examiner* — Yong J Choe
(74) *Attorney, Agent, or Firm* — Chamberlain, Hrdlicka, White, Williams & Aughtry; Aly Z. Dossa

(57) ABSTRACT

A method for storing data, the method comprising receiving, by an offload component in a client application node, an augmented write request originating from an application executing in an application container on the client application node, wherein the augmented write request is associated with data and wherein the offload component is located in a hardware layer of the client application node, and processing, by the offload component, the augmented write request by a file system (FS) client and a memory hypervisor module executing in a modified client FS container on the offload component, wherein processing the request results in at least a portion of the data being written to a location in a storage pool.

18 Claims, 25 Drawing Sheets

(51) Int. Cl.
*G06F 12/02* (2006.01)
*G06F 12/14* (2006.01)

(52) U.S. Cl.
CPC ............ *G06F 3/0659* (2013.01); *G06F 3/067* (2013.01); *G06F 12/0238* (2013.01); *G06F 2212/7201* (2013.01)

(58) Field of Classification Search
CPC . G06F 2009/45579; G06F 2009/45583; G06F 3/0613; G06F 16/27; G06F 2009/45591; G06F 2009/45595; G06F 3/0604; G06F 3/0605; G06F 3/0607; G06F 3/0611; G06F 3/064; G06F 3/0661; G06F 9/461; G06F 9/485; G06F 9/4856; G06F 9/5077; G06F 9/54; G06F 11/1451; G06F 16/196; G06F 2009/45575; G06F 2201/815; G06F 2201/84; G06F 3/061; G06F 3/0623; G06F 3/0629; G06F 3/0643; G06F 3/0649; G06F 3/0653; G06F 3/0665; G06F 3/0683; G06F 3/0685; G06F 9/4418

See application file for complete search history.

(56) References Cited

U.S. PATENT DOCUMENTS

| | | | |
|---|---|---|---|
| 5,946,686 A | 8/1999 | Schmuck et al. |
| 6,038,570 A | 3/2000 | Hitz et al. |
| 6,067,541 A | 5/2000 | Raju et al. |
| 6,119,208 A | 9/2000 | White et al. |
| 6,138,126 A | 10/2000 | Hitz et al. |
| 6,412,017 B1 | 6/2002 | Straube et al. |
| 6,681,303 B1 | 1/2004 | Watanabe et al. |
| 6,725,392 B1 | 4/2004 | Frey et al. |
| 6,751,702 B1 | 6/2004 | Hsieh et al. |
| 6,985,995 B2 | 1/2006 | Holland et al. |
| 7,191,198 B2 | 3/2007 | Asano et al. |
| 7,516,285 B1 | 4/2009 | Haynes et al. |
| 7,653,682 B2 | 1/2010 | Erasani et al. |
| 7,685,126 B2 | 3/2010 | Patel et al. |
| 8,112,395 B2 | 2/2012 | Patel et al. |
| 8,117,388 B2 | 2/2012 | Jernigan, IV |
| 8,195,760 B2 | 6/2012 | Lacapra et al. |
| 8,312,242 B2 | 11/2012 | Casper et al. |
| 8,364,999 B1 | 1/2013 | Adessa |
| 8,370,910 B2 | 2/2013 | Kamei et al. |
| 8,407,265 B1 | 3/2013 | Scheer et al. |
| 8,429,360 B1 | 4/2013 | Iyer et al. |
| 8,510,265 B1 | 8/2013 | Boone et al. |
| 8,566,673 B2 | 10/2013 | Kidney et al. |
| 8,818,951 B1 | 8/2014 | Muntz et al. |
| 8,924,684 B1 | 12/2014 | Vincent |
| 9,069,553 B2 | 6/2015 | Zaarur et al. |
| 9,104,321 B2 | 8/2015 | Cudak et al. |
| 9,172,640 B2 | 10/2015 | Vincent et al. |
| 9,250,953 B2 | 2/2016 | Kipp |
| 9,300,578 B2 | 3/2016 | Chudgar et al. |
| 9,330,103 B1 | 5/2016 | Bono et al. |
| 9,443,095 B2 | 9/2016 | Lähteenmäki |
| 9,483,369 B2 | 11/2016 | Sporel |
| 9,485,310 B1 | 11/2016 | Bono et al. |
| 9,760,393 B2 | 9/2017 | Hiltgen et al. |
| 9,779,015 B1 | 10/2017 | Oikarinen et al. |
| 9,886,735 B2 | 2/2018 | Soum et al. |
| 9,990,253 B1 | 6/2018 | Rajimwale et al. |
| 10,031,693 B1 | 7/2018 | Bansode et al. |
| 10,156,993 B1 | 12/2018 | Armangau et al. |
| 10,209,899 B2 | 2/2019 | Oshins et al. |
| 10,248,610 B2 | 4/2019 | Menachem et al. |
| 10,346,297 B1 | 7/2019 | Wallace |
| 10,348,813 B2 | 7/2019 | Abali et al. |
| 10,649,867 B2 | 5/2020 | Roberts et al. |
| 10,693,962 B1 | 6/2020 | Neumann |
| 10,740,005 B1 | 8/2020 | Ives et al. |
| 11,397,545 B1 | 7/2022 | Hamid et al. |
| 11,438,231 B2 | 9/2022 | Gardner et al. |
| 11,481,261 B1 | 10/2022 | Frandzel et al. |
| 11,677,633 B2 | 6/2023 | Bono et al. |
| 2003/0074486 A1 | 4/2003 | Anastasiadis et al. |
| 2004/0062245 A1 | 4/2004 | Sharp et al. |
| 2004/0172073 A1 | 9/2004 | Busch et al. |
| 2004/0210761 A1 | 10/2004 | Eldar et al. |
| 2005/0004925 A1 | 1/2005 | Stahl et al. |
| 2005/0114557 A1 | 5/2005 | Arai et al. |
| 2005/0172097 A1 | 8/2005 | Voigt et al. |
| 2006/0020745 A1 | 1/2006 | Conley et al. |
| 2006/0101081 A1 | 5/2006 | Lin et al. |
| 2006/0117135 A1 | 6/2006 | Thind et al. |
| 2006/0200858 A1 | 9/2006 | Zimmer et al. |
| 2006/0265605 A1 | 11/2006 | Ramezani |
| 2007/0011137 A1 | 1/2007 | Kodama |
| 2007/0022138 A1 | 1/2007 | Erasani et al. |
| 2007/0106861 A1 | 5/2007 | Miyazaki et al. |
| 2007/0136391 A1 | 6/2007 | Anzai et al. |
| 2007/0143542 A1 | 6/2007 | Watanabe et al. |
| 2007/0245006 A1 | 10/2007 | Lehikoinen et al. |
| 2008/0154985 A1 | 6/2008 | Childs et al. |
| 2008/0184000 A1 | 7/2008 | Kawaguchi |
| 2008/0270461 A1 | 10/2008 | Gordon et al. |
| 2009/0077097 A1 | 3/2009 | Lacapra et al. |
| 2009/0144416 A1 | 6/2009 | Chatley et al. |
| 2009/0150639 A1 | 6/2009 | Ohata |
| 2009/0248957 A1 | 10/2009 | Tzeng |
| 2009/0300302 A1 | 12/2009 | Vaghani |
| 2009/0307538 A1 | 12/2009 | Hernandez et al. |
| 2009/0313415 A1 | 12/2009 | Sabaa et al. |
| 2010/0049754 A1 | 2/2010 | Takaoka et al. |
| 2010/0076933 A1 | 3/2010 | Hamilton et al. |
| 2010/0100664 A1 | 4/2010 | Shimozono |
| 2010/0115009 A1 | 5/2010 | Callahan et al. |
| 2010/0274772 A1 | 10/2010 | Samuels |
| 2010/0306500 A1 | 12/2010 | Mimatsu |
| 2011/0161281 A1 | 6/2011 | Sayyaparaju et al. |
| 2011/0218966 A1 | 9/2011 | Barnes et al. |
| 2011/0289519 A1* | 11/2011 | Frost ..................... G06F 8/456 718/1 |
| 2011/0314246 A1 | 12/2011 | Miller et al. |
| 2012/0096059 A1 | 4/2012 | Shimizu et al. |
| 2012/0250682 A1 | 10/2012 | Vincent et al. |
| 2012/0250686 A1 | 10/2012 | Vincent et al. |
| 2013/0139000 A1 | 5/2013 | Nakamura et al. |
| 2013/0179481 A1 | 7/2013 | Halevy |
| 2013/0227236 A1 | 8/2013 | Flynn et al. |
| 2013/0346444 A1 | 12/2013 | Makkar et al. |
| 2014/0089619 A1 | 3/2014 | Khanna et al. |
| 2014/0171190 A1 | 6/2014 | Diard |
| 2014/0188953 A1 | 7/2014 | Lin et al. |
| 2014/0195564 A1 | 7/2014 | Talagala et al. |
| 2014/0237184 A1 | 8/2014 | Kazar et al. |
| 2014/0279859 A1 | 9/2014 | Benjamin-deckert et al. |
| 2015/0088882 A1 | 3/2015 | Hartman et al. |
| 2015/0212909 A1 | 7/2015 | Sporel |
| 2015/0356078 A1 | 12/2015 | Kishimoto et al. |
| 2016/0117254 A1 | 4/2016 | Susarla et al. |
| 2016/0188628 A1 | 6/2016 | Hartman et al. |
| 2016/0259687 A1 | 9/2016 | Yoshihara et al. |
| 2016/0275098 A1 | 9/2016 | Joseph |
| 2016/0292179 A1 | 10/2016 | Von Muhlen et al. |
| 2017/0131920 A1 | 5/2017 | Oshins et al. |
| 2017/0132163 A1 | 5/2017 | Aslot et al. |
| 2017/0169233 A1 | 6/2017 | Hsu et al. |
| 2017/0286153 A1 | 10/2017 | Bak et al. |
| 2018/0032249 A1 | 2/2018 | Makhervaks et al. |
| 2018/0095915 A1 | 4/2018 | Prabhakar et al. |
| 2018/0109471 A1 | 4/2018 | Chang et al. |
| 2018/0212825 A1 | 7/2018 | Umbehocker et al. |
| 2018/0307472 A1 | 10/2018 | Paul et al. |
| 2019/0044946 A1 | 2/2019 | Hwang et al. |
| 2019/0238590 A1 | 8/2019 | Talukdar et al. |
| 2019/0339896 A1 | 11/2019 | Mccloskey et al. |
| 2019/0347204 A1 | 11/2019 | Du et al. |
| 2019/0370042 A1 | 12/2019 | Gupta et al. |

(56) References Cited

U.S. PATENT DOCUMENTS

| | | |
|---|---|---|
| 2019/0377892 A1 | 12/2019 | Ben Dayan et al. |
| 2020/0004452 A1 | 1/2020 | Kobayashi et al. |
| 2020/0110554 A1 | 4/2020 | Yang |
| 2020/0241805 A1 | 7/2020 | Armangau et al. |
| 2021/0026774 A1 | 1/2021 | Lim |
| 2021/0042141 A1 | 2/2021 | De Marco et al. |
| 2021/0117246 A1 | 4/2021 | Lal et al. |
| 2021/0160318 A1 | 5/2021 | Sajeepa et al. |
| 2021/0173588 A1 | 6/2021 | Kannan et al. |
| 2021/0182190 A1 | 6/2021 | Gao et al. |
| 2021/0191638 A1 | 6/2021 | Miladinovic et al. |
| 2021/0232331 A1 | 7/2021 | Kannan et al. |
| 2021/0240611 A1 | 8/2021 | Tumanova et al. |
| 2021/0243255 A1 | 8/2021 | Perneti et al. |
| 2021/0249649 A1 | 8/2021 | Baba et al. |
| 2021/0286517 A1 | 9/2021 | Karr et al. |
| 2021/0286546 A1 | 9/2021 | Hodgson et al. |
| 2021/0303164 A1 | 9/2021 | Grunwald et al. |
| 2021/0303519 A1 | 9/2021 | Periyagaram et al. |
| 2021/0303522 A1 | 9/2021 | Periyagaram et al. |
| 2021/0303523 A1 | 9/2021 | Periyagaram et al. |
| 2021/0311641 A1 | 10/2021 | Prakashaiah et al. |
| 2021/0314404 A1 | 10/2021 | Glek |
| 2021/0318827 A1 | 10/2021 | Bernat et al. |
| 2021/0326048 A1 | 10/2021 | Karr |
| 2021/0326223 A1 | 10/2021 | Grunwald et al. |
| 2021/0334206 A1 | 10/2021 | Colgrove et al. |
| 2021/0349636 A1 | 11/2021 | Gold et al. |
| 2021/0349649 A1 | 11/2021 | Lee et al. |
| 2021/0349653 A1 | 11/2021 | Dewitt et al. |
| 2021/0373973 A1 | 12/2021 | Ekins et al. |
| 2021/0382800 A1 | 12/2021 | Lee et al. |
| 2022/0011945 A1 | 1/2022 | Coleman et al. |
| 2022/0011955 A1 | 1/2022 | Juch et al. |
| 2022/0019350 A1 | 1/2022 | Karr |
| 2022/0019366 A1 | 1/2022 | Freilich et al. |
| 2022/0019367 A1 | 1/2022 | Freilich et al. |
| 2022/0019505 A1 | 1/2022 | Lee et al. |
| 2022/0027051 A1 | 1/2022 | Kant et al. |
| 2022/0027064 A1 | 1/2022 | Botes et al. |
| 2022/0027472 A1 | 1/2022 | Golden et al. |
| 2022/0035714 A1 | 2/2022 | Schultz et al. |
| 2022/0050858 A1 | 2/2022 | Karr et al. |
| 2022/0075546 A1 | 3/2022 | Potyraj et al. |
| 2022/0075760 A1 | 3/2022 | Wu et al. |
| 2022/0137855 A1 | 5/2022 | Irwin et al. |
| 2022/0138223 A1 | 5/2022 | Sonner et al. |
| 2022/0147253 A1 | 5/2022 | Sajeepa et al. |
| 2022/0147365 A1 | 5/2022 | Bernat et al. |
| 2022/0156152 A1 | 5/2022 | Gao et al. |
| 2022/0164120 A1 | 5/2022 | Kannan et al. |
| 2022/0171648 A1 | 6/2022 | Rodriguez et al. |
| 2022/0180950 A1 | 6/2022 | Kannan et al. |
| 2022/0197505 A1 | 6/2022 | Kannan et al. |
| 2022/0197689 A1 | 6/2022 | Hotinger et al. |
| 2022/0206691 A1 | 6/2022 | Lee et al. |
| 2022/0206696 A1 | 6/2022 | Gao et al. |
| 2022/0206702 A1 | 6/2022 | Gao et al. |
| 2022/0206910 A1 | 6/2022 | Vaideeswaran et al. |
| 2022/0215111 A1 | 7/2022 | Ekins |
| 2022/0229851 A1 | 7/2022 | Danilov et al. |
| 2022/0232075 A1 | 7/2022 | Emerson et al. |
| 2022/0236904 A1 | 7/2022 | Miller et al. |
| 2022/0253216 A1 | 8/2022 | Grunwald et al. |
| 2022/0253389 A1 | 8/2022 | Fay et al. |
| 2022/0261164 A1 | 8/2022 | Zhuravlev et al. |
| 2022/0261170 A1 | 8/2022 | Vohra et al. |
| 2022/0261178 A1 | 8/2022 | He et al. |
| 2022/0261286 A1 | 8/2022 | Wang et al. |
| 2022/0263897 A1 | 8/2022 | Karr et al. |
| 2022/0269418 A1 | 8/2022 | Black et al. |
| 2022/0291837 A1 | 9/2022 | Shao et al. |
| 2022/0291858 A1 | 9/2022 | Dewitt et al. |
| 2022/0291986 A1 | 9/2022 | Klein et al. |
| 2022/0300193 A1 | 9/2022 | Gao et al. |
| 2022/0300198 A1 | 9/2022 | Gao et al. |
| 2022/0300413 A1 | 9/2022 | Kannan et al. |
| 2022/0318264 A1 | 10/2022 | Jain et al. |
| 2022/0334725 A1 | 10/2022 | Mertes et al. |
| 2022/0334929 A1 | 10/2022 | Potyraj et al. |
| 2022/0334990 A1 | 10/2022 | Karr et al. |
| 2022/0335005 A1 | 10/2022 | Fernandez et al. |
| 2022/0335009 A1 | 10/2022 | Paul et al. |
| 2022/0350495 A1 | 11/2022 | Lee et al. |
| 2022/0350515 A1 | 11/2022 | Bono et al. |
| 2022/0350543 A1 | 11/2022 | Bono et al. |
| 2022/0350544 A1 | 11/2022 | Bono et al. |
| 2022/0350545 A1 | 11/2022 | Bono et al. |
| 2022/0414817 A1 | 12/2022 | Zad Tootaghaj et al. |

OTHER PUBLICATIONS

Metz Joachim, "Hierarchical File System (HFS)" Nov. 4, 2020, Retrieved from the Internet on Dec. 16, 2021 https://github.com/libyal/libfshfs/blob/c52bf4a36bca067510d0672ccce6d449a5a85744/documentation/Hierarchical%20System%20(HFS).asciidoc (93 pages).

International Search Report and Written Opinion issued in corresponding Application No. PCT/US2021/030138, dated Jan. 21, 2022 (16 pages).

International Search Report and Written Opinion issued in corresponding Application No. PCT/US2021/030141 dated Jan. 4, 2022 (11 pages).

International Searching Authority, International Search Report and Written Opinion for corresponding PCT Application No. PCTUS2021030141 filed Apr. 30 3021, dated Jan. 4, 2022 (11 pages).

Y. Yamato, Proposal of Automatic GPU Offloading Method from Various Language Applications, 2021, pp. 400-404, 10.1109/ICIET51873.2021.9419618 (5 pages).

* cited by examiner

METHODS AND SYSTEMS FOR STORING DATA IN A DISTRIBUTED SYSTEM USING OFFLOAD COMPONENTS AND A GPU MODULE

BACKGROUND

Applications generate and/or manipulate large amounts of data. Thus, the performance of these applications is typically impacted by the manner in which the applications may read and/or write data.

DETAILED DESCRIPTION

Figure 1A:
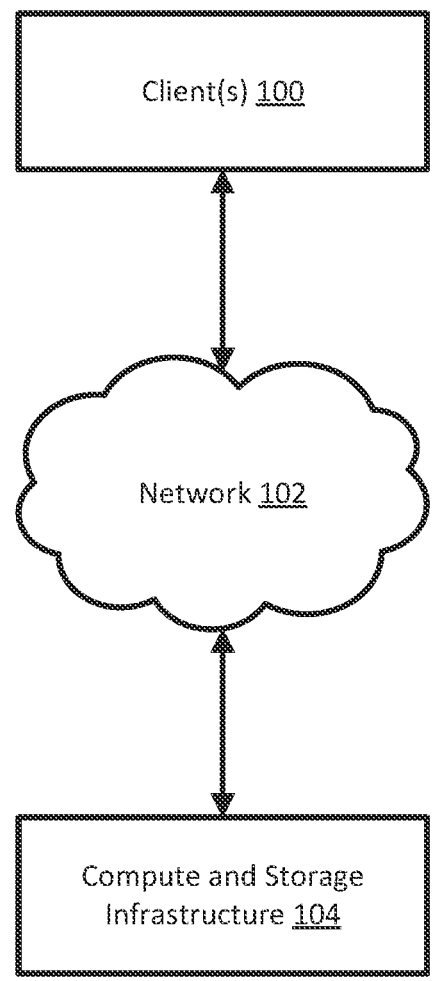
FIG. 1A shows a diagram of a system in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems, devices, and methods for implementing and leveraging memory devices (e.g., persistent memory (defined below) and NVMe devices (defined below) to improve performance of data requests (e.g., read and write requests). More specifically, various embodiments of the invention embodiments of the invention enable applications (e.g., applications in the application container in FIG. 2A) to issue data requests (e.g., requests to read and write data) to the operating system (OS). The OS receives such requests and processes them using an implementation of the portable operating system interface (POSIX). The client FS container may receive such requests via POSIX and subsequently process such requests. The processing of these requests includes interacting with metadata nodes (see e.g., FIG. 3) to obtain data layouts that provide a mapping between file offsets and scale out volume offsets (SOVs) (see e.g., FIGS. 5A-5B). Using the SOVs, the memory hypervisor module in the client FS container (see e.g., FIG. 2B) issues input/output (I/O) requests, via a fabric (also referred to as a communication fabric, described below), directly to the locations in the storage pool (110) (see e.g., FIG. 5B), bypassing the storage stack on the metadata nodes. Once the requested I/O is performed on the storage pool, a response is provided, via POSIX, to the application.

Using the aforementioned architecture, embodiments of the invention enable applications to interact with the memory devices at scale in a manner that is transparent to the applications. Said another way, the OS may continue to interact with the client FS container using POSIX and the client FS container, in turn, will provide a transparent mechanism to translate the requests received via POSIX into I/O requests that may be directly serviced by the storage pool.

Figure 14:
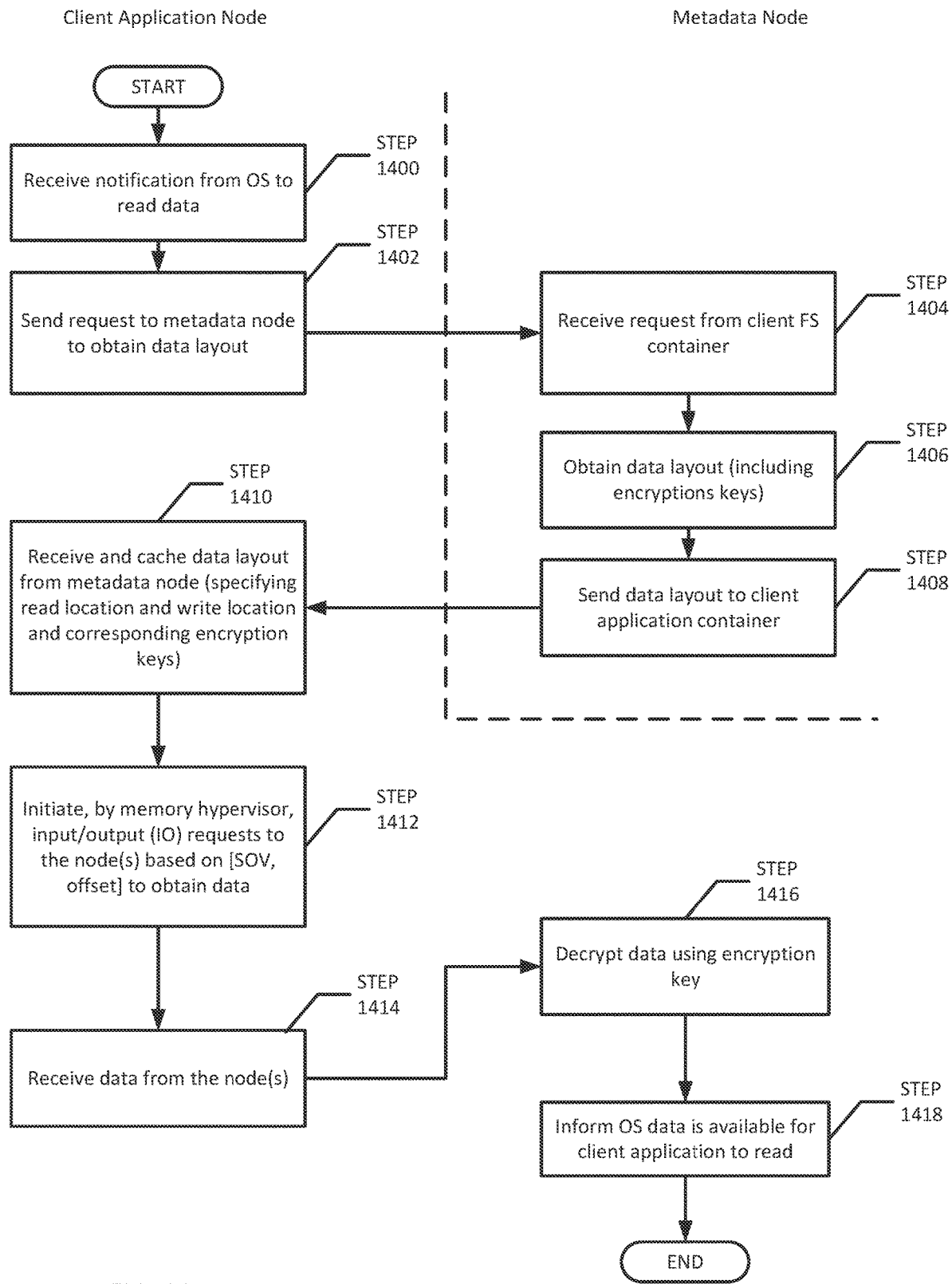
FIG. 14 shows a flowchart of a method of serving a read request using an encryption mechanism in accordance with one or more embodiments of the invention.
Figure 15A:
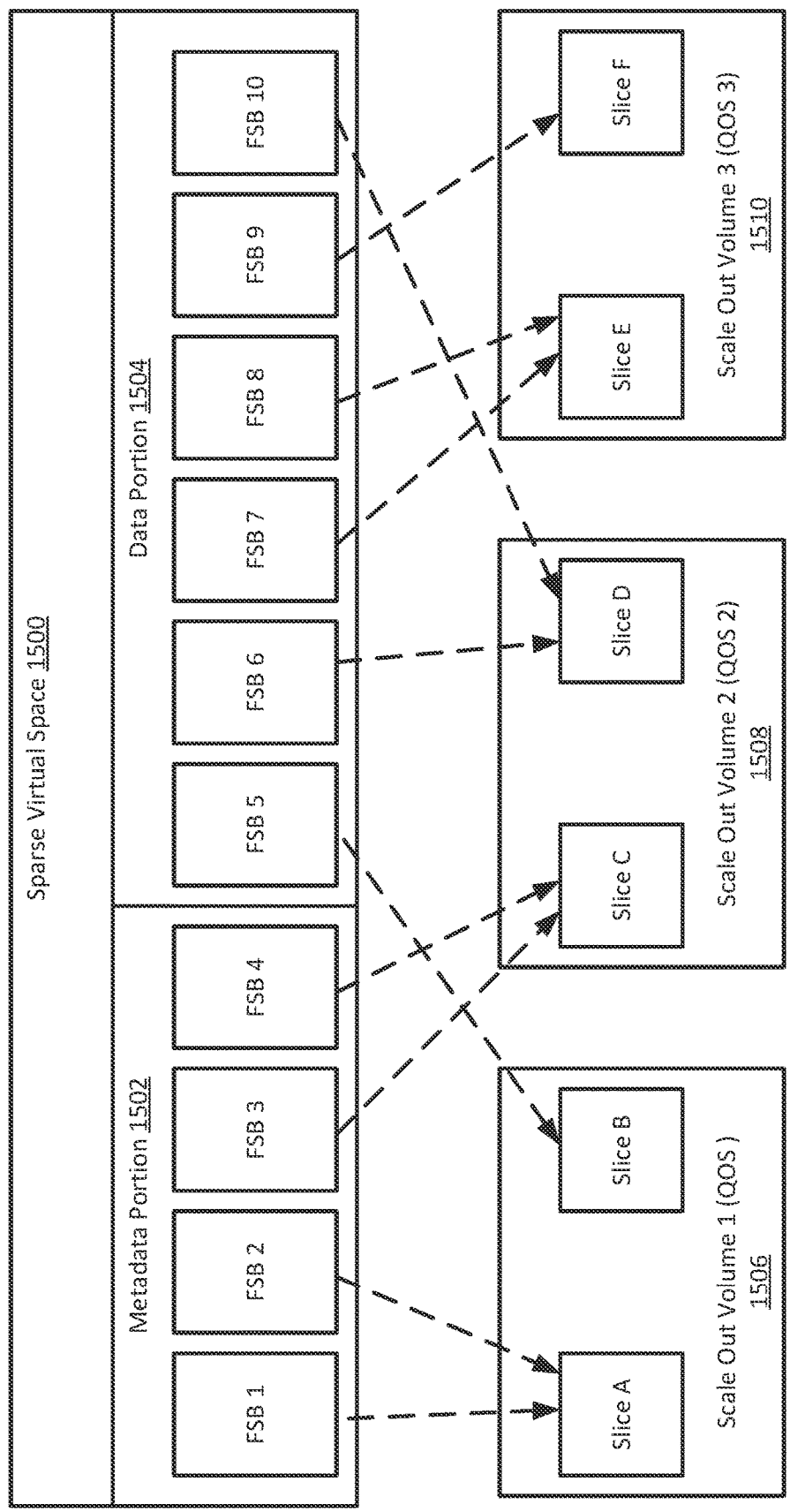
FIGS. 15A-15B shows relationships between various virtual and physical elements in the system implementing tiering in accordance with one or more embodiments of the invention.
Figure 15B:
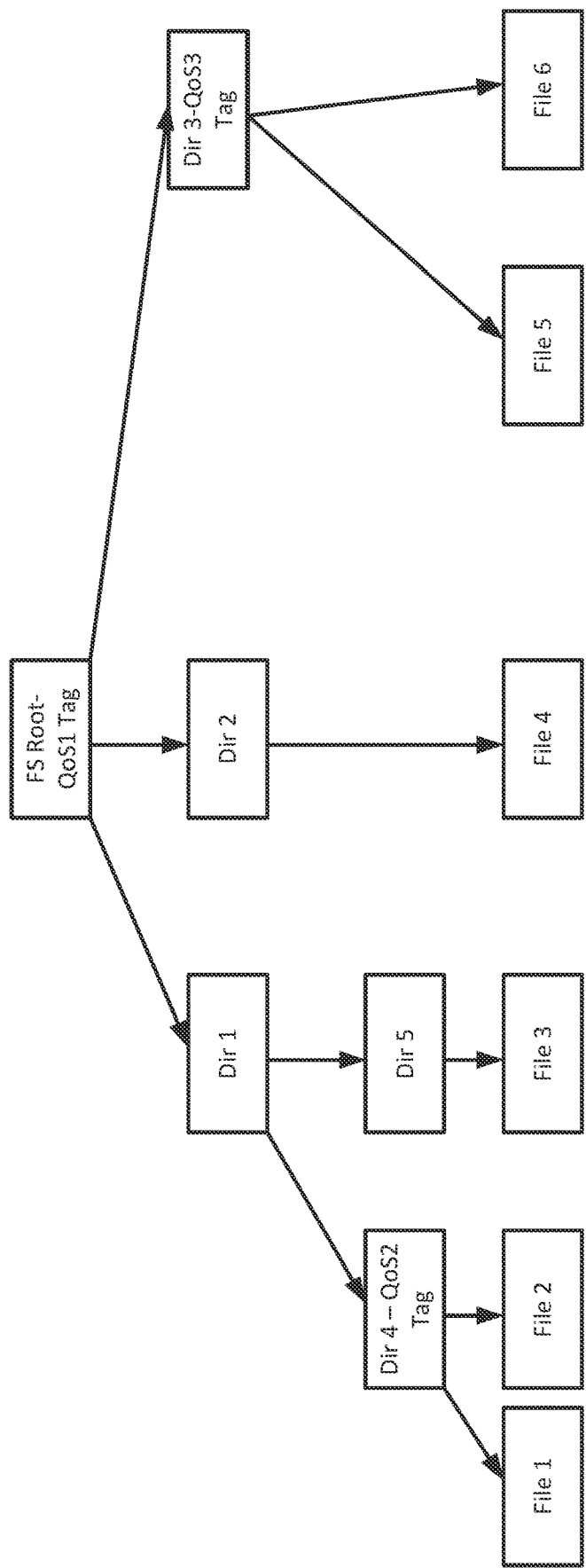
Figure 16:
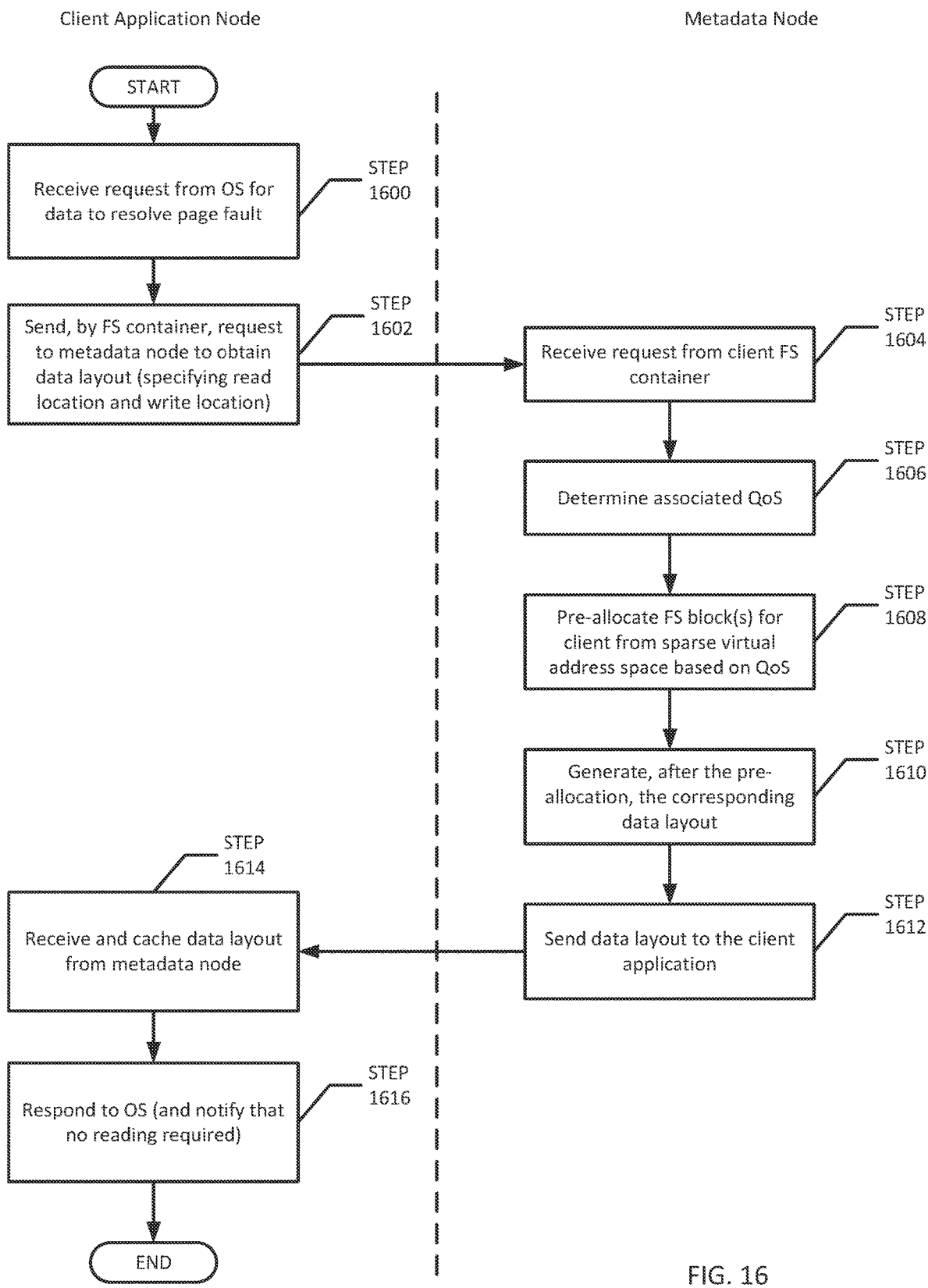
FIG. 16 shows a flowchart of a method of generating and servicing a mapping request in accordance with one or more embodiments of the invention.

Further, in various embodiments of the invention, the aforementioned architecture may implement one or more of the following additional features (each of which may be used in conjunction with any combination of the other features): in-line deduplication (see e.g., FIG. 8), end-to-end error detection and correction (see e.g., FIGS. 9-10), data protection and recovery of protected data (see e.g., FIGS. 11-12B), end-to-end data encryption (see e.g., FIGS. 13 and 14), and storage tiering (see e.g., FIGS. 15A-16).

FIG. 1A shows a diagram of a system in accordance with one or more embodiments of the invention. The system includes one or more clients (100), operatively connected to a network (102), which is operatively connected to one or more node(s) (not shown) in a compute and storage infrastructure (CSI) (104). The components illustrated in FIG. 1A may be connected via any number of operable connections supported by any combination of wired and/or wireless networks (e.g., network (102)). Each component of the system of FIG. 1A is discussed below.

In one embodiment of the invention, the one or more clients (100) are configured to issue requests to the node(s) in the CSI (104) (or to a specific node of the node(s)), to receive responses, and to generally interact with the various components of the nodes (described below).

In one or more embodiments of the invention, one or more clients (100) are implemented as computing devices. Each computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource.

In one or more embodiments of the invention, the one or more clients (100) are implemented as a logical device. The logical device may utilize the computing resources of any number of computing devices and thereby provide the functionality of the one or more clients (100) described throughout this application.

In one or more embodiments of the invention, the one or more clients (100) may request data and/or send data to the node(s) in the CSI (104). Further, in one or more embodiments, the one or more clients (100) may initiate an application to execute on one or more client application nodes in the CSI (104) such that the application may, itself, gather, transmit, and/or otherwise manipulate data on the client application nodes, remote to the client(s). In one or more embodiments, one or more clients (100) may share access to the same one or more client application nodes in the CSI (104) and may similarly share any data located on those client application nodes in the CSI (104).

In one or more embodiments of the invention, network (102) of the system is a collection of connected network devices that allow for the communication of data from one network device to other network devices, or the sharing of resources among network devices. Examples of a network (e.g., network (102)) include, but are not limited to, a local area network (LAN), a wide area network (WAN) (e.g., the Internet), a mobile network, or any other type of network that allows for the communication of data and sharing of resources among network devices and/or devices (e.g., clients (100), node(s) in the CSI (104)) operatively connected to the network (102). In one embodiment of the invention, the one or more clients (100) are operatively connected to the node(s) (104) via a network (e.g., network (102)).

The CSI (104) includes one or more client application nodes, one or more metadata nodes, and zero, one or more storage nodes. Additional detail about the architecture of the CSI is provided below in FIG. 1B. Further, various embodiments of the node(s) (104) are provided in FIGS. 2A—FIG. 4 below.

While FIG. 1A shows a specific configuration of a system, other configurations may be used without departing from the scope of the disclosure. For example, although the one or more clients (100) and node(s) (104) are shown to be operatively connected through network (102), one or more clients (100) and node(s) (104) may be directly connected, without an intervening network (e.g., network (102)). Further, the functioning of the one or more clients (100) and the node(s) in the CSI (104) is not dependent upon the functioning and/or existence of the other device(s) (e.g., node(s) (104) and one or more clients (100), respectively). Rather, the one or more clients (100) and the node(s) in the CSI (104) may function independently and perform operations locally that do not require communication with other devices. Accordingly, embodiments disclosed herein should not be limited to the configuration of devices and/or components shown in FIG. 1A.

Figure 1B:
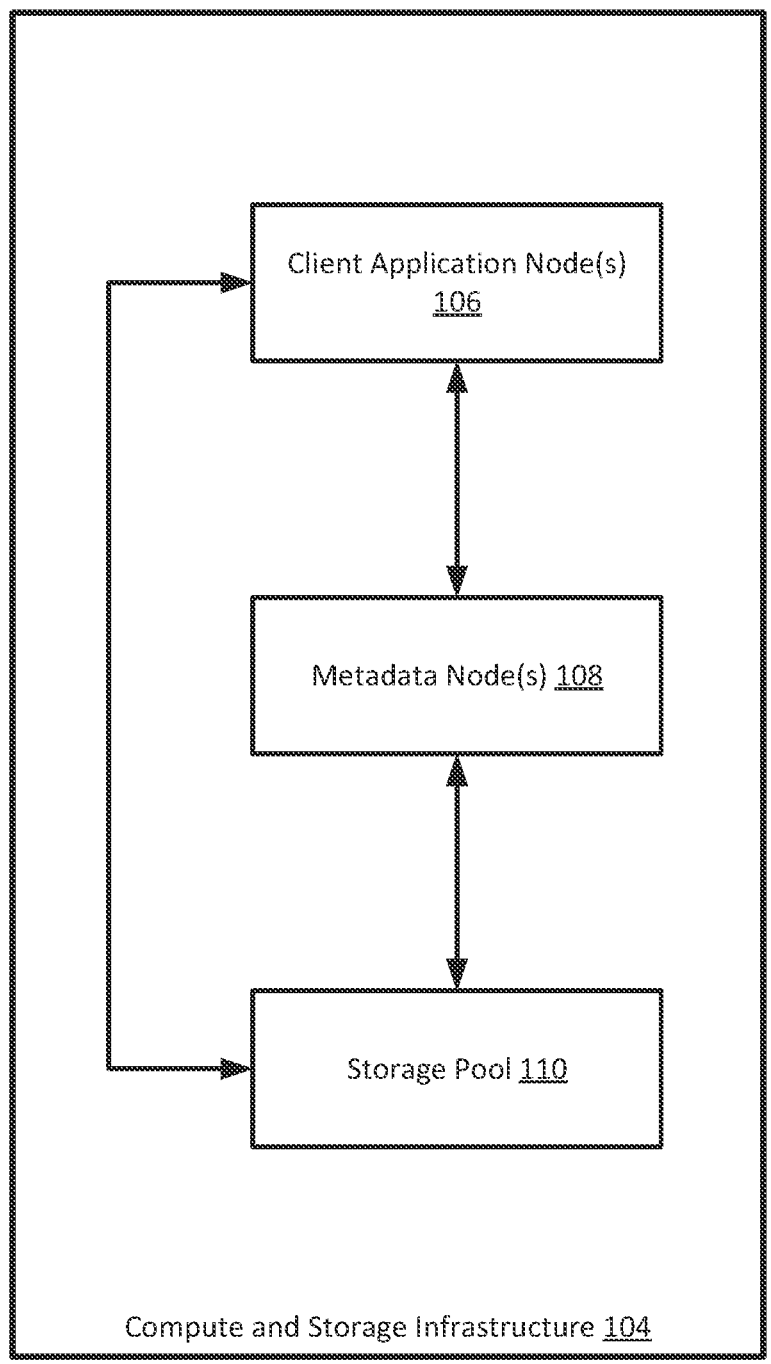
FIG. 1B shows a diagram of computer and storage infrastructure (CSI) in accordance with one or more embodiments of the invention.

FIG. 1B shows a diagram of computer and storage infrastructure (CSI) in accordance with one or more embodiments of the invention. As discussed above, the client application node(s) (106) executes applications and interacts with the metadata node(s) (108) to obtain, e.g., data layouts and other information (as described below) to enable the client application nodes to directly issue I/O requests to memory devices (or other storage media), which may be located on the client application nodes, the metadata nodes and/or the storage nodes, while bypassing the storage stack (e.g., the metadata server and the file system) on the metadata nodes. To that end, the client application nodes are able to directly communicate over a communication fabric(s) using various communication protocols, e.g., using Non-Volatile Memory Express (NVMe) over Fabric (NVMe-oF) and/or persistent memory over Fabric (PMEMoF), with the storage media in the storage pool (110) (see e.g., FIG. 5B).

Figure 2A:
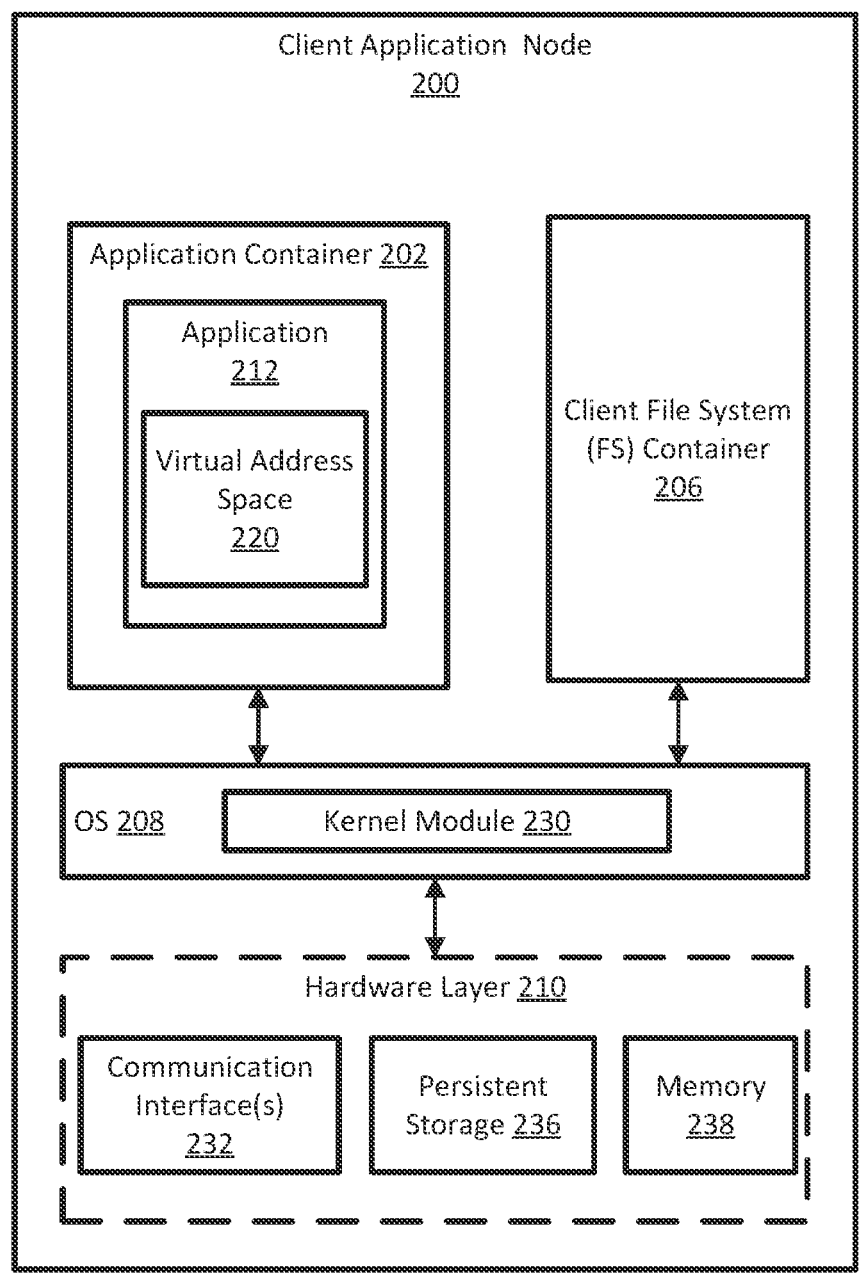
FIG. 2A shows a diagram of a client application node in accordance with one or more embodiments of the invention.
Figure 2B:
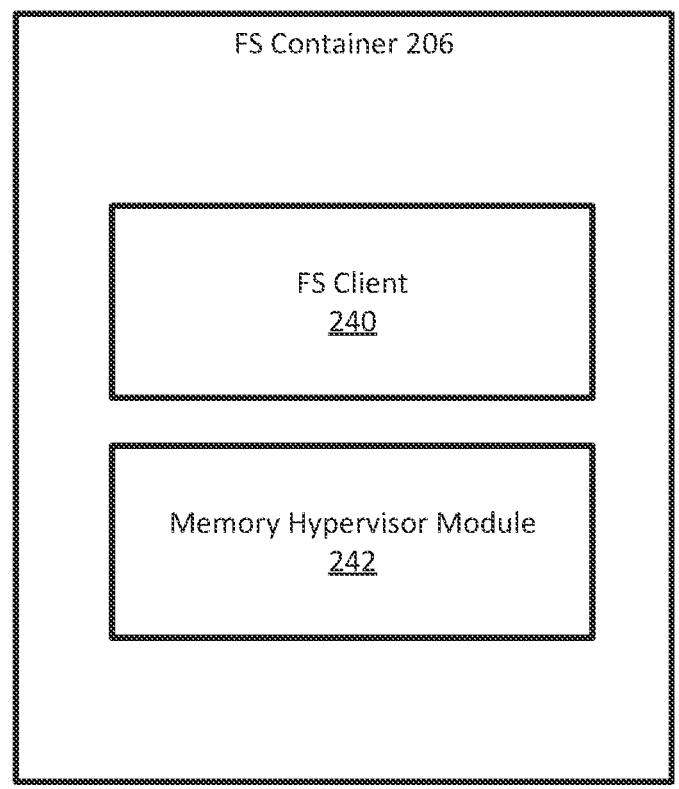
FIG. 2B shows a diagram of a client file system (FS) container in accordance with one or more embodiments of the invention.

FIGS. 2A-2B show diagrams of a client application node (200) in accordance with one or more embodiments of the invention. In one embodiment of the invention, client application node (200) includes one or more application container(s) (e.g., application container (202)), a client FS container (206), an operating system (OS) (208), and a hardware layer (210). Each of these components is described below. In one or more embodiments of the invention, the client application node (200) (or one or more components therein) is configured to perform all, or a portion, of the functionality described in FIGS. 6-16.

In one or more embodiments of the invention, an application container (202) is software executing on the client application node. The application container (202) may be an independent software instance that executes within a larger container management software instance (not shown) (e.g., Docker®, Kubernetes®). In embodiments in which the application container (202) is executing as an isolated software instance, the application container (202) may establish a semi-isolated virtual environment, inside the container, in which to execute one or more applications (e.g., application (212).

In one embodiment of the invention, an application container (202) may be executing in "user space" (e.g., a layer of the software that utilizes low-level system components for the execution of applications) of the OS (208) of the client application node (200).

In one or more embodiments of the invention, an application container (202) includes one or more applications (e.g., application (212)). An application (212) is software executing within the application container (e.g., 202), that may include instructions which, when executed by a processor(s) (not shown) (in the hardware layer (210)), initiate the performance of one or more operations of components of the hardware layer (210). Although applications (212) are shown executing within application containers (202) of FIG. 2A, one or more applications (e.g., 212) may execute outside of an application container (e.g., 212). That is, in one or more embodiments, one or more applications (e.g., 212) may execute in a non-isolated instance, at the same level as the application container (202) or client FS container (206).

In one or more embodiments of the invention, each application (212) includes a virtual address space (e.g., virtual address space (220)). In one embodiment of the invention, a virtual address space (220) is a simulated range of addresses (e.g., identifiable locations) that mimics the physical locations of one or more components of the hardware layer (210). In one embodiment, an application (212) is not configured to identify the physical addresses of one or more components of the hardware layer (210); rather, the application (212) relies on other components of the client application node (200) to translate one or more virtual addresses of the virtual address space (e.g., 220) to one or more physical addresses of one or more components of the hardware layer (210). Accordingly, in one or more embodiments of the invention, an application may utilize a virtual address space (220) to read, write, and/or otherwise manipulate data, without being configured to directly identify the physical address of that data within the components of the hardware layer (210).

Figure 6:
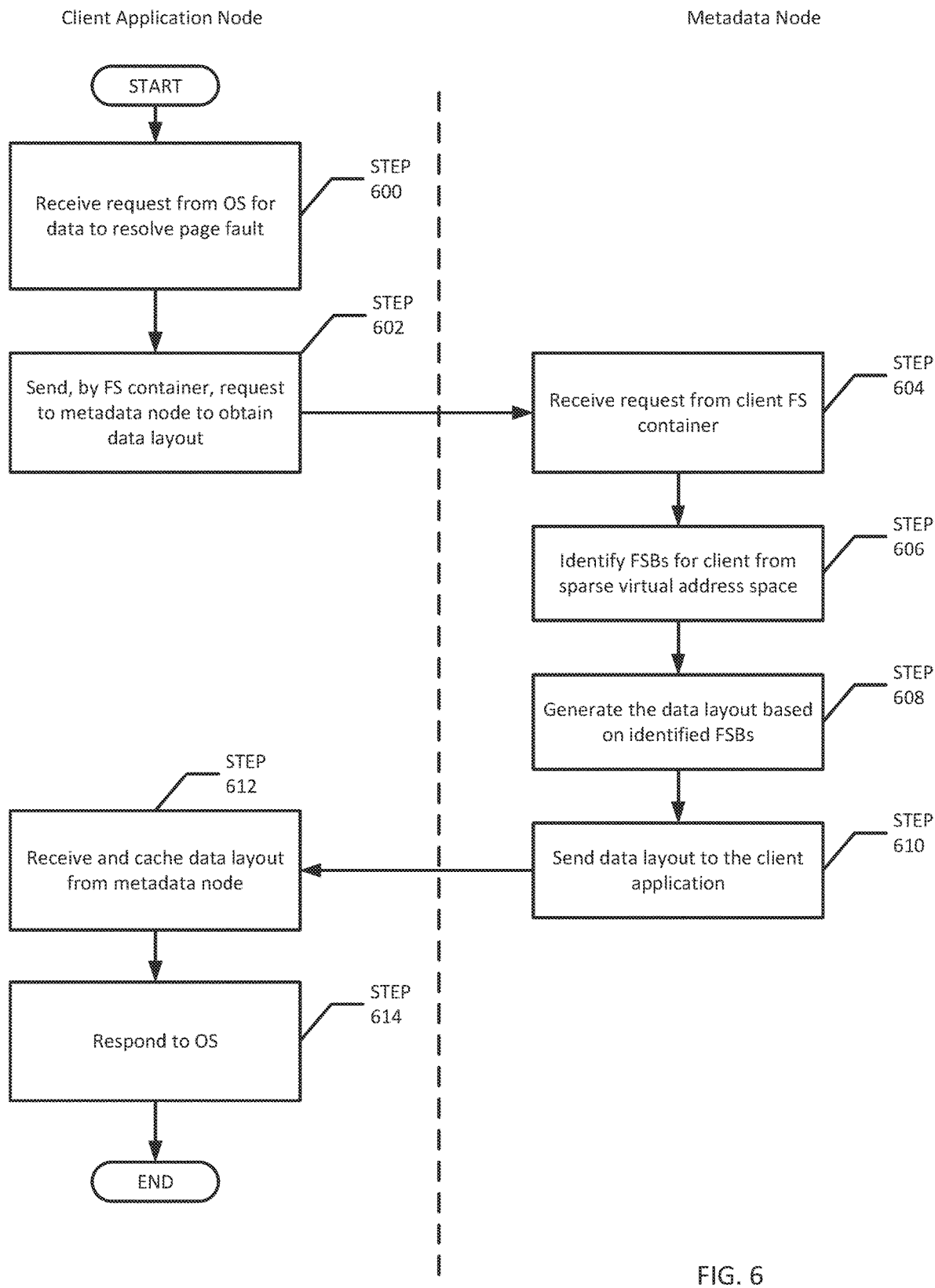
FIG. 6 shows a flowchart of a method of generating and servicing a mapping request in accordance with one or more embodiments of the invention.

Additionally, in one or more embodiments of the invention, an application may coordinate with other components of the client application node (200) to establish a mapping, see e.g., FIG. 6, between a virtual address space (e.g., 220) and underlying physical components of the hardware layer (210). In one embodiment, if a mapping is established, an application's use of the virtual address space (e.g., 220) enables the application to directly manipulate data in the hardware layer (210), without relying on other components of the client application node (200) to repeatedly update mappings between the virtual address space (e.g., 220) and the physical addresses of one or more components of the hardware layer (210). The above discussion with respect to the application's ability to interact with the hardware layer (210) is from the perspective of the application (212). However, as discussed below, the client FS container (206) (in conjunction with the metadata nodes) transparently enables to the application to ultimately read and write (or otherwise manipulate) data remoted and stored in the storage pool.

In one or more embodiments of the invention, a client FS container (206) is software executing on the client application node (200). A client FS container (206) may be an independent software instance that executes within a larger container management software instance (not shown) (e.g., Docker®, Kubernetes®, etc.). In embodiments in which the client FS container (206) is executing as an isolated software instance, the client FS container (206) may establish a semi-isolated virtual environment, inside the container, in which to execute an application (e.g., FS client (240) and memory hypervisor module (242), described below). In one embodiment of the invention, a client FS container (206) may be executing in "user space" (e.g., a layer of the software that utilizes low-level system components for the execution of applications) of the OS (208).

Referring to FIG. 2B, in one embodiment of the invention, the client FS container (206) includes an FS client (240) and a memory hypervisor module (242). In one embodiment, a FS client (240) is software executing within the client FS container (206). The FS client (204) is a local file system that includes functionality to interact with the OS using POSIX (i.e., using file semantics). Said another way, from the perspective of the OS, the FS client is the file system for the client application node and it is a POSIX file system. However, while the FS client interacts with the OS using POSIX, the FS client also includes functionality to interact with the metadata nodes and the memory hypervisor module using protocols other than POSIX (e.g., using memory semantics instead of file semantics).

In one or more embodiments of the invention, FS client (240) may include functionality to generate one or more virtual-to-physical address mappings by translating a virtual address of a virtual address space (220) to a physical address of a component in the hardware layer (210). Further, in one embodiment of the invention, the FS client (240) may further be configured to communicate one or more virtual-to-physical address mappings to one or more components of the hardware layer (210) (e.g., memory management unit (not shown)). In one embodiments of the invention, the FS client (240) tracks and maintains various mappings as described below in FIGS. 5A-5B. Additionally, in one or more embodiments of the invention, FS client (240) is configured to initiate the generation and issuance of I/O requests by the memory hypervisor module (242) (see e.g., FIGS. 6-16).

In one embodiment of the invention, the memory hypervisor module (242) is software executing within the client FS container (206) that includes functionality to generate and issue I/O requests over fabric directly to storage media in the storage pool. Additional detail about the operation of the memory hypervisor module is described below in FIGS. 6-16.

Returning to FIG. 2A, in one or more embodiments of the invention, an OS (208) is software executing on the client application node (200). In one embodiment of the invention, an OS (208) coordinates operations between software executing in "user space" (e.g., containers (202, 206), applications (212)) and one or more components of the hardware layer (210) to facilitate the proper use of those hardware layer (210) components. In one or more embodiments of the invention, the OS (208) includes a kernel module (230). In one embodiment of the invention, the kernel module (230) is software executing in the OS (208) that monitors data (which may include read and write requests) traversing the OS (208) and may intercept, modify, and/or otherwise alter that data based on one or more conditions. In one embodiment of the invention, the kernel module (230) is capable of redirecting data received by the OS (208) by intercepting and modifying that data to specify a recipient different than normally specified by the OS (208).

In one or more embodiments of the invention, the hardware layer (210) is a collection of physical components configured to perform the operations of the client application node (200) and/or otherwise execute the software of the client application node (200) (e.g., those of the containers (202, 206), applications (e.g., 212)).

In one embodiment of the invention, the hardware layer (210) includes one or more communication interface(s) (232). In one embodiment of the invention, a communication interface (232) is a hardware component that provides capabilities to interface the client application node (200) with one or more devices (e.g., a client, another node in the CSI (104), etc.) and allow for the transmission and receipt of data (including metadata) with those device(s). A communication interface (232) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, the communication interface (232) may implement and/or support one or more protocols to enable the communication between the client application nodes and external entities (e.g., other nodes in the CSI, one or more clients, etc.). For example, the communication interface (232) may enable the client application node to be operatively connected, via Ethernet, using a TCP/IP protocol to form a "network fabric" and enable the communication of data between the client application node and other external entities. In one or more embodiments of the invention, each node within the CSI may be given a unique identifier (e.g., an IP address) to be used when utilizing one or more protocols.

Further, in one embodiment of the invention, the communication interface (232), when using certain a protocol or variant thereof, supports streamlined access to storage media of other nodes in the CSI. For example, when utilizing remote direct memory access (RDMA) to access data on another node in the CSI, it may not be necessary to interact with the software (or storage stack) of that other node in the CSI. Rather, when using RDMA (via an RDMA engine (not shown) in the communications interface(s) (232)), it may be possible for the client application node to interact only with the hardware elements of the other node to retrieve and/or transmit data, thereby avoiding any higher-level processing by the software executing on that other node. In other embodiments of the invention, the communicate interface enables direct communication with the storage media of other nodes using Non-Volatile Memory Express (NVMe) over Fabric (NVMe-oF) and/or persistent memory over Fabric (PMEMoF) (both of which may (or may not) utilize all or a portion of the functionality provided by RDMA).

In one embodiment of the invention, the hardware layer (210) includes one or more processor(s) (not shown). In one embodiment of the invention, a processor may be an integrated circuit(s) for processing instructions (e.g., those of the containers (202, 206), applications (e.g., 212) and/or those received via a communication interface (232)). In one embodiment of the invention, processor(s) may be one or more processor cores or processor micro-cores. Further, in one or more embodiments of the invention, one or more processor(s) may include a cache (not shown) (as described).

In one or more embodiments of the invention, the hardware layer (210) includes persistent storage (236). In one embodiment of the invention, persistent storage (236) may be one or more hardware devices capable of storing digital information (e.g., data) in a non-transitory medium. Further, in one embodiment of the invention, when accessing persistent storage (236), other components of client application node (200) are capable of only reading and writing data in fixed-length data segments (e.g., "blocks") that are larger than the smallest units of data normally accessible (e.g., "bytes").

Specifically, in one or more embodiments of the invention, when data is read from persistent storage (236), all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage (236).

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage (236).

Examples of "persistent storage" (236) include, but are not limited to, certain integrated circuit storage devices (e.g., solid-state drive (SSD), magnetic storage (e.g., hard disk drive (HDD), floppy disk, tape, diskette, etc.), or optical media (e.g., compact disc (CD), digital versatile disc (DVD), NVMe devices, computational storage, etc.). In one embodiment of the invention, NVMe device is a persistent storage that includes SSD that is accessed using the NVMe® specification (which defines how applications communicate with SSD via a peripheral component interconnect express) bus. In one embodiment of the invention, computational storage is persistent storage that includes persistent storage media and microprocessors with domain-specific functionality to efficiently perform specific tasks on the data being stored in the storage device such as encryption and compression.

In one or more embodiments of the invention, the hardware layer (210) includes memory (238). In one embodiment of the invention, memory (238), similar to persistent storage (236), may be one or more hardware devices capable of storing digital information (e.g., data) in a non-transitory medium. However, unlike persistent storage (236), in one or more embodiments of the invention, when accessing memory (238), other components of client application node (200) are capable of reading and writing data at the smallest units of data normally accessible (e.g., "bytes").

Specifically, in one or more embodiments of the invention, memory (238) may include a unique physical address for each byte stored thereon, thereby enabling software (e.g., applications (212), containers (202, 206)) to access and manipulate data stored in memory (238) by directing commands to a physical address of memory (238) that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage, "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory (238).

Examples of memory (238) include, but are not limited to, certain integrated circuit storage (e.g., flash memory, random access memory (RAM), dynamic RAM (DRAM), resistive RAM (ReRAM), etc.) and Persistent Memory (PMEM). PMEM is a solid-state high-performance byte-addressable memory device that resides on the memory bus, where the location of the PMEM on the memory bus allows PMEM to have DRAM-like access to data, which means that it has nearly the same speed and latency of DRAM and the non-volatility of NAND flash.

In one embodiment of the invention, the hardware layer (210) includes a memory management unit (MMU) (not shown). In one or more embodiments of the invention, an MMU is hardware configured to translate virtual addresses (e.g., those of a virtual address space (220)) to physical addresses (e.g., those of memory (238)). In one embodiment of the invention, an MMU is operatively connected to memory (238) and is the sole path to access any memory device (e.g., memory (238)) as all commands and data destined for memory (238) must first traverse the MMU prior to accessing memory (238). In one or more embodiments of the invention, an MMU may be configured to handle memory protection (allowing only certain applications to access memory) and provide cache control and bus arbitration. Further, in one or more embodiments of the invention, an MMU may include a translation lookaside buffer (TLB) (as described below).

While FIGS. 2A-2B show a specific configuration of a client application node, other configurations may be used without departing from the scope of the disclosure. Accordingly, embodiments disclosed herein should not be limited to the configuration of devices and/or components shown in FIGS. 2A-2B.

Figure 3:
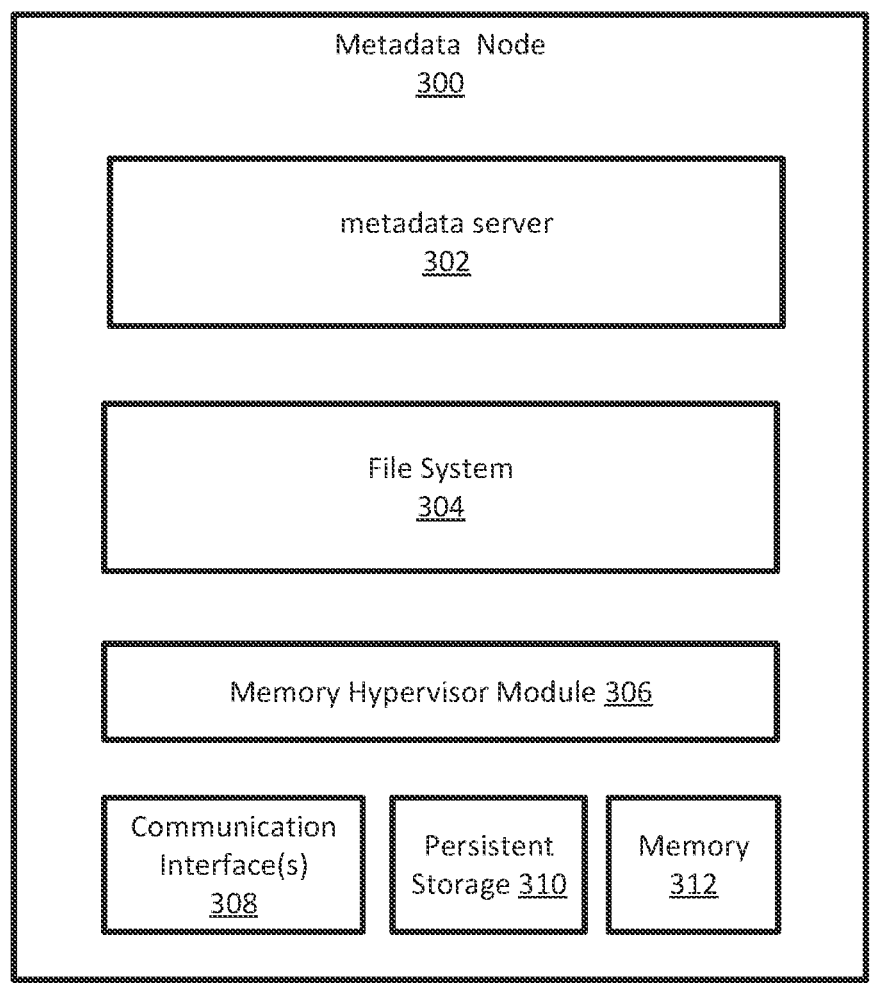
FIG. 3 shows an example of a metadata node in accordance with one or more embodiments of the invention.

FIG. 3 shows an example of a metadata node in accordance with one or more embodiments of the invention. In one embodiment of the invention, metadata node (300) includes a metadata server (302), a file system (304), a memory hypervisor module (306), an OS (not shown), a communication interface(s) (308), persistent storage (310), and memory (312). Each of these components is described below. In one or more embodiments of the invention, the metadata node (300) (or one or more components therein) is configured to perform all, or a portion, of the functionality described in FIGS. 6-16.

In one embodiment of the invention, the metadata server (302) includes functionality to manage all or a portion of the metadata associated with the CSI. Further, the metadata server includes functionality to manage the metadata required to implement all or a portion of the following features: in-line deduplication (see e.g., FIG. 8), end-to-end error detection and correction (see e.g., FIGS. 9-10), data protection and recovery of protected data (see e.g., FIGS. 1-12B), end-to-end data encryption (see e.g., FIGS. 13 and 14), and storage tiering (see e.g., FIGS. 15A-16). The specific metadata that is required to implement the aforementioned features is described below in relation to the corresponding features. The metadata server (302) also includes functionality to service requests for data layouts that it receives from the various client application nodes. Said another way, each metadata node may support multiple client application nodes. As part of this support, the client application nodes may send data layout requests to the metadata node (300). Metadata node (300), in conjunction with the file system (304), generates and/or obtains the requested data layouts and provides the data layouts to the appropriate client application nodes. The data layouts provide a mapping between file offsets and [SOV, offset]s (see e.g., FIG. 5A-5B).

Figure 5A:
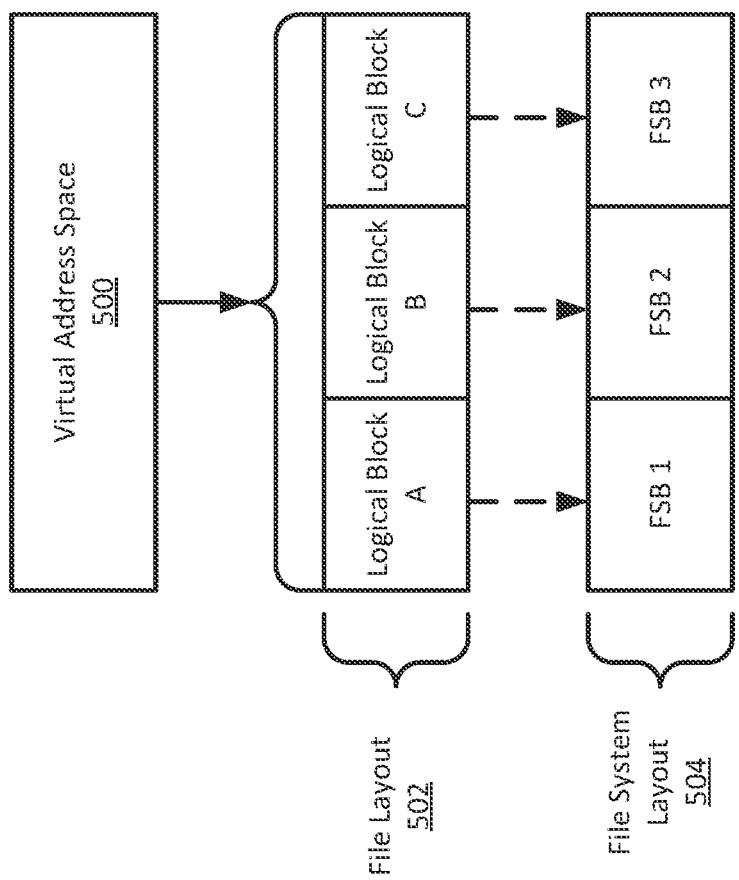
FIG. 5A shows relationships between various virtual elements in the system in accordance with one or more embodiments of the invention.
Figure 5B:
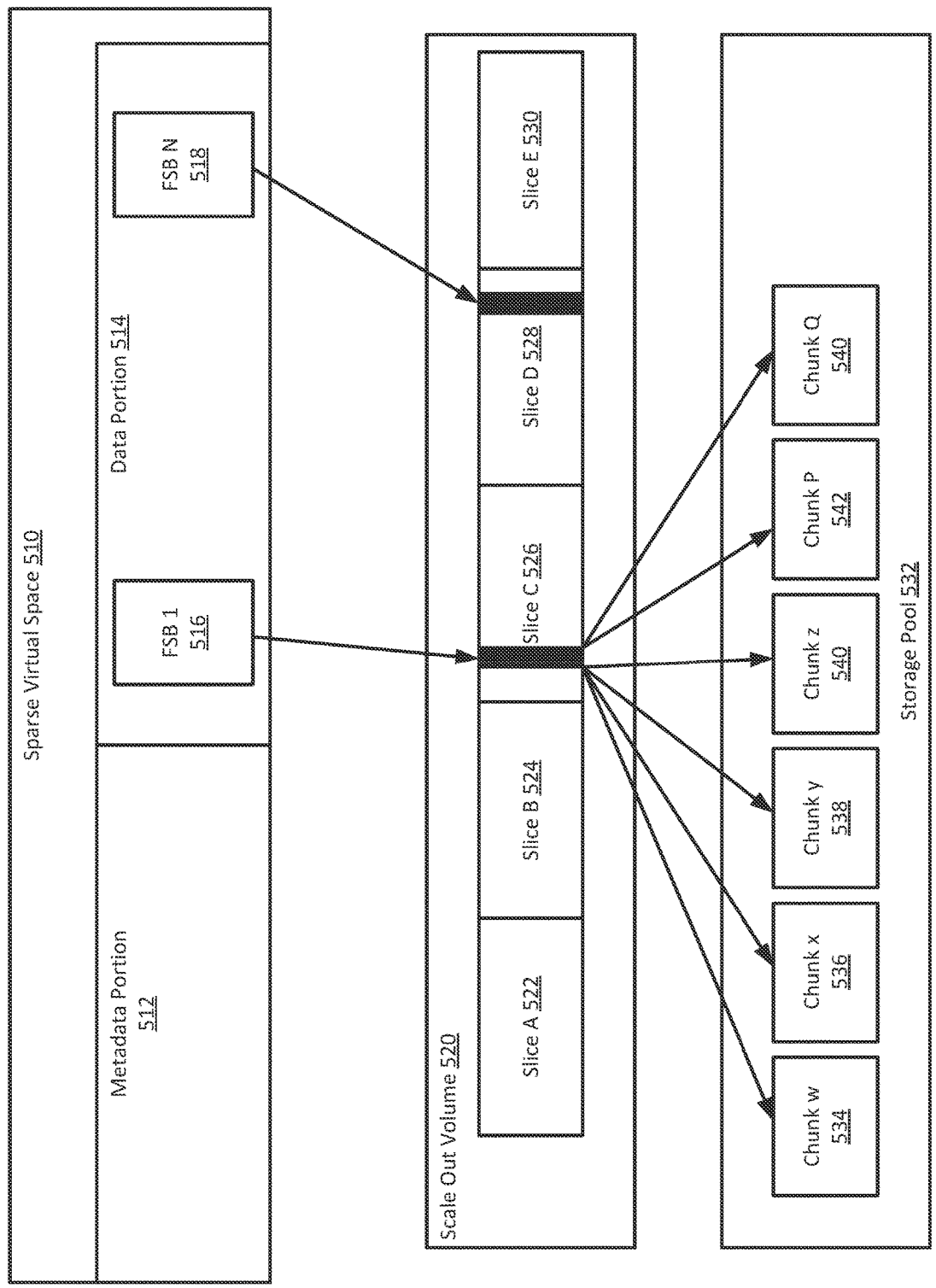
FIG. 5B shows relationships between various virtual and physical elements in the system in accordance with one or more embodiments of the invention.

In one embodiment of the invention, the file system (304) includes functionality to manage a sparse virtual space (see e.g., FIG. 5, 510) as well as the mapping between the sparse virtual space and an underlying SOV(s) (see e.g., FIG. 5, 520). The file system (304), the metadata server (302), or another component in the metadata node (300) manages the mappings between the SOV(s) and the underlying storage media in the storage pool. Additional detail about the sparse virtual space and the SOV(s) is provided below with respect to FIGS. 5A-5B.

In one embodiment of the invention, the memory hypervisor module (306) is substantially the same as the memory hypervisor module described in FIG. 2B (e.g., 242).

In one embodiment of the invention, the metadata node (300) includes one or more communication interfaces (308). The communication interfaces are substantially the same as the communication interfaces described in FIG. 2A (e.g., 232).

In one embodiment of the invention, metadata node (300) includes one or more processor(s) (not shown). In one embodiment of the invention, a processor may be an integrated circuit(s) for processing instructions (e.g., those of the metadata server (302), file system (304) and/or those received via a communication interface(s) (308)). In one embodiment of the invention, processor(s) may be one or more processor cores or processor micro-cores. Further, in one or more embodiments of the invention, one or more processor(s) may include a cache (not shown) (as described).

In one or more embodiments of the invention, the metadata node includes persistent storage (310), which is substantially the same as the persistent storage described in FIG. 2A (e.g., 236).

In one or more embodiments of the invention, the metadata node includes memory (312), which is substantially similar to memory described in FIG. 2A (e.g., 238).

Figure 4:
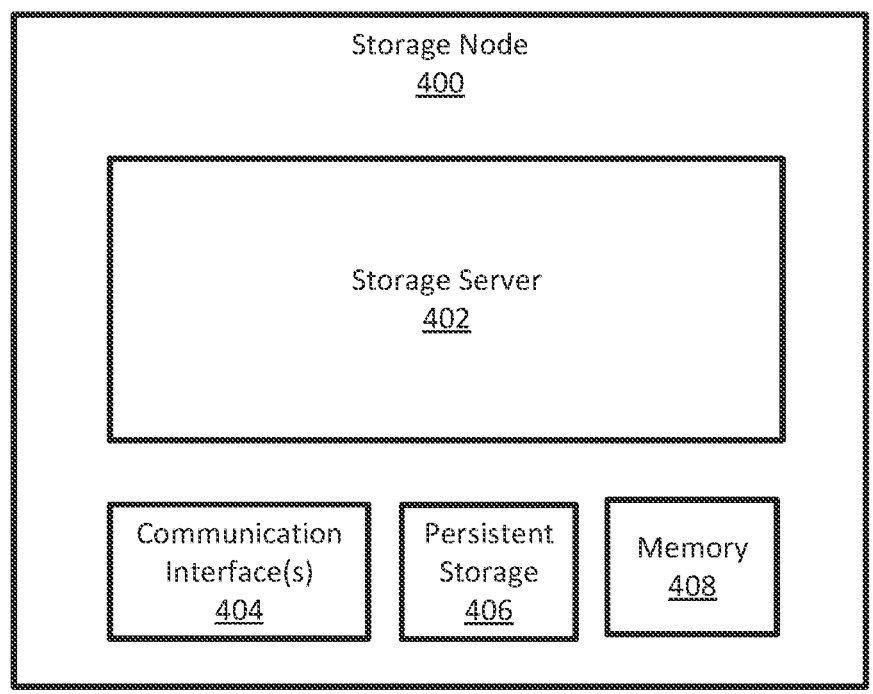
FIG. 4 shows an example of a storage node in accordance with one or more embodiments of the invention.

FIG. 4 shows an example of a storage node in accordance with one or more embodiments of the invention. In one embodiment of the invention, server node (400) includes a storage server (402), an OS (not shown), a communication interface(s) (404), persistent storage (406), and memory (408). Each of these components is described below. In one or more embodiments of the invention, the server node (400)

(or one or more components therein) is configured to perform all, or a portion, of the functionality described in FIGS. 6-16.

In one embodiment of the invention, the storage server (402) includes functionality to manage the memory (408) and persistent storage (406) within the storage node.

In one embodiment of the invention, the server node includes communication interface(s) (404), which is substantially the same as the memory communication interface(s) described in FIG. 2A (e.g., 232).

In one embodiment of the invention, server node (400) includes one or more processor(s) (not shown). In one embodiment of the invention, a processor may be an integrated circuit(s) for processing instructions (e.g., those of the storage server (402), and/or those received via a communication interface (404)). In one embodiment of the invention, processor(s) may be one or more processor cores or processor micro-cores. Further, in one or more embodiments of the invention, one or more processor(s) may include a cache (not shown) (as described).

In one or more embodiments of the invention, the server node includes persistent storage (406)), which is substantially the same as the persistent storage described in FIG. 2A (e.g., 236).

In one or more embodiments of the invention, the server node includes memory (408), which is substantially similar to memory described in FIG. 2A (e.g., 238).

FIGS. 5A-5B show relationships between various physical and virtual elements in the system in accordance with one or more embodiments of the invention. More specifically, FIGS. 5A-5B show the mappings that are maintained by the various nodes in the CSI in order to permit applications to read and/or write data in storage media in a storage pool.

Referring to FIG. 5A, applications (e.g., 212) executing in the application containers (e.g., 202) read and write from a virtual address space (500). The OS (e.g., 208) provides a mapping between offsets in the virtual address space (500) to corresponding logical blocks (e.g., logical block A, logical block B, logical block C) arranged in a file layout (502). Said another way, the OS maps segments of a virtual address space into a "file," where a virtual address space segment (i.e., a portion of the virtual address space) (not shown) is mapped to a file offset (i.e., an offset in a file defined by the file layout (502)).

When the OS (e.g., 208) interacts with the FS client (e.g., 240), it uses the file name (or file identifier) and offset to refer to a specific location from which the application (e.g., 212) is attempting to read or write. The FS client (e.g., 240) maps the logical blocks (e.g., logical block A, logical block B, logical block C) (which are specified using [file name, offset]) to corresponding file system blocks (FSBs) (e.g., FSB1, FSB2, FSB3). The FSBs that correspond to a given file layout (502) may be referred to as file system layout (504). In one embodiment of the invention, the file layout (502) typically includes a contiguous set of logical blocks, while the file system layout (504) typically includes a set of FSBs, which may or may not be contiguous FSBs. The mapping between the file layout (502) and the file system layout (504) is generated by the metadata server (see e.g., FIGS. 6-16).

Referring to FIG. 5B, the FSBs (e.g., FSB 1 (516), FSB N (518)) correspond to FSBs in a sparse virtual space (510). In one embodiment of the invention, the sparse virtual space (510) is a sparse, virtual data structure that provides a comprehensive layout and mapping of data managed by the file system (e.g., FIG. 3, 304) in the metadata node. Thus, while there may be multiple virtual address space(s) (e.g., virtual address space (500)) and there may be multiple SOVs (520) there is only one sparse virtual space (510).

In one embodiment of the invention, the sparse virtual space (510) may be allocated with several petabytes of sparse space, with the intention being that the aggregate space of the storage media in the storage pool (532) will not exceed several petabytes of physical storage space. Said another way, the sparse virtual space (510) is sized to support an arbitrary number of virtual address spaces and an arbitrary amount of storage media such that the size of the sparse virtual space (510) remains constant after it has been initialized.

The sparse virtual space (510) may be logically divided into a metadata portion (512) and a data portion (514). The metadata portion (512) is allocated for the storage of file system metadata and FS client metadata. The file system metadata and the FS client metadata may correspond to any metadata (examples of which are provided below with respect to FIGS. 6-16) to enable (or that enables) the file system and the FS client to implement one or more embodiments of the invention. The data portion (514) is allocated for the storage of data that is generated by applications (e.g., 212) executing on the client application nodes (e.g., 200). Each of the aforementioned portions may include any number of FSBs (e.g., 516, 518).

In one or more embodiments of the invention, each FSB may be uniformly sized throughout the sparse virtual space (510). In one or more embodiments of the invention, each FSB may be equal to the largest unit of storage in storage media in the storage pool. Alternatively, in one or more embodiments of the invention, each FSB may be allocated to be sufficiently larger than any current and future unit of storage in storage media in the storage pool.

In one or more embodiments of the invention, one or more SOVs (e.g., 520) are mapped to FSBs in the sparse virtual space (510) to ultimately link the FSBs to storage media. More specifically, each SOV is a virtual data space that is mapped to corresponding physical regions of a portion of, one, or several storage devices, which may include one or more memory devices and one or more persistent storage devices. The SOV(s) (e.g., 520) may identify physical regions of the aforementioned devices by maintaining a virtual mapping to the physical addresses of data that comprise those memory devices (e.g., 238, 312, 408) or persistent storage devices (e.g., 236, 310, 406).

In one or more embodiments of the invention, several SOVs may concurrently exist (see e.g., FIG. 15A), each of which is independently mapped to part of, one, or several memory devices. Alternatively, in one embodiment of the invention, there may only be a SOV associated with the physical regions of all devices in a given node (e.g., a client application node, a metadata node, or a storage node).

In one embodiment of the invention, a SOV may be uniquely associated with a single storage device (e.g., a memory device or a persistent storage device). Accordingly, a single SOV may provide a one-to-one virtual emulation of a single storage device of the hardware layer. Alternatively, in one or more embodiments of the invention, a single SOV may be associated with multiple storage devices (e.g., a memory device or a persistent storage device), each sharing some characteristic. For example, there may be a single SOV for two or more DRAM devices and a second memory pool for two or more PMEM devices. One of ordinary skill in the art, having the benefit of this detailed description, would appreciate that SOV(s) (e.g., 520) may be organized by any suitable characteristic of the underlying memory (e.g., based on individual size, collective size, type, speed, etc.).

In one embodiment of the invention, storage pool (532) includes one or more storage devices (e.g., memory devices and/or persistent storage devices). The storage devices (or portions thereof) may be mapped into the SOV in "slice" units (or "slices"). For example, each slice (e.g., 522, 524, 526, 528, 530) may have a size of 256 MB (the invention is not limited to this example). When mapped into the SOV, each slice may include a contiguous set of FSBs that have an aggregate size equal to the size of the slice. Accordingly, each of the aforementioned FSBs (e.g., 516, 518) is logically associated with a slice (e.g., 522, 524, 526, 528, 530) in the SOV. The portion of the slice that is mapped to a given FSB may be specified using by an offset within a SOV (or by an offset within a slice within the SOV). Each portion of the slice within a SOV is mapped to one or more physical locations in the storage pool. In one non-limiting example, the portion of client C (256) may be 4K in size and may be stored in the storage pool (532) as a 6K stripe with four 1K data chunks (e.g., chunk w (534), chunk x (536), chunky (538), chunk z (540)) and two 1K parity chunks (e.g., chunk P (542), chunk Q (542)). In one embodiment of the invention, slices that only include FSBs from the metadata portion are referred to as metadata slices and slices that only include FSBs from the data portion are referred to as data slices.

Using the relationships shown in FIGS. 5A-5B, a logical block (e.g., logical block A, logical block B, logical block C) in a file layout (502) (which may be specified as a [file, offset, length]) is mapped to an FSB (e.g., 516, 518), the FSB (e.g., 516, 518) is mapped to a location in the SOV (520) (which may be specified as a [SOV, offset, length]), and the location in the SOV (520) is ultimately mapped to one or more physical locations (e.g., 534, 536, 536, 540, 542, 544) in a storage media (e.g., memory devices) within a storage pool (532).

Using the aforementioned architecture, the available storage media in the storage pool may increase or decrease in size (as needed) without impacting how the application (e.g., 212) is interacting with the sparse virtual space (510). More specifically, by creating a layer of abstraction between the sparse virtual space (510) and the storage pool (532) using the SOV (520), the sparse virtual space (510) continues to provide FSBs to the applications provided that these FSBs are mapped to a SOV without having to manage the mappings to the underlying storage pool. Further, by utilizing the SOV (520), changes made to the storage pool including how data is protected in the storage pool (see e.g., FIGS. 11, 12A, 12B, 15A-16) are performed in a manner that is transparent to the sparse virtual space (510). This enables the size of the storage pool to scale to an arbitrary size (up to the size limit of the sparse virtual space) without modifying the operation of the sparse virtual space (510).

FIG. 6 shows a flowchart of a method of generating and servicing a mapping request in accordance with one or more embodiments of the invention. All or a portion of the method shown in FIG. 6 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 6 may be performed whenever an application (212) in a client application container (e.g., 202) triggers a page fault. In one embodiment of the invention, a page fault is issued by a processor when an invalid reference is provided to an MMU. Specifically, when a request (initiated by the application) to access or modify memory is sent to the MMU, using a virtual address, the MMU may perform a lookup in a TLB to find a physical address associated with the provided virtual address (e.g., a virtual-to-physical address mapping). However, if the TLB does not provide a physical address associated with the virtual address (e.g., due to the TLB lacking the appropriate virtual-to-physical address mapping), the MMU will be unable to perform the requested operation. Accordingly, the MMU informs the processor that the request cannot be serviced, and in turn, the processor issues a page fault back to the OS informing that the request could not be serviced.

A page fault typically specifies the virtual address (i.e., an address in virtual address space (e.g. 220)). The page fault may specify other information depending on whether the page fault was triggered by a read, write, or mapping request.

In one or more embodiments of the invention, as described in FIG. 2A above, the kernel module is software executing in the OS that monitors data traversing the OS and may intercept, modify, and/or otherwise alter that data based on one or more conditions. In one embodiment of the invention, the kernel module is capable of redirecting data received by the OS by intercepting and modifying that data to specify a recipient different than normally specified by the OS.

In one or more embodiments of the invention, the OS will, initially, be configured to forward the page fault to the application from which the request originated. However, in one embodiment of the invention, the kernel module detects that the OS received a page fault, and instead forwards the page fault to a different location (i.e., the client FS container) instead of the default recipient (i.e., the application container and/or application). In one embodiment of the invention, the kernel module specifically monitors for and detects exception handling processes that specify an application's inability to access the physical location of data.

Turning to FIG. 6, in step 600, the client FS container receives a request from a kernel module to resolve a page fault, where the request specifies at least one [file, offset] corresponding to the virtual address from the virtual address space of the application. Said another way, the virtual address associated with the page fault is translated into a [file, offset]. The [file, offset] is then sent to the client FS container.

In step 602, the FS container sends a request to a metadata node to obtain a data layout associated with the [file, offset]. The request for the data layout may also specify that the request is for read only access or for read write access. In one embodiment of the invention, read only access indicates that the application only wants to read data from a physical location associated with the virtual address while read write access indicates that the application wants to read data from and/or write data to a physical location associated with the virtual address. From the perspective of the application, the physical location is a local physical location (i.e., a physical location in the memory or the persistent storage) on the client application node; however, as shown in FIGS. 5A-5B, the physical location is actually a physical location in the storage pool.

In one embodiment of the invention, each FS client (e.g., 240) is associated with a single file system (e.g., 304) (however, each file system may be associated with multiple FS clients). The request in step 602 is sent to the metadata node that hosts the file system that is associated with the FS client on the client application node (i.e., the client application node on which the page fault was generated).

In step 604, the metadata node receives the request from the FS client container.

In step 606, in response to the request, the metadata server (on the metadata node) identifies one or more FSBs in the sparse virtual space. The identified FSBs correspond to FSB that are allocatable. An FSB is deemed allocatable if: (i) the FSB is mapped to the SOV and (ii) the FSB has not already been allocated. Condition (i) is required because while the sparse virtual space includes a large collection of FSBs, by design, at any given time not all of these FSBs are necessarily associated with any SOV(s). Accordingly, only FSBs that are associated with a SOV at the time step 606 is perform may be allocated. Condition (ii) is required as the sparse virtual space is designed to support applications distributed across multiple clients and, as such, one or more FSBs that are available for allocation may have been previously allocated by another application. The FSBs identified in step 606 may be denoted a pre-allocated FSBs in the event that no application has not written any data to these FSBs.

In one embodiment of the invention, the FSBs identified in step 606 may not be sequential (or contiguous) FSBs in the sparse virtual space. In one or more embodiments of the invention, more than one FSB may be allocated (or pre-allocated) for each logical block. For example, consider a scenario in which each logical block is 8K and each FSB is 4K. In this scenario, two FSBs are allocated (or pre-allocated) for each logical block. The FSBs that are associated with the same logical block may be sequential (or contiguous) FSBs within the sparse virtual space.

In step 608, after the FSB(s) has been allocated (or pre-allocated as the case may be), the metadata server generates a data layout. The data layout provides a mapping between the [file, file offset] (which was included in the request received in step 600) and a [SOV, offset]. The data layout may include one or more of the aforementioned mappings between [file, file offset] and [SOV, offset]. Further, the data layout may also specify the one or more FSBs associated with the data layout.

In one embodiment of the invention, if the request in step 602 specifies read only access, then the data layout will include [file, file offset] to [SOV, offset] mappings for the FSBs that include the data that the application (in the client application node) is attempting to read. In one embodiment of the invention, if the request in step 602 specifies read write access, then then the data layout may include one set of [file, file offset] to [SOV, offset] mappings for the FSBs that include the data that the application (in the client application node) is attempting to read and a second set of [file, file offset] to [SOV, offset] mappings for the FSBs to which the application may write data. The dual set of mappings provided in the aforementioned data layout may be used to support redirected writes, i.e., the application does not overwrite data; rather, all new writes are directed to new FSBs.

Continuing with the discussion of FIG. 6, in step 610, the data layout is sent to the FS client container. The metadata server may track which client application nodes have requested which data layouts. Further, if the request received in step 600 specified read write access, the metadata server may prevent any other client application from accessing the FSBs associated with the data layout generated in Step 608.

In step 612, the client application node receives and caches the data layout from the metadata node. The FS client may also create an association between the logical blocks in the file layout (e.g., 502) and the corresponding FSBs in the file system layout (e.g., 504) based on the data layout.

In one embodiment of the invention, the FS client allocates an appropriate amount of local memory (e.g., local DRAM, local PMEM), which is/will be used to temporarily store data prior to it being committed to (i.e., stored in) the storage pool using the received data layout. Further, if the request that triggered the page fault (see step 600) was a read request, then the FS client may further initiate the reading of the requested data from the appropriate location(s) in the storage pool (e.g., via the memory hypervisor module) and store the obtained data in the aforementioned local memory.

In step 614, the client FS container informs the OS (or kernel module in the OS) of the virtual-to-physical address mapping. The virtual-to-physical address mapping is a mapping of a location in the virtual address space and a physical address in the local memory (as allocated in step 612). Once the aforementioned mapping is provided, the application and/or OS may directly manipulate the local memory of the client application node (i.e., without processing from the client FS container).

Figure 7:
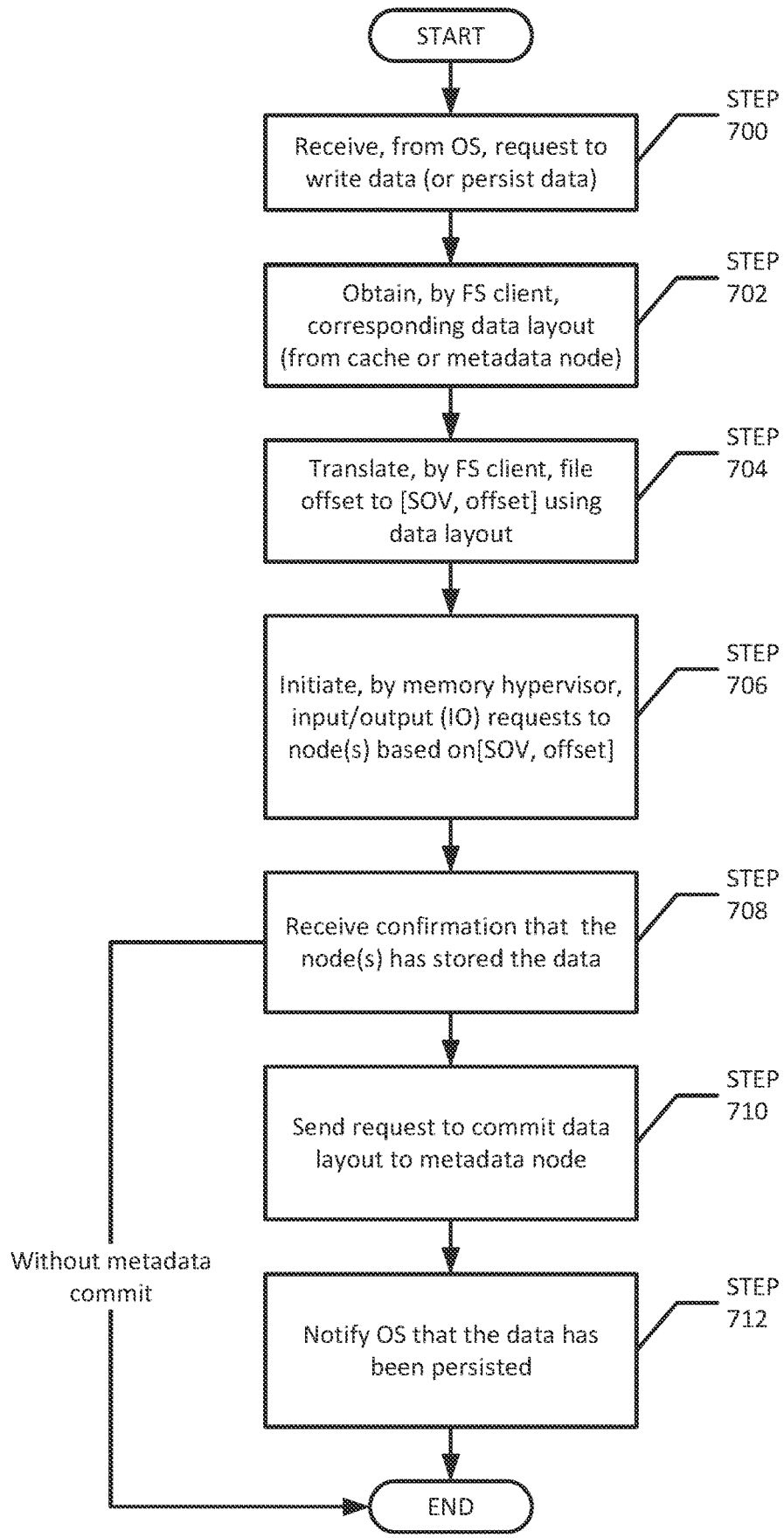
FIG. 7 shows a flowchart of a method of servicing a write request in accordance with one or more embodiments of the invention.

FIG. 7 shows a flowchart of a method of servicing a write request in accordance with one or more embodiments of the invention. All or a portion of the method shown in FIG. 7 may be performed by the client application node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 7 may be performed whenever an application in the application (e.g., 212) wants to write data. More specifically, once the method shown in FIG. 6 has been performed, the application may directly read and write data to the local memory of a client application node, which is then written via steps 700-708 to the storage pool. Further, for the data to be persisted the data must be stored in both the storage pool and the corresponding metadata must be stored in the metadata node (see e.g., Step 710-712). Steps 700-708, which relate to the storage of the data in the storage pool, may be initiated by the client application, the OS, or the client FS container. The client application may initiate the storage of the data as part of an msync or fflush command; while the OS and client FS container may initiate the storage of the data as part of its management of the local resources on the client application node.

If the application has initiated the storage of the data using a msync or fflush command, then steps 700-712 are performed, resulting the data being persisted. In this scenario, the data is written to storage as a first part of processing the msync or fflush command, and then the metadata (including the data layout) is stored on the metadata server as the second part of processing the msync or fflush command.

However, if the OS or client FS container initiates the storage of the data, then the corresponding metadata may or may not be committed (i.e., steps 710 and 712 may not be performed). In certain scenarios, steps 710-712 may be initiated by the OS or the client FS container and performed by the client FS container as part of the OS or client FS container managing the local resources (e.g., portions of the cache used to store the data layouts needs to be freed to store other data layouts).

In step 700, a request to write data (i.e., write data to the storage pool; however, the metadata may or may not be committed, see e.g., Step 710) is received by the client FS container from the OS. The request may specify a [file, offset]. Regardless of the semantics that the application is utilizing, the OS translates (as necessary) the portion of the virtual address space referenced by the application in its request to write data into a corresponding [file, offset]. As discussed above the writing of data may also be initiated by the OS and/or the client FS container without departing from the invention. In such embodiments, the request is initiated by the OS and/or another process in the client FS container and the process that initiated the request provides the [file, offset] to the FS client.

In step 702, the FS client obtains the data layout required to service the request. The data layout may be obtained using the [file, offset] in the request received from the OS. The data layout may be obtained from a cache on the client application node. However, if the data layout is not present on the client application node, e.g., because it was invalidated and, thus, removed from the client application node, then the data layout is obtained from the metadata node in accordance with FIG. 6, steps 602-612.

In step 704, the FS client, using the data layout, obtains the SOV offset. As discussed above, the data layout provides a mapping between file offsets (e.g., offsets within a file layout (e.g., 502)) and the [SOV, offset] s in a SOV (e.g., 520). Accordingly, the FS client translates the [file, offset] into [SOV, offset].

In step 706, the [SOV, offset] is then provided to the memory hypervisor module to process. More specifically, the memory hypervisor module includes the information necessary to generate and issue one or more I/O requests that result in the data being written directly from the client application node (e.g., via a communication interface(s)) to an appropriate location in storage pool. For example, if the application is attempting to write data associated with logical block A (e.g., [File A, offset 0], then the memory hypervisor module is provided with [SOV, offset 18] (which is determined using the obtained data layout). The memory hypervisor module includes the necessary information to enable it to generate, in this example, one or more I/O requests to specific locations in the storage pool. Said another way, the memory hypervisor module includes functionality to: (i) determine how many I/O requests to generate to store the data associated with [SOV, offset 18]; (ii) divide the data into an appropriate number of chunks (i.e., one chunk per I/O request); (iii) determine the target of each I/O request (the physical location in the storage pool at which the chunk will be stored); and (iv) issue the I/O requests directly to the nodes on which the aforementioned physical locations exist. The issuance of the I/O requests includes initiating the transfer of data from the appropriate location in the local memory to the target location specified in the I/O request.

The communication interface(s) in the client application node facilitates the direct transfer of the data from the client application node to the appropriate location in the storage pool. As discussed above, the storage pool may include storage media located in storage devices (e.g., memory devices or persistent storage devices) that may be on client application nodes, metadata nodes, and/or storages. Accordingly, for any given I/O request, the communication interface(s) on the client application node on which the data resides transmits the data directly to communication interface(s) of the target node (i.e., the node that includes the storage media on which the data is to be written).

In step 708, the client application node awaits for confirmation from the target node(s) that the I/O request(s) generated and issued in step 706 has been successfully stored on the target node(s). At the end of step 708, the data has been written to the storage pool; however, the corresponding metadata is not persisted at this point; as such, the data is not deemed to be persisted. Specifically, if the application does not subsequently issue an msync command (e.g., when the application is using memory semantics) or an fflush command (e.g., when the application is using file semantics) the data will be stored in the storage pool but the metadata server will not be aware that such data has been stored. In order to persist the data, steps 710 and 712 are performed. If steps 700-708 were initiated by the OS or the client FS container, then the process may end at step 708 as the data was only written to the storage pool to free local resources (e.g., memory) on the client application node and there is no need at this time to persist the data (i.e., perform steps 710-712). Further, in scenarios in which the OS initiated the writing of the data, then step 708 also includes the client FS container notifying the OS that that the data has been written to the storage pool. However, as discussed below, there may be scenarios in which the data needs to be persisted at this time and, as such, steps 710-712 are performed.

Specifically, the data (and associated metadata) may be persisted as a result of: (i) the application issuing an msync command (e.g., when the application is using memory semantics) or an fflush command (e.g., when the application is using file semantics, (ii) the client FS container initiating (transparently to the application) steps 710 and 712, or (iii) the OS initiating (transparently to the application) steps 710 and 712.

If the application issues a request to commit data (e.g., issues an msync command or an fflush command), then in step 710, the client application node (in response to the confirmation in step 708) sends a request to commit the data layout to the metadata node. The commit request includes the mapping between the file layout and the file system layout (see e.g., FIG. 5A). Upon receipt of the commit request, the metadata server stores the mapping between the file layout and the file system layout. The processing of the commit request may also trigger the invalidation of prior versions of the data layout that are currently cached on other client application nodes. For example, if client application node A requested a data layout with read only access for a [file, offset] corresponding to FSB A and client application node B subsequently requested a data layout with read write access also for FSB A, then once client application node B performs the method in FIG. 7, the data layout on client application node A is invalidated (e.g., based on a command issued by the metadata server) so as to force client application node A to obtain an updated data layout, which then ensures that client application node A is reading the updated version of the data associated with FSB A. The process then proceeds to step 712.

In scenarios in which the OS or client FS container has previously committed the data layout to the metadata node, then when the client FS container receives a request to persist the data from the application, the client FS container confirms that it has previously committed the corresponding data layout (and other related metadata) (without issuing any request to the metadata nodes). After making this determination locally, the client FS container then proceeds to step 712.

Finally, in scenarios in which the OS or the client FS container needs to commit the corresponding metadata to the metadata server (e.g., portions of the cache used to store the data layouts needs to be freed to store other data layouts), then steps 710 and 712 may be initiated by the OS or the client FS container and performed by the client FS container.

In step 712, the client FS container then notifies the OS that the data has been persisted. The OS may then send the appropriate confirmation and/notification to the application that initiated the request to persist the data. The OS does not notify the application when FIG. 7 was initiated by the OS and/or the client FS container. Further, depending on the implementation, the client FS container may or may not notify the OS if steps 710 and 712 were initiated by the client FS container.

In-Line Deduplication

One or more embodiments of the invention support in-line deduplication. Traditionally, deduplication is handled by the storage stack on the storage device. For example, when an application issues a write request to the storage device, the storage device, upon receipt of the write request, determines whether the data in the write request can be deduplicated. Using this approach, the storage device becomes the performance bottleneck for deduplication. In one or more embodiments of the invention, the client application nodes directly write to the storage pool bypassing the metadata server (i.e., the metadata server is not required to process the write request). This allows for the write requests to be performed with low latency because there is no additional processing of the write requests by the metadata server prior to the data being written to the storage pool. To support deduplication in this architecture while not impacting the write performance, the client application nodes are responsible for calculating a fingerprint for the data and writing the data to the storage pool regardless of whether the data is ultimately deduplicated. The fingerprints are then provided to the metadata server, which separately determines whether the data can be deduplicated. If the data can be deduplicated, the metadata server updates the appropriate mappings (see e.g., FIGS. 5A-5B) such that all logical blocks (in the file layout) that are associated with the same data are mapped to the same FSB (which via the [SOV, offset] is ultimately the same underlying data in the storage pool). This results in the data (i.e., the data that was just written to the storage pool and subsequently deduplicated) being marked for garbage collection. The aforementioned embodiments enable in-line deduplication without impacting the write performance of the client application nodes. Additional details about various embodiments of in-line deduplication are provided below in FIG. 8.

Figure 8:
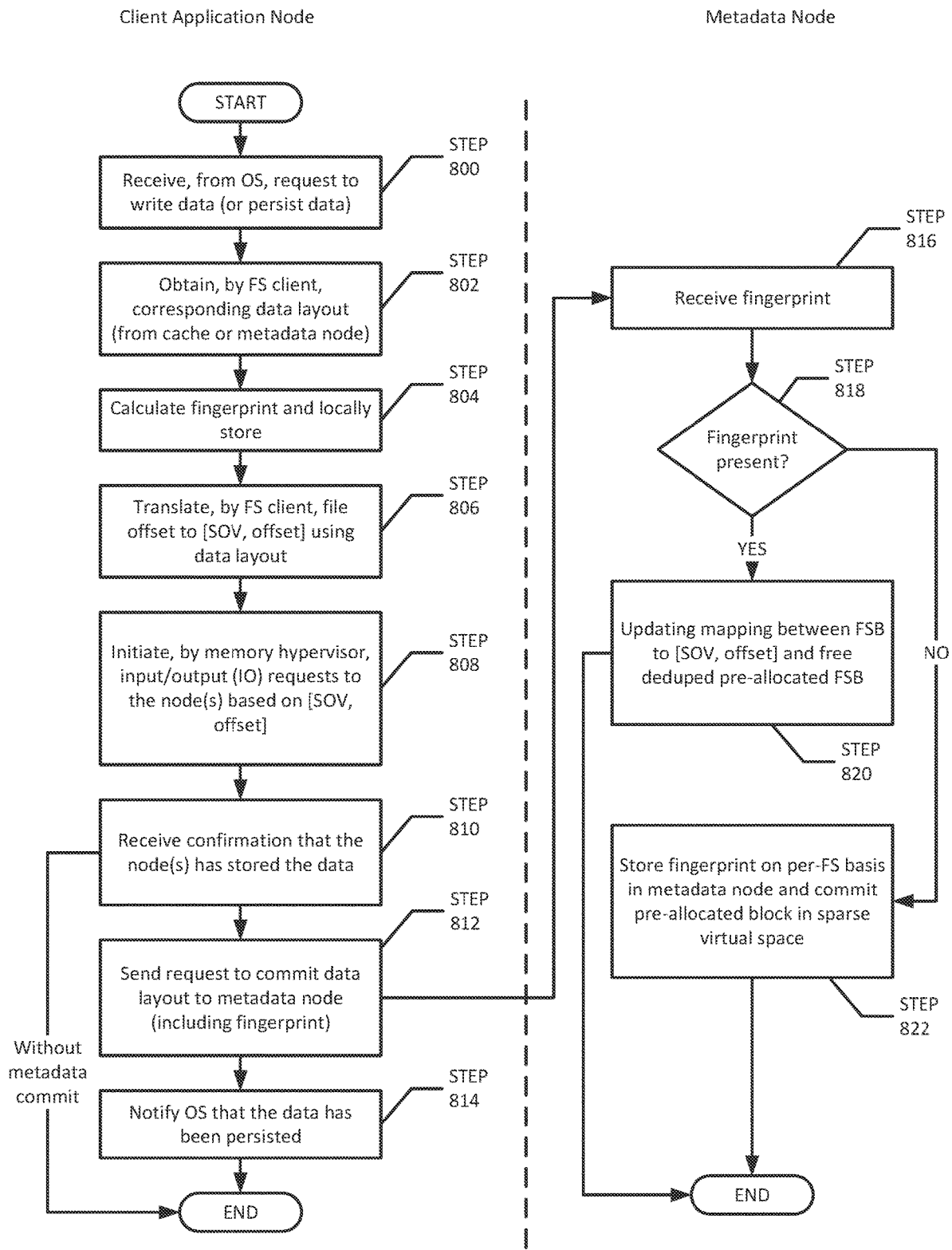
FIG. 8 shows a flowchart of a method of servicing a write request with in-line deduplication in accordance with one or more embodiments of the invention.

FIG. 8 shows a flowchart of a method of servicing a write request with in-line deduplication in accordance with one or more embodiments of the invention. All or a portion of the method shown in FIG. 8 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

Figure 13:
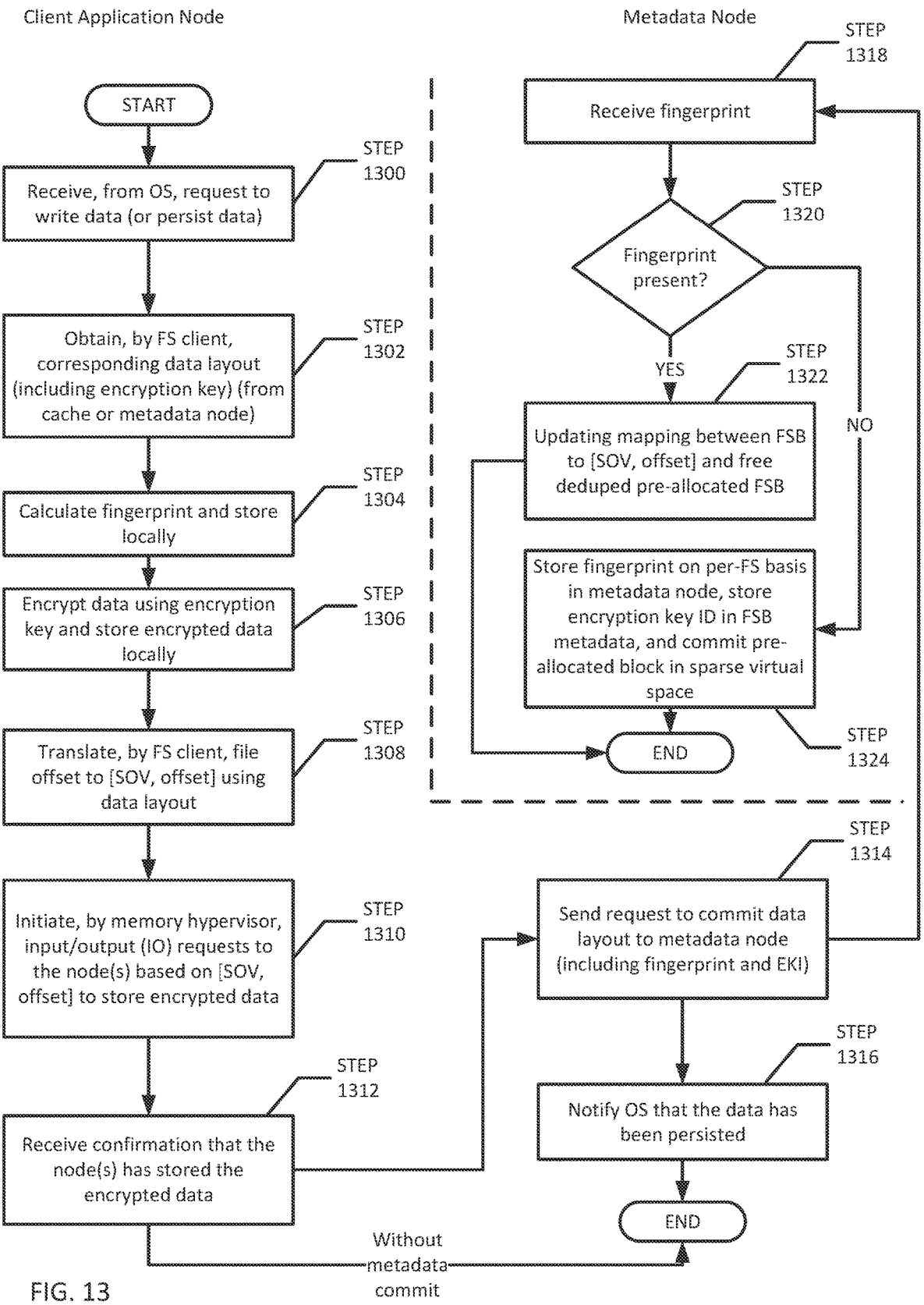
FIG. 13 shows a flowchart of a method of serving a write request using an encryption mechanism in accordance with one or more embodiments of the invention.

The method shown in FIG. 13 may be initiated in the same or substantially the same manner the method shown in FIG. 7. Turning to FIG. 8, in step 800, a request to write data is received by the client FS container from the OS. Step 800 is performed in substantially the same manner as step 700 in FIG. 7.

In step 802, the FS client obtains the data layout required to service the request. The data layout may be obtained using the [file, offset] in the request received from the OS. The data layout may be obtained from a cache on the client application node. However, if the data layout is not present on the client application node, e.g., because it was invalidated and, thus, removed from the client application node, then the data layout is obtained from the metadata node in accordance with FIG. 6, steps 602-612.

In step 804, the FS client calculates a fingerprint for the data (i.e., the data that is specified in the request to write data) and locally stores the fingerprint, e.g., in local memory. In one or more embodiments of the invention, a fingerprint may be a bit sequence that virtually uniquely identifies a segment of a slice. As used herein, virtually uniquely means that the probability of collision between the fingerprints of two segments that specify different data is negligible, compared to the probability of other unavoidable causes of fatal errors. In one or more embodiments of the invention, the probability is 10^-20 or less. In one or more embodiments of the invention, the unavoidable fatal error may be caused by a force of nature such as, for example, a tornado. In other words, the fingerprints of any two segments that specify different data will virtually always be different. In one embodiment of the invention, the fingerprint may be calculated by applying a SHA-256 function to the data. Other functions may be used to generate the fingerprint without departing from the invention.

In step 806, the FS client, using the data layout, obtains the [SOV, offset]. As discussed above, the data layout provides a mapping between file offsets (e.g., offsets within a file layout (e.g., 502)) and the SOV offsets in a SOV (e.g., 520). Accordingly, the FS client translates the [file, offset] into [SOV, offset].

In step 808, the [SOV, offset] is then provided to the memory hypervisor module to process. More specifically, the memory hypervisor module includes the information necessary to generate and issue one or more I/O requests that result in the data being written directly from the client application node (e.g., via a communication interface(s)) to an appropriate location in storage pool. Step 808 is performed in substantially the same manner as step 706 in FIG. 7.

In step 810, the client application node awaits for confirmation from the target node(s) that the I/O request(s) generated and issued in step 808 has been successfully stored on the target node(s). Step 810 is performed in substantially the same manner as step 708 in FIG. 7. The process may stop at step 810 or proceed to step 1312 based on the same rationale described with respect to steps 708 and 710.

In step 812, the client application node (in response to the confirmation in step 808) sends a request to commit the data layout to the metadata node. The commit request includes the mapping between the file layout and the file system layout as well as the fingerprint generated in step 804. Step 812 is performed in substantially the same manner as step 710 in FIG. 7. As discussed above with respect to FIG. 7, there are scenarios in which the data is written to storage pool but the corresponding metadata is not committed to the metadata node. In these scenarios, the fingerprint may still be maintained in the local memory of the client application node while the underlying data has been written to the storage pool and, as such, is not present on the client application node.

In step 814, the client FS container then notifies the OS that the data has been persisted. The OS may then send the appropriate confirmation and/notification to the application that initiated the request to persist the data. Step 814 occurs regardless of the result of the processing by the metadata node in steps 816-822. Said another way, the deduplication processing of the metadata node is done in a manner that is transparent to the client application nodes. From the client application node's perspective, the data has successfully been written to the appropriate location in the storage pool (i.e., the location determined by the memory hypervisor module). Step 814 is performed in substantially the same manner as step 712 in FIG. 7.

Turning to the processing by the metadata node, in step 816, the metadata server (on the metadata node) receives the fingerprint as part of the commit request.

In step 818, the metadata server determines whether the fingerprint is currently present on the metadata server. More specifically, the metadata server maintains a per-file system data structure (in implementations where the metadata server supports multiple file systems) that includes a mapping between received fingerprints and the FSBs. A non-limiting example of a data structure is a B-tree. The data structure (e.g., the B-tree) is used to efficiently determine whether a given fingerprint has previously been received. The B-tree, or another data structure, may also track the relationship between the fingerprints and the FSBs. If a given fingerprint has previously been received, then the fingerprint is present in the aforementioned data structure (e.g., the B-Tree). If the fingerprint is present, then the data may be deduplicated and the process proceeds to step 820; otherwise, the process proceeds to step 822.

In step 820, the data may be deduplicated. Deduplicating the data may include updating the mapping between the logical blocks in the file layout and the FSBs to reflect that the data is deduplicated. For example, consider a scenario in which there is first file (File 1) that includes logical block A that is associated with FSB0. Logical block A is associated with data (D1). At time T=1, client application node A processes a write request that results in D1 (with fingerprint FP1) being stored in a location in the storage pool associated with [SOV, offset A] (which is mapped to FSB0). As part of processing the write request, FP1 is stored in a B-tree in the metadata server and the relationship between F1 and FSB0 is tracked.

In this scenario, there is a second file (File 2) that includes logical block B that is associated with FSB1. Logical block B is associated with data (D2). At time T=2, client application node B processes a write request that results in D2 (with fingerprint FP1) being stored in a location in the storage pool associated with [SOV, offset B] (which is mapped to FSB1).

After D2 has been stored in the storage pool, the metadata node determines that FP1 is present in the B-tree and, as such, D2 may deduplicated. At this stage, the metadata server updates the mapping for logical block B to now map to FSB0. Further, the metadata server frees the previously allocated (or pre-allocated) FSB1. Thus, FSB1 may be used to store other data. Further, D2 (which is stored in storage pool) is marked for garbage collection. The process then ends.

In step 822, when the data may not be deduplicated, the fingerprint provided in Step 812 is stored in the aforementioned data structure on the metadata server and the metadata node commits the FSB. Committing the FSB includes storing, by the metadata server, the mapping between the file layout and the file system layout. The process then ends.

In-Line Error Detection and Correction Mechanism

In one or more embodiments of the invention, CSI (e.g. 104) implements in-line error detection and correction. The error detection and correction mechanism implemented in accordance with one or more embodiments of the invention enables: (i) distributed generation of an error detection value (EDV) (e.g., a cyclic redundancy check (CRC) value); (ii) centralized storage of EDVs; (iii) a distributed determination of whether data is corrupted using EDVs; and (iv) transparent correction (from the perspective of the application requesting the data) of any corrupted data. Embodiments of the invention may enable the aforementioned actions to be performed in a manner that preserves the read and write performance of the CSI while concurrently ensuring that the data that is used by the applications (e.g., 212 in FIG. 2A) is valid (i.e., not corrupted) and correcting any invalid (or otherwise corrupted) data. Additional details about various embodiments of in-line deduplication are provided below in FIGS. 9-10.

Figure 9:
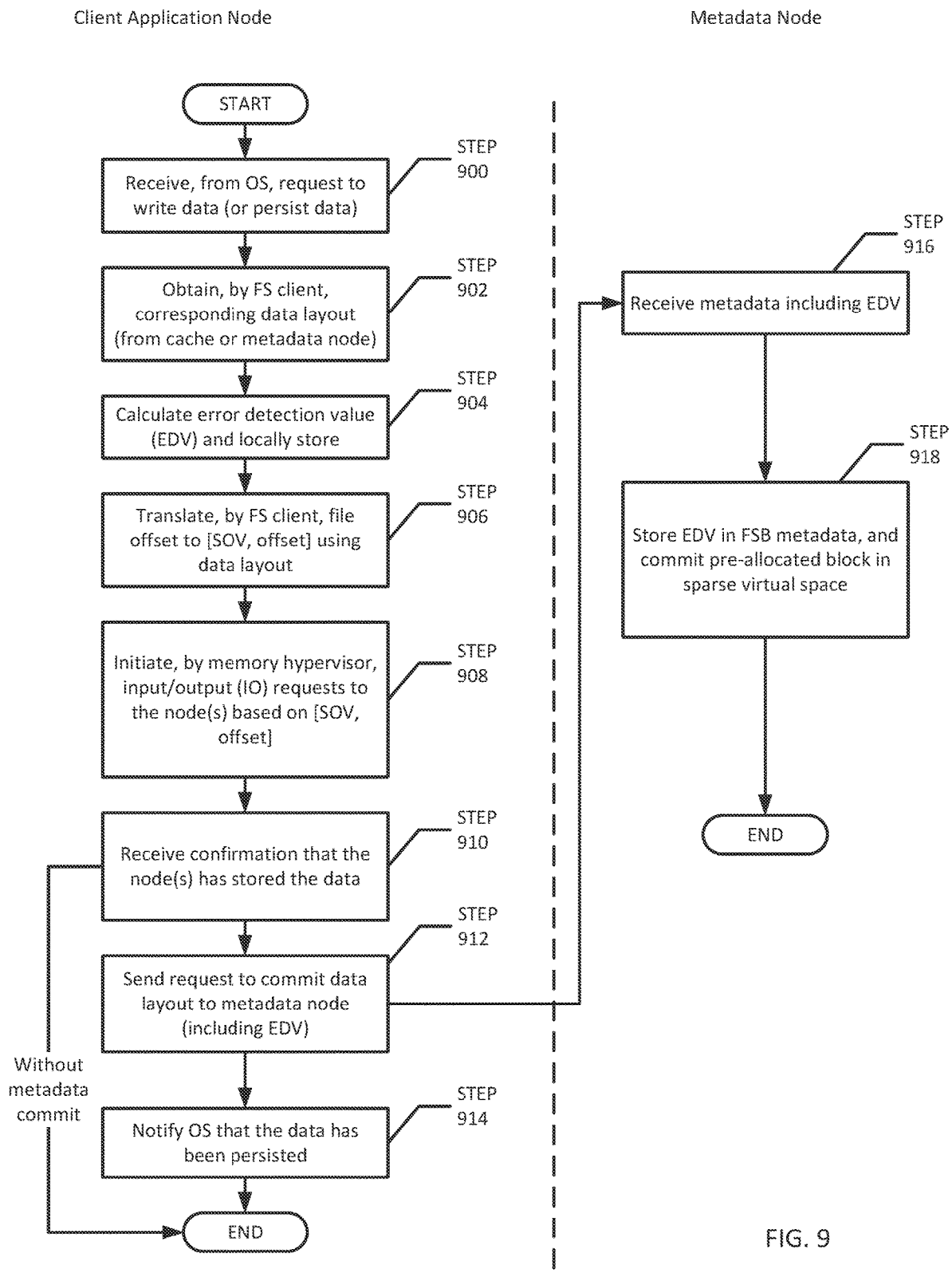
FIG. 9 shows a flowchart of a method of serving a write request using an in-line error detection mechanism in accordance with one or more embodiments of the invention.

FIG. 9 shows a flowchart of a method of serving a write request using an in-line error detection mechanism in accordance with one or more embodiments of the invention. All or a portion of the method shown in FIG. 9 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 9 may be initiated in the same or substantially the same manner the method shown in FIG. 7. Turning to FIG. 9, in step 900, a request to write data is received by the client FS container from the OS. Step 900 is performed in substantially the same manner as step 700 in FIG. 7.

In step 902, the FS client obtains the data layout required to service the request. The data layout may be obtained using the [file, offset] in the request received from the OS. The data layout may be obtained from a cache on the client application node. However, if the data layout is not present on the client application node, e.g., because it was invalidated and, thus, removed from the client application node, then the data layout is obtained from the metadata node in accordance with FIG. 6, steps 602-612.

In step 904, the FS client calculates an EDV (e.g., a cyclic redundancy value) for the data (i.e., the data that is specified in the request to write data) and locally stores the EDV, e.g., in local memory. The EDV may be generated using any mathematical operation (typically in the form of a polynomial function) that can be performed on the data to ensure that bits in the data do not get inadvertently flipped when the data is being transmitted over a network and/or is being stored. Non-limiting examples of the mathematical functions include CRC-8 and CRC-32.

In step 906, the FS client, using the data layout, obtains the [SOV, offset]. As discussed above, the data layout provides a mapping between file offsets (e.g., offsets within a file layout (e.g., 502)) and the [SOV, offset] in a SOV (e.g., 520). Accordingly, the FS client translates the [file, offset] into [SOV, offset].

In step 908, the [SOV, offset] is then provided to the memory hypervisor module to process. More specifically, the memory hypervisor module includes the information necessary to generate and issue one or more I/O requests that result in the data being written directly from the client application node (e.g., via a communication interface(s)) to an appropriate location in storage pool. Step 908 is performed in substantially the same manner as step 706 in FIG. 7.

In step 910, the client application node awaits for confirmation from the target node(s) that the I/O request(s) generated and issued in step 906 has been successfully stored on the target node(s). Step 910 is performed in substantially the same manner as step 708 in FIG. 7. The process may stop at step 910 or proceed to step 912 based on the same rationale described with respect to steps 708 and 710.

In step 912, the client application node (in response to the confirmation in step 910) sends a request to commit the data layout to the metadata node. The commit request includes the mapping between the file layout and the file system layout as well as the EDV generated in step 904. Step 912 is performed in substantially the same manner as step 710 in FIG. 7. Upon receipt of the commit request, metadata initiates processing of the commit request issued in Step 912. As discussed above, the processing of the commit request may also trigger the invalidation of prior versions of the data layout that are currently cached on other client application nodes. As discussed above with respect to FIG. 7, there are scenarios in which the data is written to storage pool but the corresponding metadata is not committed to the metadata node. In these scenarios, the EDV may still be maintained in the local memory of the client application node while the underlying data has been written to the storage pool and, as such, is not present on the client application node.

In step 914, the client FS container then notifies the OS that the data has been persisted. The OS may then send the appropriate confirmation and/or notification to the application that initiated the request to persist the data. Step 914 is performed in substantially the same manner as step 712 in FIG. 7.

In step 916, the metadata server (on the metadata node) receives the EDV as part of the commit request. Prior to step 916, the metadata node does not have a copy of the EDV.

In Step 918, the metadata node commits the FSB. Committing the FSB includes storing, by the metadata server, (i) the mapping between the file layout and the file system layout and (ii) storing the EDV with other metadata associated with the FSB. The process then ends.

Figure 10:
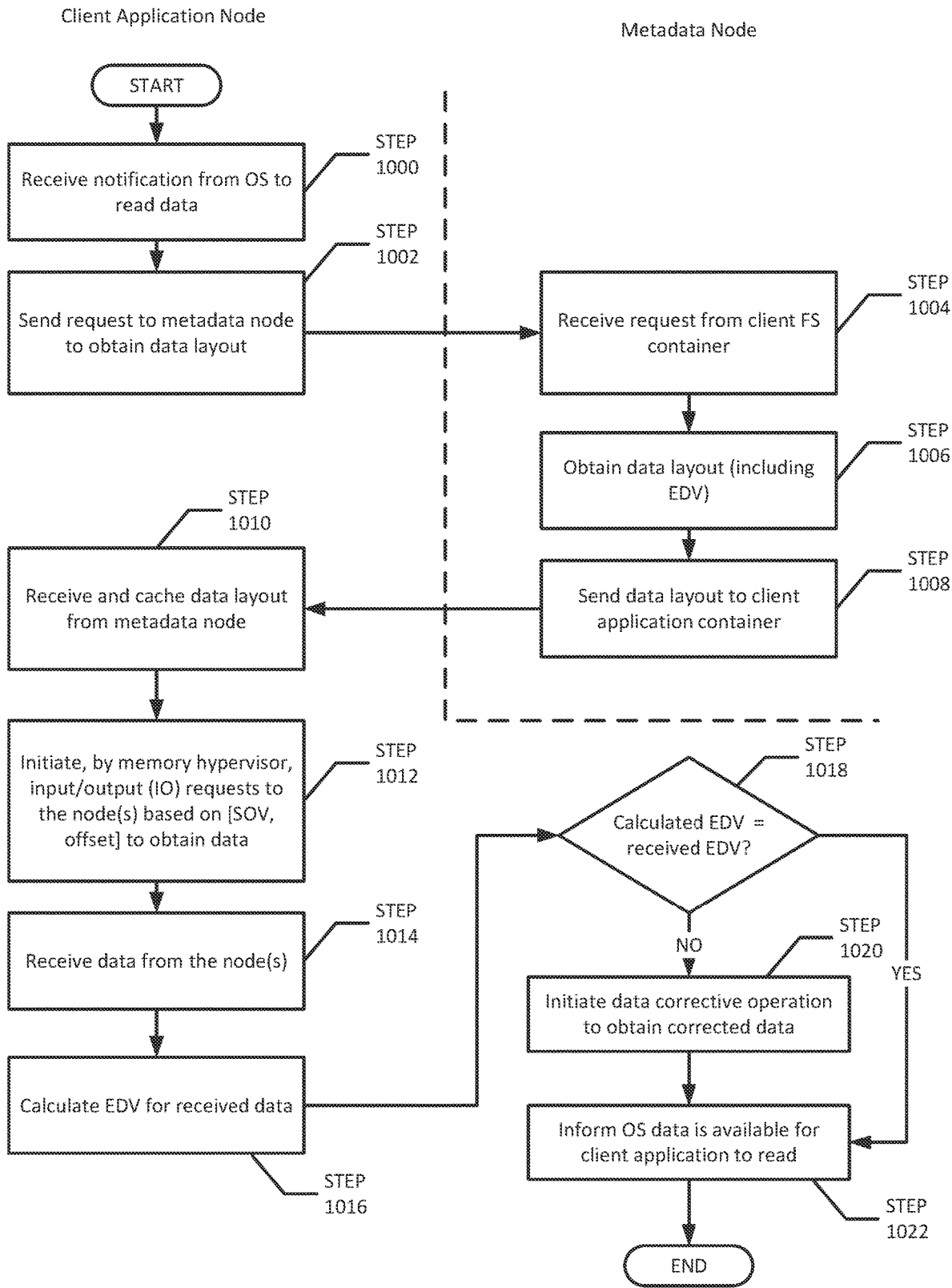
FIG. 10 shows a flowchart of a method of serving a read request using an in-line error detection mechanism in accordance with one or more embodiments of the invention.

FIG. 10 shows a flowchart of a method of serving a read request using an in-line error detection mechanism in accordance with one or more embodiments of the invention. All or a portion of the method shown in FIG. 10 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 10 may be performed whenever an application initially attempts to read previously stored data and triggers a page fault.

In step 1000, the client FS container receives a request from a kernel module to resolve a page fault triggered by a read request from an application, where the request specifies at least one [file, offset] corresponding to the virtual address from the virtual address space of the application. Said another way, the virtual address associated with the page fault is translated into a [file, offset]. The [file, offset] is then sent to the client FS container.

In step 1002, the FS container sends a request to a metadata node to obtain a data layout associated with the [file, offset]. Step 1002 is performed in substantially the same manner as step 602 in FIG. 6.

In step 1004, the metadata node receives the request from the FS client container.

In step 1006, the data layout associated with the [File, Offset] is obtained. The obtained data layout specifies a mapping between the [File, Offset] and corresponding [SOV, Offset] along with an EDV (e.g., a CRC value). The EDV may have been previously stored when the data was written to the storage pool (see e.g., FIG. 9).

In one embodiment of the invention, if the request in step 1002 specifies read only access, then the data layout will include [file, file offset] to [SOV, offset] mappings for the FSBs that include the data that the application (in the client application node) is attempting to read. In one embodiment of the invention, if the request in step 1002 specifies read write access, then then the data layout may include one set of [file, file offset] to [SOV, offset] mappings for the FSBs that include the data that the application (in the client application node) is attempting to read and a second set of [file, file offset] to [SOV, offset] mappings for the FSBs to which the application may write data. The dual set of mappings provided in the aforementioned data layout may be used to support a redirected write, i.e., the application does not overwrite data; rather, all new writes are directed to new FSBs. In the later scenario, the EDV associated with the [SOV, offsets] for writing data is null.

In step 1008, the data layout is sent to the FS client container.

In step 1010, the client application node receives and caches the data layout from the metadata node. The FS client may also create an association between the logical blocks in the file layout (e.g., 502) and the corresponding FSBs in the file system layout (504) based on the data layout.

In one embodiment of the invention, the FS client allocates an appropriate amount of local memory (e.g., local DRAM, local PMEM), which is/will be used to store the requested data when it is received from the storage pool.

Further, the FS client, using the data layout, obtains the [SOV, offset] (e.g., the FS client translates the [file, offset] into [SOV, offset]).

In step 1012, the [SOV, offset] is then provided to the memory hypervisor module to process. More specifically, the memory hypervisor module includes the information necessary to generate and issue one or more I/O requests that result in the data between copied directly (e.g., via a communication interface(s)) from an appropriate location(s) in storage pool to an appropriate location in the local memory on the client application node. For example, if the application is attempting to read data associated with logical block A (e.g., [File B, offset 3], then the memory hypervisor module would be provided with [SOV, offset 1] (which would be determined using the obtained data layout). The memory hypervisor module includes the necessary information to enable it to generate, in this example, one or more I/O requests to specific locations in the storage pool. Said another way, the memory hypervisor module includes functionality to: (i) determine how many I/O requests to generate to read the data associated with [SOV, offset 1]; (ii) determine the target of each I/O request (the physical location in the storage pool at from which data is to be read); and (IV) issue the I/O requests. The issuance of the I/O requests includes initiating the transfer of data from the appropriate location in the storage pool to the appropriate location in the local memory.

The communication interface(s) in the client application node facilitates the direct transfer of the data from the appropriate location(s) in the storage pool to the client application node. As discussed above, the storage pool may include storage media located in memory devices that may be on client application nodes, metadata nodes, and/or storages. Accordingly, for any given I/O request, the communication interface(s) on the client application node receives the data directly from communication interface(s) of the target node (i.e., the node that includes the storage media from which the data is being read).

In step 1014, in response to the I/O requests, the client application nodes receives data from one or more locations in the storage pool and stores the received data in the local memory (i.e., the local memory allocated in step 1010).

In step 1016, once the data has been read from the storage pool and stored in the local memory of the client application node, the client FS container calculates an EDV for the data stored in the local memory.

In step 1018, a determination is made about whether the EDV calculated in step 1016 matches the EDV received in step 1010. If the EDVs match, then the data is valid (i.e., not corrupted) and the proceed proceeds to step 1022; otherwise, the process proceeds to step 1020.

In step 1020, when the data is corrupted, the client application node initiates a rebuilding of the corrupted data. The rebuilding is done in a manner that is transparent to the application (e.g., 212). The specific mechanism to rebuild that corrupted data may vary based on how the data is protected. For example, if the data is protected using a RAID scheme, then one or more pieces of data along with one or more parity values may be used to rebuild the corrupted data. The invention is not limited to using RAID schemes to rebuild the corrupted data. Once the corrupted data is rebuilt, the process proceeds to step 1022.

In step 1022, the client FS container informs the OS (or kernel module in the OS) of the virtual-to-physical address mapping. The virtual-to-physical address mapping is a mapping of a location in the virtual address space and a physical address in the local memory (as allocated in step 1010). Once the aforementioned mapping is provided, the application and/or OS may read the data from the local memory of the client application node (i.e., without processing from the client FS container).

Data Protection

One or more embodiments of the invention support distributed data protection while maintaining the read and write performance of the client application nodes. More specifically, the metadata node includes functionality to: (i) manage the initial setup of the data protection scheme (e.g., the implementation of RAID-5, RAID-6, etc.); (ii) communicate the initial setup of the data protection scheme to the client application nodes; (iii) coordinate the distributed rebuild operations.

The management of the initial setup of the data protection scheme may include, but is not limited to: (i) identifying independent fault domains (described below) in the storage pool, (ii) generating mapped RAID groups using sets of the independent fault domains, where number of independent fault domains in each mapped RAID group is determined based on the specific data protection scheme, e.g., if RAID-6 is being implemented, then six independent fault domains are associated with each mapped RAID group; (iii) the information about the specific data protection scheme being implemented as well as the membership of each of the mapped RAID groups is provided to the client application nodes (e.g., for use by the memory hypervisor modules).

In one or more embodiments of the invention, an independent fault domain is a node or logical grouping of nodes that include storage media that is part of the storage pool (e.g., a client application node, a metadata node, and a storage node) where, when one node of the logical grouping of nodes goes offline and/or otherwise becomes inaccessible, the other nodes in the same logical grouping of nodes are directly affected. However, nodes in a different independent fault domain may be unaffected. For example, the storage pool may include memory devices in a set of six storage nodes, where each storage node is considered to belong to an independent fault domain. In this scenario, the six storage nodes may be associated with a single mapped RAID group.

Each mapped RAID group is associated with (or otherwise mapped to) a set of slices (see e.g., FIG. 5B). Said another way, all data or metadata associated with a given slice is stored in the associated mapped RAID group. For example, if slices A, B and C are associated with mapped RAID group 1 (which, in this example includes six storage nodes), then all data or metadata associated with slices A, B, or C is stored across the six storage nodes. In one embodiment of the invention, each slice associated with a mapped RAID group may be a data slice or a metadata slice.

Figure 11:
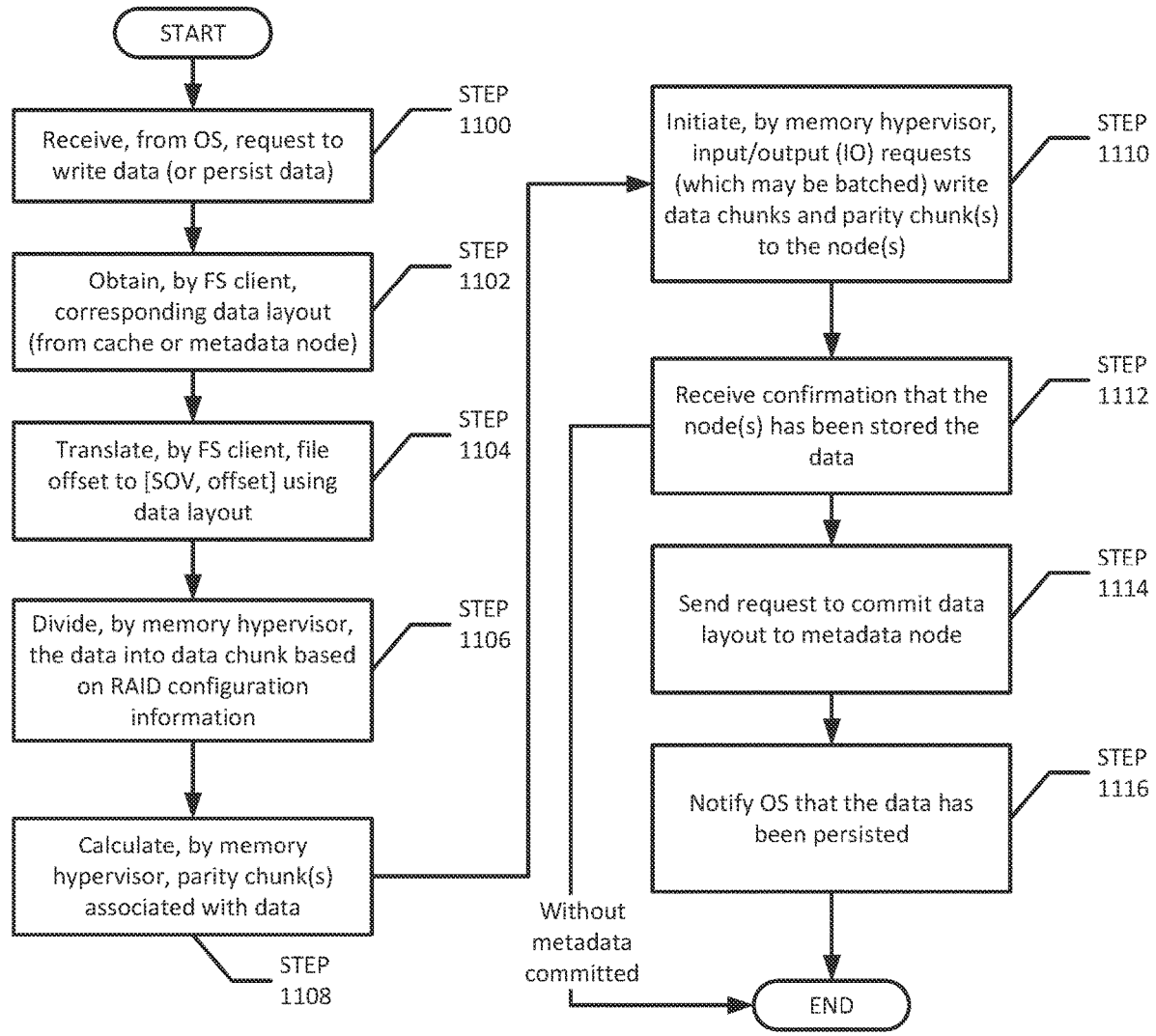
FIG. 11 shows a flowchart of a method of servicing a write request using a data protection scheme in accordance with one or more embodiments of the invention.

FIG. 11 shows a flowchart of a method of servicing a write request using a data protection scheme in accordance with one or more embodiments of the invention. The method shown in FIG. 11 may be performed by the client application node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 11 may be initiated in the same or substantially the same manner the method shown in FIG. 7. Turning to FIG. 11, in step 1100, a request to write data is received by the client FS container from the OS. Step 1100 is performed in substantially the same manner as step 700 in FIG. 7.

In step 1102, the FS client obtains the data layout required to service the request. The data layout may be obtained using the [file, offset] in the request received from the OS. The data layout may be obtained from a cache on the client application node. However, if the data layout is not present on the client application node, e.g., because it was invalidated and, thus, removed from the client application node, then the data layout is obtained from the metadata node in accordance with FIG. 6, steps 602-612.

In step 1104, the FS client, using the data layout, obtains the [SOV, offset]. As discussed above, the data layout provides a mapping between file offsets (e.g., offsets within a file layout (e.g., 502) and the [SOV, offset] in a SOV (e.g., 520). Accordingly, the FS client translates the [file, offset] into [SOV, offset].

In step 1106, the memory hypervisor module, using previously obtained information about the data protection scheme being implemented in the storage pool, divides the data (i.e., the data that is the subject of the request in step 1100) in to an appropriate number of data chunks. For example, if the data is 4K and the RAID protection scheme is RAID-6, then the data is divided into four 1K data chunks.

In step 1108, the memory hypervisor calculates one or more parity values, based on information it has previously received from the metadata node about the data protection scheme being implemented in the storage pool. Continuing with the above example, the memory hypervisor module generates a 1K P-Parity chunk and 1K Q-Parity chunk. At the end of step 1108, the memory hypervisor has six 1K chunks to write to the storage pool (see e.g., FIG. 5B). The aforementioned six 1K chunks may be referred to as stripe. Each 1K chunk needs to be stored in its own independent fault domain within the mapped RAID group. For example, if the mapped RAID group includes six storage nodes, then each storage node would store one of the six 1K chunks.

In step 1110, the memory hypervisor module includes the information necessary to generate and initiate the processing of one I/O request for each of the data and parity chunks. The processing of each of the I/O requests results in the data or parity chunk being written directly from the client application node (e.g., via a communication interface(s)) to an appropriate location in storage pool (as determined based on the data protection information previously obtained from the metadata node).

The communication interface(s) in the client application node facilitates the direct transfer of the data from the client application node to the appropriate location in the storage pool. As discussed above, the storage pool may include storage media located in memory devices that may be on client application nodes, metadata nodes, and/or storages. Accordingly, for any given I/O request, the communication interface(s) on the client application node on which the data resides transmits the data directly to communication interface(s) of the target node (i.e., the node that includes the storage media on which the data is to be persisted).

In step 1112, the client application node awaits for confirmation from the target node(s) that the I/O request(s) generated and issued in step 1110 has been successfully stored on the target node(s). Step 1112 is performed in substantially the same manner as step 708 in FIG. 7. The process may stop at step 1112 or proceed to step 1114 based on the same rationale described with respect to steps 708 and 710.

In step 1114, the client application node (in response to the confirmation in step 1112) sends a request to commit the data layout to the metadata node. The commit request includes the mapping between the file layout and the file system layout. Upon receipt of the commit request, the metadata node processes the commit request. As discussed above, the processing of the commit request may also trigger the invalidation of prior versions of the data layout that are currently cached on other client application nodes. Step 1114 is performed in substantially the same manner as step 710 in FIG. 7.

In step 1116, the client FS container then notifies the OS that the data has been persisted. The OS may then send the appropriate confirmation and/notification to the application that initiated the request to persist the data. Step 1116 is performed in substantially the same manner as step 712 in FIG. 7.

Following the method in FIG. 11, in one embodiment of the invention, the metadata node and/or other nodes in the CSI (e.g., 104) may determine or otherwise detect that one or more of the independent fault domains in a mapped RAID group has failed (i.e., the mapped RAID group is now considered a degraded mapped RAID group). The aforementioned determination may trigger a rebuild operation (see e.g., FIGS. 12A-12B) to rebuild the impacted slices. For example, consider a scenario in which a mapped RAID group is associated with slices A, B, and C and that the mapped RAID group is associated with six storage nodes (storage nodes 1-6), which protect the data (or metadata) in slices A-C using RAID 6. Thus, each 4K portion of data (or metadata) associated with slices A-C is stored as 6K stripe with 4K of data (or metadata) and 2K of parity in the mapped RAID group. Said another way, each of storage nodes 1-6 in the mapped RAID group store 1K of the 6K stripe. If storage nodes 4 and 5 fail, all of the stripes in the mapped RAID group are impacted as the 1K portions of the 6K stripes stored on storage nodes 4 and 5 are no longer available and have to be rebuilt. In this example, slices A-C are considered to be failed slices as a portion of the storage nodes in the mapped RAID group with which the stripes are associated have failed.

Once the failure of the mapped RAID group (or a portion thereof) is determined, a metadata node, in accordance with one or more embodiments of the invention, initiates the rebuilding of the failed slices (also referred to as a rebuild operation) within the degraded mapped RAID group on a distributed per-slice basis. For example, all metadata slices are rebuilt by the metadata node while the rebuilding of the data slices is distributed across various client application nodes. In this manner, the slices are rapidly rebuilt in parallel. While the rebuild operation is being performed, the applications executing on the client application nodes continue to interact with failed slices as if they had not failed. For example, the application may continue to read data in accordance with FIG. 10 and, in the event that a read results in invalid data (e.g., due to the degraded mapped RAID group), then the invalid data may be rebuilt using valid portions of the stripe. Similarly, the client application nodes may continue to attempt to write data to the storage pool in accordance with FIG. 11; however, I/O requests to store data in the failed storage nodes of the degraded mapped RAID group will not be stored.

Figure 12A:
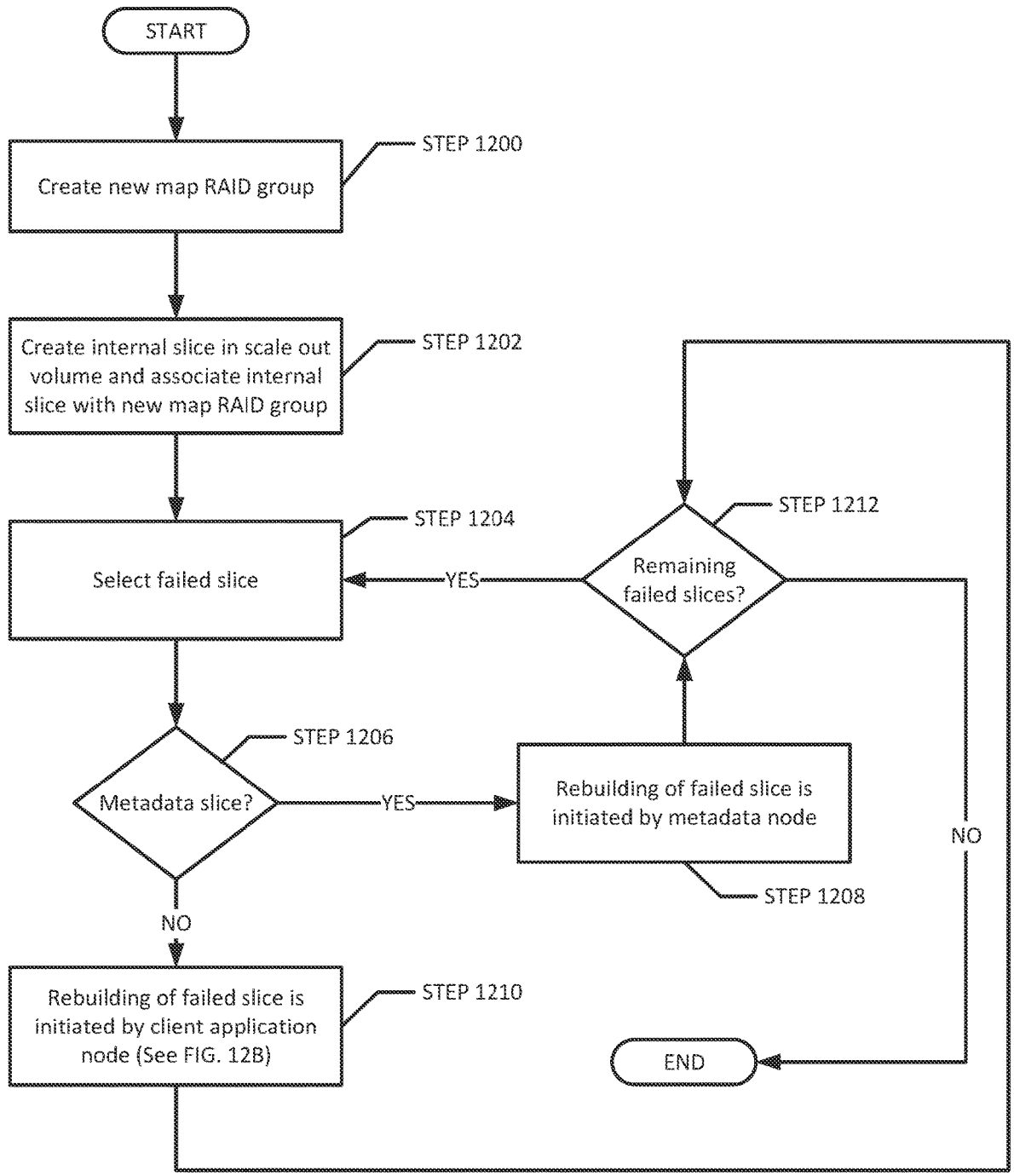
FIGS. 12A-12B show flowcharts of a method of rebuilding metadata and/or data in accordance with one or more embodiments of the invention.
Figure 12B:
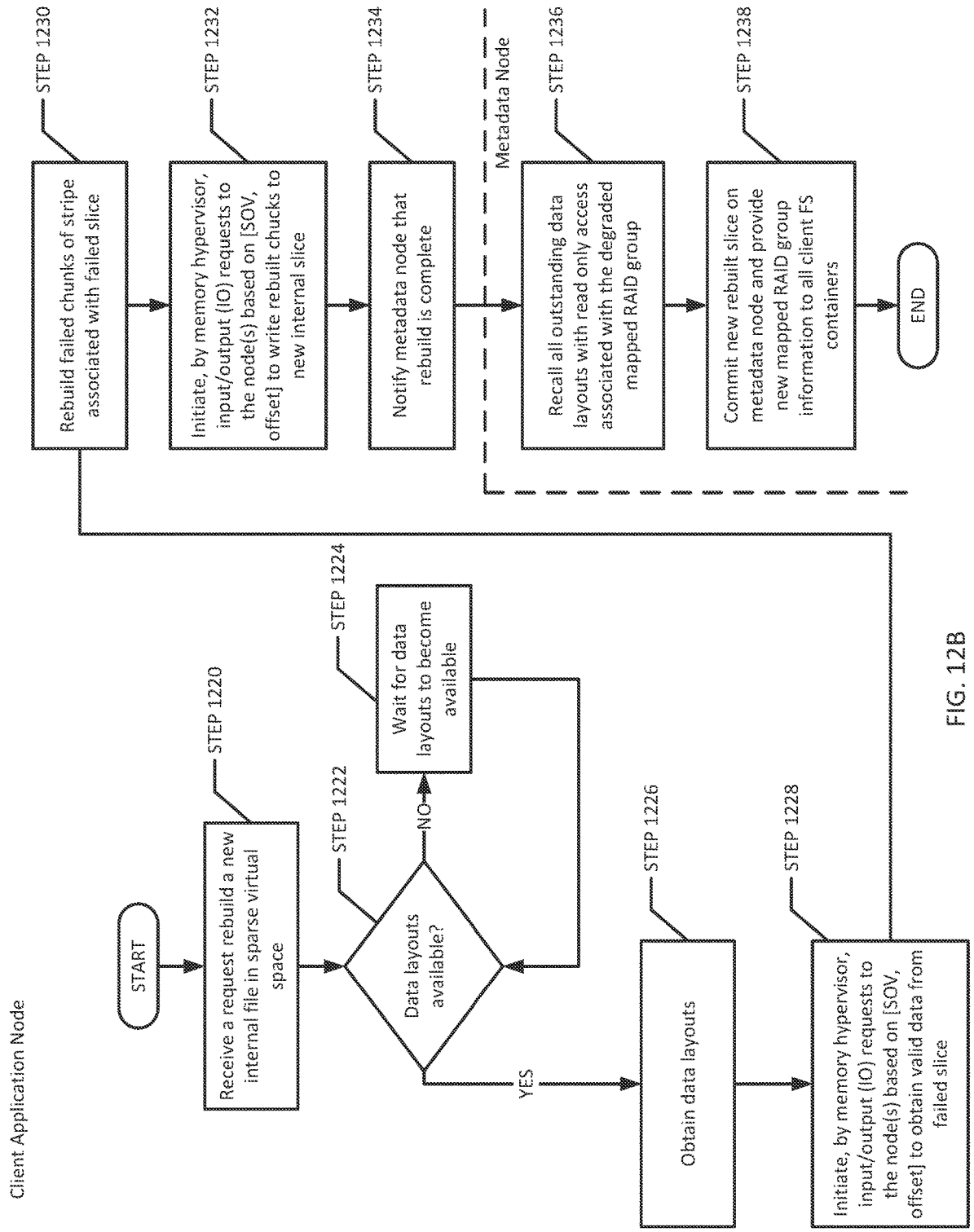

FIGS. 12A-12B show flowcharts of a method of rebuilding metadata and/or data in the degraded mapped RAID groups in accordance with one or more embodiments of the invention. All or a portion of the method shown in FIGS. 12A-12B may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

Referring to FIG. 12A, in step 1200, after the detection of a degraded mapped RAID group, a new mapped RAID group is created by the metadata node. The creation of the new mapped RAID group does not impact the use of the degraded mapped RAID group. Said another way, after step 1200, there will be both the degraded mapped RAID group and the new mapped RAID group, where the new mapped RAID group and degraded mapped RAID group may have a set of common members. For example, the degraded mapped RAID group may include storage nodes 1-6, where storage nodes 4 and 5 have failed. The new mapped RAID group may include storage nodes 1-3, 19-20, and 6, where storage nodes 19 and 20 are new storage nodes (or previously unused storage nodes) that are being used to replace failed storage nodes 4 and 5. The metadata server may keep track of new and/or unused storage nodes for use in new mapped RAID groups.

In step 1202, a new internal slice is created by the metadata node and associated with: (i) a new set of FSBs from the sparse virtual space and (ii) the new mapped RAID group. For example, the failed slice A is mapped to degraded mapped RAID group A, which includes storage nodes 1-6. The new internal slice A' is mapped to new mapped RAID group A', which includes storages node 1-4, 19, 20, and 6. Thus, data (or metadata) written to the new mapped RAID group A' would be written as a 6K stripe (four 1K data chunks and two 1K parity chunks) across storage nodes 1-4, 19, 20, and 6. As will be discussed below, the creation of the internal file (which is not known to the applications executing on the client application nodes) allows the rebuild operation to take advantage of the file locking mechanism to temporarily prevent writes to FSBs associated with the degraded mapped RAID group while the data (or metadata) in the degraded mapped RAID group is read as part of the rebuilding operation.

Continuing with the discussion of FIG. 12A, in step 1204, a failed slice to rebuild is selected by the metadata node. The failed slice may be a metadata slice or a data slice. The method shown in FIG. 12A focuses on only rebuilding the failed slices (which the metadata node tracks).

In step 1206, a determination is made about whether the selected failed slice is a metadata slice. If the failed slice is a metadata slice, the method proceeds to step 1208; otherwise, the method proceeds to step 1210.

In step 1208, the rebuilding of the failed metadata slice is initiated by the metadata node (discussed below in relation to FIG. 12B). In step 1210, the rebuilding of the failed data slice is initiated on a client application node (see e.g., FIG. 12B). The metadata node may select any client application node to rebuild the data slice. Further, the metadata node tracks which client applications are rebuilding which data slices so that it can distribute the rebuilding of the failed data slices across multiple client application nodes.

In step 1212, a determination is made about whether there are any other failed slices that need to be rebuilt (i.e., failed slices that are not rebuilt or in the process of being rebuilt). If there are any other failed slices that need to be rebuilt, the process proceeds to step 1204; otherwise the process ends. The process shown in FIG. 12A initiates the distributed rebuilding of the failed metadata and data slices. Thus, one or more instances of the methods shown in FIG. 12B may be performed in parallel by one or more client application nodes and/or metadata nodes.

Referring to FIG. 12B, FIG. 12B shows a method for rebuilding a data slice in accordance with one or more embodiments of the invention.

As discussed above, when a client application node receives a data layout with read write access, the metadata server may block any other client application nodes from requesting read write access to the same data layout. In this manner, only one client application node is manipulating the data associated with a given data layout. Similarly, when rebuilding a new internal slice using contents of a failed slice, the client application node that is performing the rebuild operation needs to access both the data layouts associated with the failed slice and data layouts associated with the new internal slice. However, the client application node does not have any understanding of the concept of a slice; rather, the client application node only understands the concept of files. Accordingly, the metadata node creates the new internal slice and then creates a new internal file (out of the sparse virtual space) that is the same size as the new internal slice. This new internal file is then provided to the client application node to facilitate the rebuilding of the client application node.

More specifically, turning to FIG. 12B, in step 1220, a client application node receives a request to initiate the rebuilding of a new internal file with contents from source file (i.e., a file that corresponds to the failed slice). While the client FS container is aware of the new internal file, the applications executing in the application container are not aware of the new internal file.

In step 1222, a determination is made about whether the data layouts for the source file and the new internal file are available. This determination is made by sending a request to the metadata node and awaiting a response. In step 1224, if the data layouts for all FSBs in the source file and the new internal file are not available, then the client application waits until such time as it receives the requested data layouts. The data layouts associated with specific FSBs may not be available if any client application node in the CSI (e.g., 104) has previously requested a data layout with read write access to such FSBs.

In step 1226, when the requested data layouts are available for the source file and the new internal file, the data layouts (e.g., with read write access) are received or otherwise obtained from the metadata node. Once the data layouts are obtained, no client application nodes may obtain the data layouts associated with the source file or the new internal file until the method shown in FIG. 12B is completed. In one or more embodiments of the invention, the metadata node may permit client application nodes to continue to obtain read only access to data layouts associated with the source file while other steps in FIG. 12B are being performed.

The FS client, using the data layouts, obtains the [SOV, offset](s) for the entire source file and, in step 1228, the [SOV, offset]s are then provided to the memory hypervisor module to process. More specifically, the memory hypervisor module includes the information necessary to generate and issue one or more I/O requests that result in the data being copied directly (e.g., via a communication interface(s)) from an appropriate location(s) in storage pool to an appropriate location in the local memory on the client application node. For example, if the failed slice is made up of a set of 4K segments and the 4K segments are protected using RAID6, then each stripe is 6K with four 1K data chunks and two 1K parity chunks. If the degraded mapped RAID group included six storage nodes (1-6) and storage nodes 3 and 4 failed, then the memory hypervisor generates four I/O requests for each 4K segment in the failed slice, i.e., one 1K I/O request to each the operating storage nodes in the degraded mapped RAID group. The issuance of the I/O requests for all 4K segments includes initiating the transfer of data from the appropriate location in the storage pool to the appropriate location in the local memory.

The information regarding which nodes in a given degraded mapped RAID group have failed is provided to the memory hypervisor by the metadata node to enable the memory hypervisor module to generate and issue the aforementioned I/O requests.

The communication interface(s) in the client application node facilitates the direct transfer of the data from the appropriate location(s) in the storage pool to the client application node. As discussed above, the storage pool may include storage media located in memory devices that may be on client application nodes, metadata nodes, and/or storages. Accordingly, for any given I/O request, the communication interface(s) on the client application node receives the data directly from communication interface(s) of the target node (i.e., the node that includes the storage media from which the data is being read).

In step 1230, once the data requested in the aforementioned I/O requests is obtained by the client application nodes, the data or parity values that were on the failed nodes (e.g., failed storage nodes) are rebuilt in accordance with the appropriate data protection schemes (e.g., RAID 5, RAID 6, etc.). Continuing with the example from step 1226, assuming that the failed storage node 4 stored a 1K data chunk and failed storage node 5 stored a 1K P parity chunk, then in step 1230 a new data chunk (corresponding to the data chunk previously stored on failed storage node 4) is generated and a new 1K P parity chunk (corresponding to the data chunk previously stored on failed storage node 5) is generated.

In step 1232, the memory hypervisor module includes the information necessary to generate and initiate the processing of one I/O request for each of the rebuilt data and parity chunks. The processing of each of the I/O requests results in the rebuilt data or parity chunk being written directly from the client application node (e.g., via a communication interface(s)) to an appropriate location in storage pool (as determined based on the data protection information previously obtained from the metadata node).

The communication interface(s) in the client application node facilitates the direct transfer of the data from the client application node to the appropriate location in the storage pool. As discussed above, the storage pool may include storage media located in memory devices that may be on client application nodes, metadata nodes, and/or storages. Accordingly, for any given I/O request, the communication interface(s) on the client application node on which the data resides transmits the data directly to communication interface(s) of the target node (i.e., the node that includes the storage media on which the data is to be persisted). Continuing with the example from step 1232, the new data chunk is written to storage node 19 and the new 1K P parity chunk is written to storage node 20.

In step 1234, the client FS container notifies the metadata node that the rebuild of the new internal file is complete. The notification may be issued after the client application node receives confirmation from the target node(s) that the I/O request(s) generated and issued in step 1232 have been successfully stored on the target node(s).

In step 1236, upon receipt of the notification from step 1234, the metadata node confirms that no client application nodes are currently using any data layouts associated with the degraded mapped RAID group (e.g., the metadata node performs a recall operation). As discussed above, in step 1226 after the data layouts were obtained, no other client application node is permitted to obtain these data layouts with read write access; however, client application nodes may still obtain data layouts with read only access. In Step 1236 a determination is made about whether any such data layouts with read only access exist. If such data layouts with read only access exists, the metadata node may take steps invalidate such data layouts on client application nodes.

In step 1238, the rebuilt slice (which corresponds to the rebuilt internal file) is committed to the metadata node and information (e.g., RAID stripe geometry and any other information required for the memory hypervisor module to read and write data to the new mapped RAID group) about the new mapped RAID group is provided to some or all of the client FS containers for use by the memory hypervisor modules. In one embodiment of the invention, committing the new mapped RAID group includes updating the mapping between the corresponding file layouts (i.e., the logical blocks in the file layout) to the FSBs associated with the rebuilt slice. Further, the FSBs associated with the failed slice are freed from the sparse virtual space. The method shown in FIG. 12B allows for the failed slices to be rebuilt in parallel and for rebuilt slices to be atomically committed to the metadata node.

Returning back to step 1208 in FIG. 12A, the rebuilding of metadata slices is performed in substantially the same manner as the method shown in FIG. 12B except that processing of all steps are performed by the metadata node (instead a combination of the client application node and the metadata node).

The example(s) used in the description of FIGS. 12A-12B are not intended to limit the scope of the invention.

Data Security

In one or more embodiments of the invention, the CSI (e.g., 104) supports end-to-end data security. The data security includes encrypting the data (including metadata) at rest in the storage pool and using an encryption key scheme to limit which encryption keys are used with which portions of data (including metadata). The CSI may implement data security using either a symmetric or an asymmetric key scheme. In a symmetric key scheme, the same key is used for encryption and decryption; while in an asymmetric key scheme there is an encryption-decryption key pair, where the encryption key is used to encrypt data and the corresponding decryption key is used to decrypt data. An example of an asymmetric key system is a public key encryption (i.e., an encryption system that includes a public key and a private key).

In one embodiment of the invention, all metadata in the file system (e.g., data in the metadata portion of the sparse virtual space (512)) is encrypted using a static encryption key (or encryption-decryption key pair) (hereafter referred to as a "metadata key"). In one embodiment of the invention, data in the file system (e.g., data in the data portion of the sparse virtual space (510)) is encrypted using a per-snapshot static encryption key (or encryption-decryption key pair) (hereafter referred to as a "per-snapshot data key"). More specifically, the metadata server may periodically take snapshots of the sparse virtual space (510). A snapshot represents the state of the sparse virtual space (510) at a particular point in time (i.e., the time at which the snapshot was taken). For example, at time T=0 all data is encrypted using per-snapshot data key 0 (PSDK0). At T=1, a snapshot (SS1) is taken for the sparse virtual space. The data that is part of SS1 is encrypted using PSDK0. After the SS1 is obtained, new data may be written to the data portion of the sparse virtual space, and this data will be encrypted using PSDK1. PSDK1 will continue to be used as the PSDK until the next SS (e.g., SS2) is taken for the sparse virtual space. After the SS2 is obtained, new data may be written to the data portion of the sparse virtual space, and this data will be encrypted using PSDK2.

The metadata server maintains the metadata key as well as all of the PDSKs. Further, each of the aforementioned keys is identified using a corresponding encryption key identifier (EKI). This EKI is used to track which FSBs are associated with each FSB. In one embodiment of the invention, the metadata server and/or the file system maintains a relationship between the FSB-EKI to enable metadata node and the client application nodes encrypt data prior to it being stored in the storage pool and/or to decrypt data that is obtained from the storage pool.

Additional details about various embodiments of data protection are provided below in FIGS. 13-14.

FIG. 13 shows a flowchart of a method of serving a write request using an encryption mechanism in accordance with one or more embodiments of the invention. The method shown in FIG. 13 illustrates an embodiment in which data security and in-line deduplication are both implemented; however, the data security features may be used without in-line deduplication without departing from the invention. All or a portion of the method shown in FIG. 13 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 13 may be initiated in the same or substantially the same manner the method shown in FIG. 7. Turning to FIG. 13, in step 1300, a request to write data is received by the client FS container from the OS. Step 1300 is performed in substantially the same manner as step 700 in FIG. 7.

In step 1302, the FS client obtains the data layout required to service the request. The data layout may be obtained using the [file, offset] in the request received from the OS. The data layout may be obtained from a cache on the client application node. However, if the data layout is not present on the client application node, e.g., because it was invalidated and, thus, removed from the client application node, then the data layout is obtained from the metadata node in accordance with FIG. 6, steps 602-612. The data layout includes the appropriate data key (i.e., a PSDK) that will be used to encrypt the data prior to it being written to the storage pool.

In step 1304, the FS client calculates a fingerprint for the data (i.e., the data that is specified in the request to write data) and locally stores the fingerprint, e.g., in local memory. Step 1304 is performed in substantially the same manner as step 804 in FIG. 8.

In step 1306, the FS client encrypts the data using the data key to obtain encrypted data and locally stores the encrypted data, e.g., in local memory.

In step 1308, the FS client, using the data layout, obtains the SOV offset.

In step 1310, the [SOV, offset] is then provided to the memory hypervisor module to process. More specifically, the memory hypervisor module includes the information necessary to generate and issue one or more I/O requests that result in the encrypted data being written directly from the client application node (e.g., via a communication interface(s)) to an appropriate location in storage pool. Step 1310 is performed in substantially the same manner as step 706 in FIG. 7.

In step 1312, the client application node awaits for confirmation from the target node(s) that the I/O request(s) generated and issued in step 1310 has been successfully stored on the target node(s). Step 1312 is performed in substantially the same manner as step 708 in FIG. 7. The process may stop at step 1312 or proceed to step 1314 based on the same rationale described with respect to steps 708 and 710.

In step 1314, the client application node (in response to the confirmation in step 1312) sends a request to commit the data layout to the metadata node. The commit request includes the mapping between the file layout and the file system layout as well as the fingerprint generated in step 1304 and the EKI for the data key used to encrypt the data. Upon receipt of the commit request, metadata initiates processing of the commit request in Step 1318. As discussed above, the processing of the commit request may also trigger the invalidation of prior versions of the data layout that are currently cached on other client application nodes. Step 1314 is performed in substantially the same manner as step 710 in FIG. 7. As discussed above with respect to FIG. 7, there are scenarios in which the data is written to storage pool but the corresponding metadata is not committed to the metadata node. In these scenarios, the fingerprint and the EKI may still be maintained in the local memory of the client application node while the underlying encrypted data has been written to the storage pool and, as such, is not present on the client application node.

In step 1316, the client FS container then notifies the OS that the data has been persisted. The OS may then send the appropriate confirmation and/or notification to the application that initiated the request to persist the data. Step 1316 occurs regardless of the result of the processing by the metadata node in steps 1318-1324. Said another way, the deduplication processing of the metadata node is done in a manner that is transparent to the client application nodes. From the client application node's perspective, the data has successfully been written to the appropriate location in the storage pool (i.e., the location determined by the memory hypervisor module)

Turning to the processing by the metadata node, in step 1318, the metadata server (on the metadata node) receives the fingerprint as part of the commit request.

In step 1320, the metadata server determines whether the fingerprint is currently present on the metadata server. Step 1320 is performed in a manner that is substantially similar to step 818 in FIG. 8. If the fingerprint is present, then the data may be deduplicated and the process proceeds to step 1322; otherwise, the process proceeds to step 1324.

In step 1322, the data may be deduplicated in a manner substantially similar to step 820 in FIG. 8. The process then ends.

In step 1324, when the data may not be deduplicated, the fingerprint provided in Step 1318 is stored in the aforementioned data structure on the metadata server and the metadata node commits the FSB. Step 1324 is performed in substantially the same manner as step 822 in FIG. 8. The process then ends.

FIG. 14 shows a flowchart of a method of serving a read request using an encryption mechanism in accordance with one or more embodiments of the invention. All or a portion of the method shown in FIG. 14 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 1400, the client FS container receives a request from a kernel module to resolve a page fault triggered by a read request from an application. Step 1400 is performed in substantially the same manner as step 1000 in FIG. 10.

In step 1402, the FS container sends a request to a metadata node to obtain a data layout associated with the [file, offset]. Step 1402 is performed in substantially the same manner as step 1002 in FIG. 10.

In step 1404, the metadata node receives the request from the FS client container.

In step 1406, the data layout associated with the [File, Offset] is obtained. The obtained data layout specifies a mapping between the [File, Offset] and corresponding [SOV, Offset] and includes the data key(s) and corresponding EKI(s).

In one embodiment of the invention, if the request in step 1406 specifies read only access, then the data layout will include [file, file offset] to [SOV, offset] mappings for the FSBs that include the data that the application (in the client application node) is attempting to read along with a single data key (i.e., the appropriate PSDK) to decrypt the data. In one embodiment of the invention, if the request in step 1406 specifies read write access, then then the data layout may include one set of [file, file offset] to [SOV, offset] mappings for the FSBs that include the data that the application (in the client application node) is attempting to read and a second set of [file, file offset] to [SOV, offset] mappings for the FSBs to which the application may write data. The dual set of mappings provided in the aforementioned data layout may be used to support a redirected write. In this scenario, the data layout includes the data key required to decrypt the data that is to be read and another data key to be used to write the data. If the no snapshot has been created since the last time the data was written to the storage pool, then the only one data key may be provided as the same data key (i.e., the same PSDK) may be used for both reading previously encrypted data and encrypting new data prior to it being persisted.

In step 1408, the data layout is sent to the FS client container.

In step 1410, the client application node receives and caches the data layout from the metadata node. The FS client may also create an association between the logical blocks in the file layout (e.g., 502) and the corresponding FSBs in the file system layout (504) based on the data layout.

In one embodiment of the invention, the FS client allocates an appropriate amount of local memory (e.g., local DRAM, local PMEM), which is/will be used to store the requested data when it is received from the storage pool Further, the FS client, using the data layout, obtains the [SOV, offset]. As discussed above, the data layout provides a mapping between file offsets (e.g., offsets within a file layout (e.g., 502)) and the [SOV, offset] s in a SOV (e.g., 520). Accordingly, the FS client translates the [file, offset] into [SOV, offset].

In step 1412, the [SOV, offset] is then provided to the memory hypervisor module to process. More specifically, the memory hypervisor module includes the information necessary to generate and issue one or more I/O requests that result in the data being copied directly (e.g., via a communication interface(s)) from an appropriate location(s) in storage pool to an appropriate location in the local memory on the client application node. Step 1412 is performed in substantially the same manner as step 1012 in FIG. 10.

In step 1414, in response to the I/O requests, the client application nodes receives data from one or more locations in the storage pool and stores the received data in the local memory (i.e., the local memory allocated in step 1410).

In step 1416, once all the data is retrieved and stored in the local memory, the retrieved data is decrypted using the appropriate data key to obtain the decrypted data (which replaces the encrypted data stored in the local memory).

In step 1418, the client FS container informs the OS (or kernel module in the OS) of the virtual-to-physical address mapping. The virtual-to-physical address mapping is a mapping of a location in the virtual address space and a physical address in the local memory (as allocated in step 1410). Once the aforementioned mapping is provided, the application and/or OS may read the data from the local memory of the client application node (i.e., without processing from the client FS container).

Transparent Storage Tiering

In one or more embodiments of the invention, the CSI (e.g., 104) enables tiering of data (and metadata) in a manner that is transparent to the applications executing on the client nodes. Tiering corresponds to the ability for data (or metadata) to be stored in different types of storage media within the storage pool, where the different types of storage media have different properties. Each of the different types of storage media may be logical grouped into its own SOV. For example, if the storage pool includes three types of storage media—PMEM, NVMe devices, and Computational Storage, then each of then the storage pool may include three distinct SOVs, e.g., one per type of storage media. Each of these SOVs may be logically divided into slice, which are then mapped to FSBs in the sparse virtual space (see e.g., FIG. 5B). Further, the metadata node may track which FSBs (and/or slices) are associated with each type of storage media.

By supporting multiple types of storage media, the metadata node may then optimize the storage of data and/or metadata on the appropriate type of storage media. For example, important data (or metadata) (from the perspective of the metadata node and/or the client application node) or data (or metadata) that is frequently accessed may be stored in PMEM. Further, data (or metadata) of lower importance (from the perspective of the metadata node and/or the client application node) and/or that is less frequently accessed (relative to data (or metadata) stored in PMEM) may be stored in NVMe devices. Finally, data (or metadata) that is not frequently accessed may be stored in computational storage.

In one embodiment of the invention, the metadata node associates each type of storage media with a QoS tag and then associates these QoS tags with appropriate elements (e.g., the FS root, directories (dir), files, etc.) in the logical hierarchy of the file system (304). This information may be used by the metadata server to derive the QoS that is associated with a given piece of data (or metadata) without requiring the metadata server to maintain a granular mapping of which FSBs in the sparse virtual space are associated with which QoS tag. This information may then be used to allocate an appropriate FSB (i.e., an FSB that is associated with a segment of a slice in the SOV that corresponds to the derived QoS for the element). 15A-15B show a non-limiting example of how the metadata node maps the QoS tags in the logical hierarchy of the file system to specific segments in the appropriate slices in a SOV with the corresponding QoS (i.e., the QoS that matches the derived QoS for the element).

Turning to FIG. 15A, consider a scenario in which the storage pool includes three different types of storage media (Type 1, Type 2, Type 3), each associated with a different QoS (i.e., Type 1—QoS 1, Type 2—QoS 2, Type 3 QoS 3). Each of these types of storage media is associated with its own SOV—namely, SOV1 (1506) is only associated with Type 1 storage devices, SOV2 (1508) is only associated with Type 2 storage devices, and SOV3 (1510) is only associated with Type 3 storage devices. Further, each of the SOVs is divided into slices and the segments of the slice are mapped to FSBs in a sparse virtual space (1500). In this example, SOV1 (1506) includes slices A and B, with FSB 1 and FSB 2 each mapped to a distinct segment in slice A, and FSB 5 mapped to a distinct segment in slice B. Further, SOV2 (1508) includes slices C and D, with FSB 3 and FSB 4 each mapped to a distinct segment in slice C and FSB 6 and FSB 10 each mapped to a distinct segment in slice D. Finally, SOV3 (1510) includes slices E and F, with FSB 7 and FSB 8 each mapped to a distinct segment in slice E, and FSB 9 mapped to a segment in slice F. The metadata node includes one or more data structures to track all of the aforementioned information.

Turning to FIG. 15B, as discussed above, the metadata node maintains a data structure(s) that represent the logical hierarchy of the file system. An example of a logical hierarchy is shown in FIG. 15B, which represents the logical hierarchy as a hierarchical block tree (HBT). The root of the HBT is the FS root. The root and all elements (represented by blocks in the HBT) that are not leaf blocks in the HBT (e.g., "Dir") correspond to metadata. The leaf blocks in the HBT (e.g., "File") correspond to data. When the metadata is persistently stored in the sparse virtual space, it is stored in FSBs selected from the metadata portion (1502) and data stored in the sparse virtual space is stored in FSBs selected from the data portion (1504).

Each block in the HBT may (but is not required to) be associated with a QoS tag. If a block is associated with a QoS tag, then data (or metadata) associated with that block is associated with the QoS tag. Further, all blocks in the HBT that are connected to and below the block in the HBT and also do not have their own QoS tag implicitly have the aforementioned QoS Tag. For example, the FS root has a QoS tag of "QoS1 Tag". Accordingly, FS root, Dir 1 Dir 2, Dir 5, File 3 and File 4 are associated with QoS 1 Tag, which denotes that the data or metadata associated with the aforementioned elements should be stored in an FSB that are: (i) located in the appropriate portion of the sparse virtual space (e.g., 1502, 1504) and (ii) associated with a slice from the SOV associated with QoS 1 (e.g., slice A, slice B in FIG. 15A). Further, while the block associated with Dir 4 is below the FS root, it has an explicitly specified tag—"QoS2 Tag". Accordingly, Dir 2, File 1 and File 2 are associated with QoS 2Tag, which denotes that the data or metadata associated with the aforementioned elements should be stored in an FSB that are: (i) located in the appropriate portion of the sparse virtual space (e.g., 1502, 1504) and (ii) associated with a slice from the SOV associated with QoS 2 (e.g., slice C, slice D in FIG. 15A). Finally, while the blocks associated with File 5, and File 6 are below the FS root, they each have an explicitly specified tag—"QoS3 Tag". Accordingly, Dir 3, File 5, and File 6 are associated with QoS 3 Tag, which denotes that the data associated with the aforementioned elements should be stored in an FSB that are: (i) located in the appropriate portion of the sparse virtual space (e.g., 1502, 1504) and (ii) associated with a slice from the SOV associated with QoS 3 (e.g., slice E, slice F in FIG. 15A).

While the aforementioned relationships and/or mappings described above and shown in FIGS. 15A-15B are known to the metadata node, these mappings are not known to the client application nodes. Rather, the client application nodes interact with the metadata node and the storage nodes without any knowledge of the aforementioned storage tiering. However, the metadata node ensures that the data written by the client application nodes is stored in storage media in the storage pool with the appropriate QoS by providing the client application nodes with the data layouts that ultimately direct the client application nodes to write the data to the appropriate storage media in the storage pool. FIG. 16 shows an example of how the metadata node provides the appropriate data layout to the client application nodes to transparently implement storage tiering.

Turning to FIG. 16, FIG. 16 shows a flowchart of a method of generating and servicing a mapping request in accordance with one or more embodiments of the invention. All or a portion of the method shown in FIG. 16 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 16 may be performed under the substantially the same conditions as described above with respect to FIG. 6.

In step 1600, the client FS container receives a request from a kernel module to resolve a page fault. Step 1600 is performed in substantially the same manner as step 600 in FIG. 6.

In step 1602, the FS container sends a request to a metadata node to obtain a data layout associated with the [file, offset]. Step 1600 is performed in substantially the same manner as step 600 in FIG. 6.

In step 1604, the metadata node receives the request from the FS client container.

In step 1606, the metadata node determines the element within the file system to which the data layout request corresponds and then determines, e.g., by evaluating the HBT (as described above), the appropriate QoS.

In step 1608, in response to the request, the metadata server (on the metadata node) identifies one or more FSBs in the sparse virtual space. The FSBs are selected from the appropriate portion of the sparse virtual space (i.e., from the metadata portion or the data portion) and from FSBs that are associated with a SOV that has the same QoS as determined in step 1606.

In step 1610, the metadata server generates a data layout. Step 1610 is performed in manner substantially similar to step 608 in FIG. 6.

In step 1612, the data layout is sent to the FS client container. Step 1612 is performed in manner substantially similar to step 610 in FIG. 6.

In step 1614, the client application node receives and caches the data layout from the metadata node. Step 1614 is performed in manner substantially similar to step 612 in FIG. 6.

In step 1616, the client FS container informs the OS (or kernel module in the OS) of the virtual-to-physical address mapping. Once the aforementioned mapping is provided, the application and/or OS may directly manipulate the local memory of the client application node (i.e., without processing from the client FS container). More specifically, once the method shown in FIG. 16 has been performed, the application may directly read and write data to the local memory of a client application node. When the application wants to persist the data, it may perform the method shown in FIGS. 7, 9, 11, and/or 13 to persist the data to a location in the storage pool that has the storage type associated with the QoS (i.e., the QoS determined in Step 1610).

While data (or metadata) may be initially stored in a given type of storage (as determined in FIG. 16), it may be subsequently migrated to a higher or lower type of storage based on how the data (or metadata) is being used. The determination about whether to migrate the data and the subsequent migration may be managed by the metadata node (using any known or later developed migration policy) thereby not impacting the performance of the client application nodes.

For example, consider a scenario in which data is initially stored in a PMEM device. The metadata node may determine, based on a migration policy, that the data has not been accessed in some time and, as such, that it needs to migrated to a lower tier (e.g., NVMe (QLC) device, computation storage or cloud storage). Once this determination is made, the metadata server: (i) identifies a new location in the storage pool to which to migrate the data and (ii) either manages the migration directly by reading data from the current location and writing data to the new location in the storage pool or instructs the node on which the data to be migrated is located to copy the data to the node that includes the new location.

As an example for tiering out of PMEM to NVMe (QLC), the metadata node may coalescing writes that have taken place across a wide range of files in PMEM and relocate them to a RAID6 protected NVMe (QLC) by issuing a large logged writes (e.g., 512K to 4 MB in size) to be optimized with respect to the RAID processing and also to impose the least possible burden on NVMe (QLC) devices.

As discussed above, one or more embodiments of the invention implement redirected writes (see e.g., FIG. 6), thereby enabling the CSI (104) to concurrently process writes that result in data being directly stored on PMEM devices and then, using the migration policy, transfer the data that was written to the PMEM devices to NVMe (QLC) using logged writes. Further, the aforementioned architecture enables the metadata node to provide data layouts to the client application nodes to enable the client application node to service read requests from either the PMEM device or the NVMe (QLC) devices (or from any other storage media).

Once the migration is completed, one or more mappings maintained by the metadata node (e.g., FIGS. 5A-5B) are updated to reflect the new location of the migrated data. The background migration of data may be performed in manner that is substantially similar to the manner in which the metadata server manages the RAID rebuild operations (see e.g., FIGS. 12A-12B).

In one embodiment of the invention, if the data (or metadata) is stored in computational storage, then the data (or metadata) may be, e.g., compressed prior to it being stored where the compression is performed directly on the computational storage device prior to storing the data and in a manner that is transparent to the client application nodes. Further, because the data is compressed on the computational storage, the write performance on the client application node is not impacted.

In one embodiment of the invention, the migration policy may result in data stored in the PMEM or NVMe devices being de-staged (or migrated) to a cloud storage (which may be an object store). In this scenario, this scenario, each file that is to be moved is associated with an object identifier (OD) (which is recorded by the metadata node) and then file (as an object) is uploaded to the cloud storage. If there is a subsequent read of the file, the metadata node will locate the file in the object store using the OID and then initiate the copying of the file to the appropriate location in the storage pool based on, e.g., the storage tiering policy being implemented (see e.g., FIG. 15A-15B). Further, if there is a write request directed to the file, because the CSI (104) implements redirected writes (see e.g., FIG. 6), then the client application node may write data for a file to an appropriate location in the storage pool based on, e.g., the storage tiering policy being implemented (see e.g., FIG. 15A-15B) while the metadata node is copying the prior version of the file from the cloud storage into another location in the storage pool.

Offloading Processing of the Client FS Container

In one or more embodiments of the invention, the performance of the client application node (e.g., 200) may be improved by taking advantage of one or more offload components. More specifically, the hardware layer (e.g., 212) of the client application node may be augmented to include one or more offload components, where each of these offload components includes functionality to execute one or more client FS containers (e.g., 206). The offload components (examples of which are described below in FIGS. 17A-17C) include compute, storage, and communication interfaces necessary to perform all or substantially all of the functions that are provided by the hardware layer (212) in the non-modified client application nodes (e.g., 200). The use of the offload components enables scaling of the hardware resources on the client application nodes, which then enables the client application nodes to provide additional compute functionality to the CSI (104).

Figure 17A:
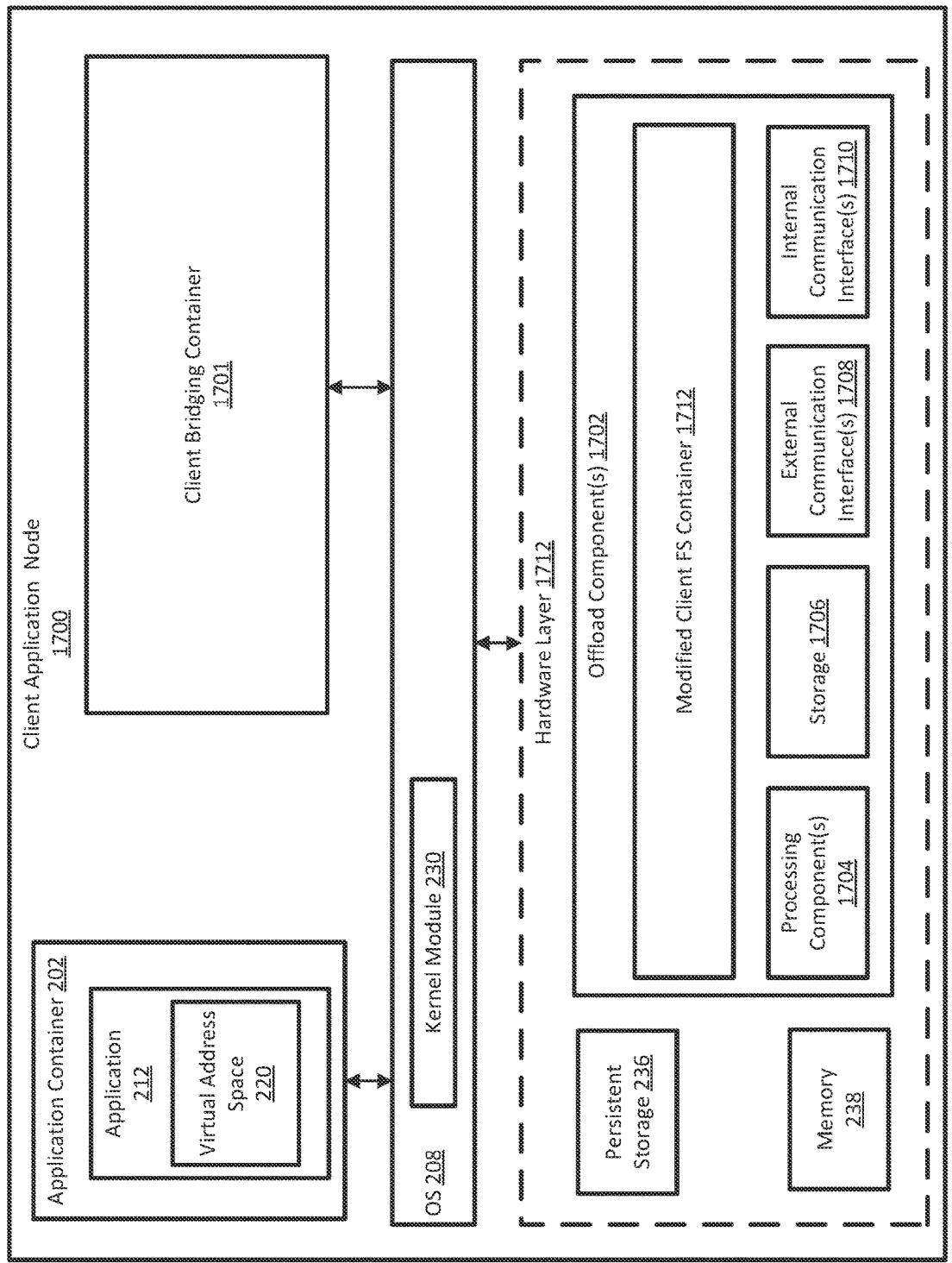
FIGS. 17A-17D show a modified client application node in accordance with one or more embodiments of the invention.
Figure 17B:
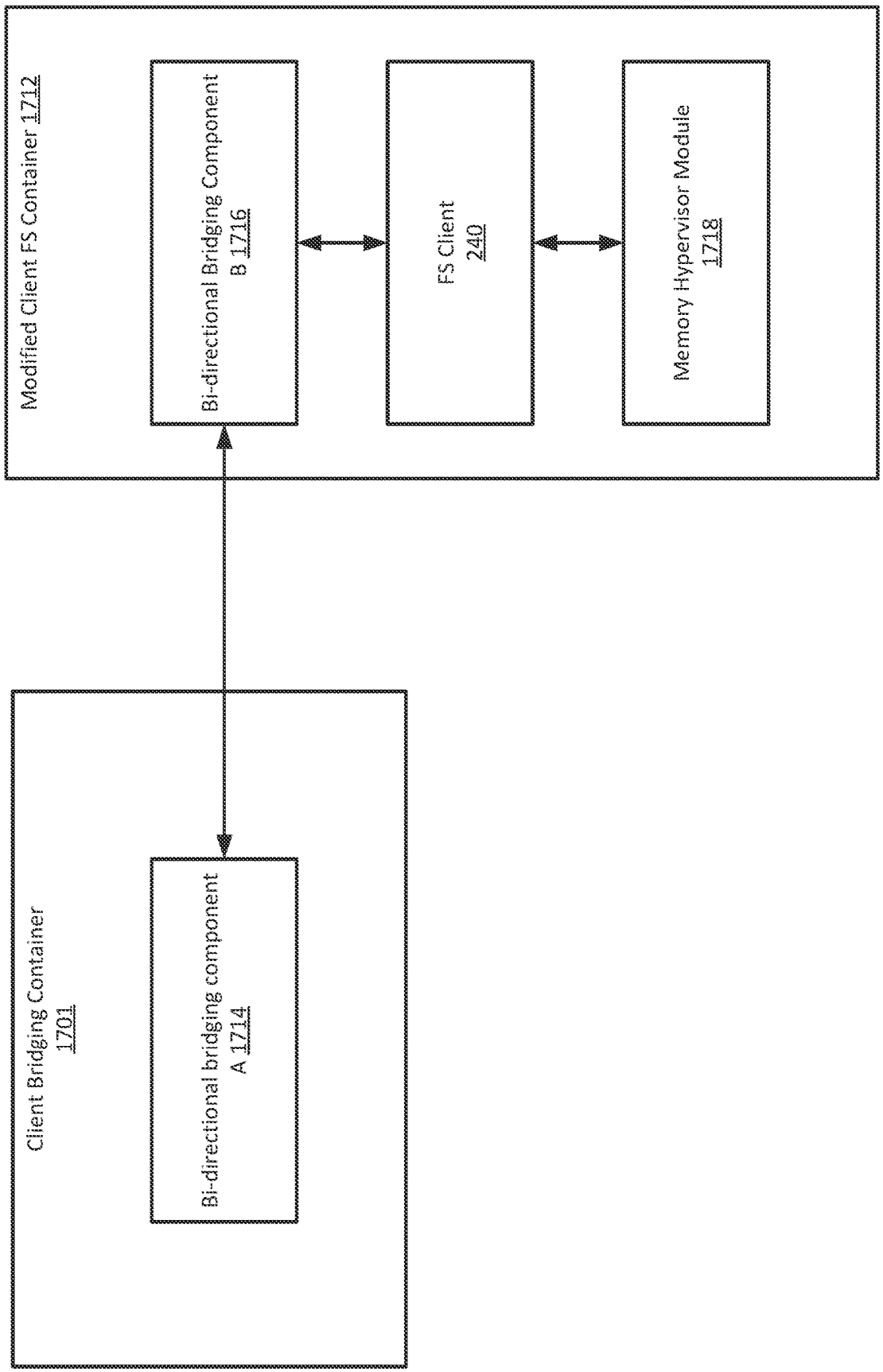
Figure 17C:
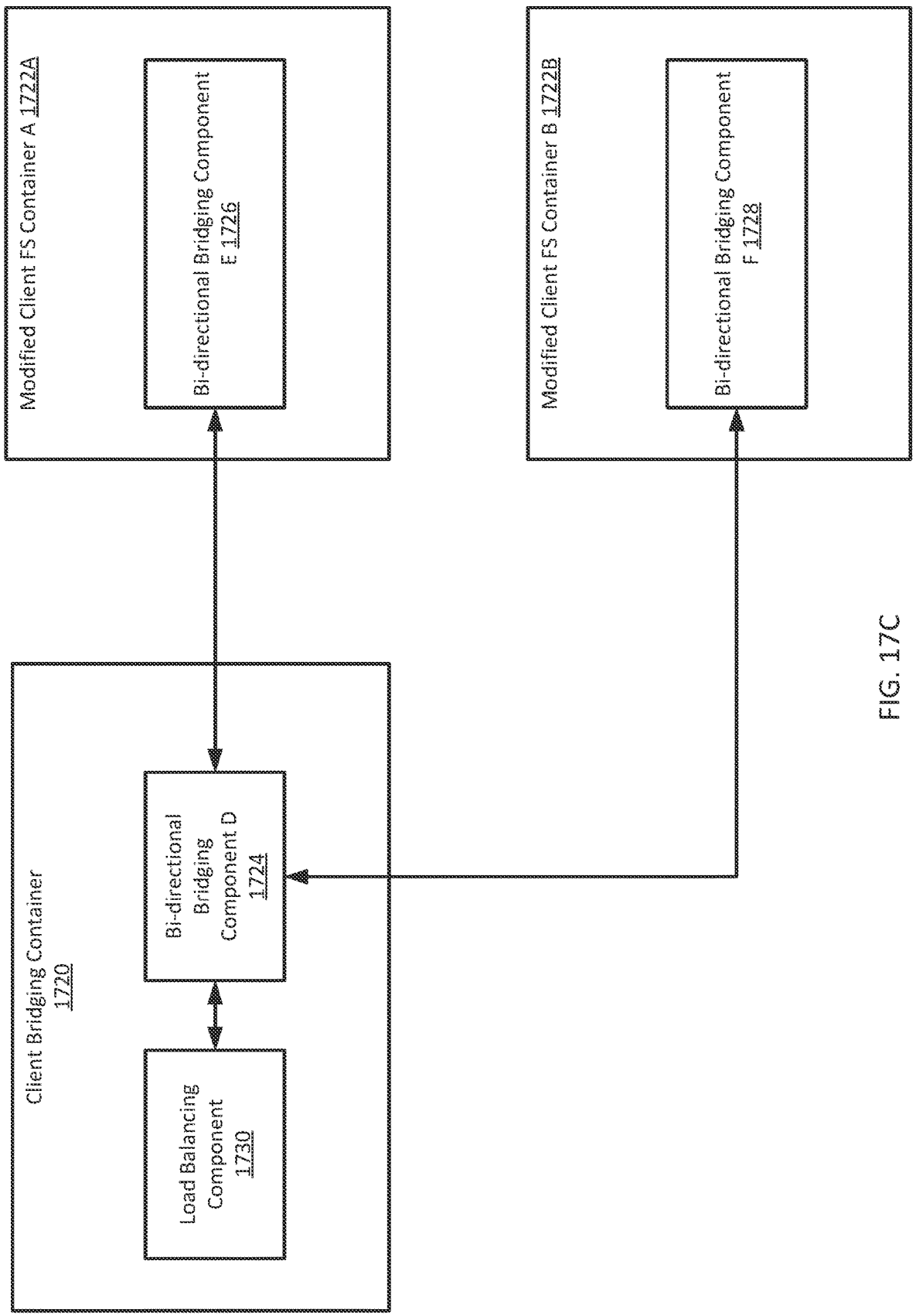

In one embodiment of the invention, the offload component may be referred to as a "SmartNic" or "Smart Network Adapter"; however, the invention is not limited to any particular implementation of a "SmartNic" or "Smart Network Adaptor"; rather, the offload component may correspond to any component that includes the functionality described with respect to the offload components in FIGS. 17A-17C.

In one embodiment of the invention, in order to utilize the offload components, the client application node may implement bridging containers (e.g., 1702) that enable the OS (e.g., 208) on the client application nodes (e.g., 1700) to transparently interact with the modified client FS containers. Said another way, from the perspective of the OS, the bridging container appears to be the same as the client FS container. In this manner, the OS (208) and the kernel module (230) do not need to be modified to interact with the bridging containers; rather, the kernel module interacts with the bridging containers in the same manner that it interacts with the client FS container. This modular approach may enable rapid deployment of the client application nodes and also enable the client application nodes to readily switch between using the client FS container and the modified client FS container(s).

In the following discussion, similarly named parts shown in FIGS. 17A-17C have all of the same properties and functionalities as described above in FIGS. 2A-2B. Accordingly, only additional properties and functionalities are described below.

Turning to FIGS. 17A, FIG. 17A shows a client application node implementing one or more offload components in accordance with one or more embodiments of the invention. In one embodiment of the invention, client application node (1700) includes one or more application container(s) (e.g., application container (202)), a client bridging container (1701), an operating system (OS) (208), and a hardware layer (1712). Each of these components is described below.

In one or more embodiments of the invention, the client application node (1700) (or one or more components therein) is configured to perform all, or a portion, of the functionality described in FIGS. 6-16.

In one or more embodiments of the invention, the application container (202) includes one or more applications (e.g., application (212)). In one or more embodiments of the invention, each application (212) includes a virtual address space (e.g., virtual address space (220)).

In one or more embodiments of the invention, the client bridging container (1701) is software executing on the client application node (200). The client bridging container (1702) may be an independent software instance that executes within a larger container management software instance (not shown) (e.g., Docker®, Kubernetes®, etc.). In embodiments in which the client bridging container (1701) is executing as an isolated software instance, the client bridging container (1701) may establish a semi-isolated virtual environment, inside the container, in which to execute an application (e.g., the bi-directional bridging component A (1714), described below). In one embodiment of the invention, the client bridging container (1702) may be executing in "user space" (e.g., a layer of the software that utilizes low-level system components for the execution of applications) of the OS (208). The client bridging container (1702) logically connects the application container (202) to the offload component(s) (1702). Additional detail about the operation of the client bridging container is provided in FIGS. 17B-17C.

In one or more embodiments of the invention, an OS (208) is software executing on the client application node (1700). In one embodiment of the invention, an OS (208) coordinates operations between software executing in "user space" (e.g., containers (202, 1701), applications (212)) and one or more components of the hardware layer (1712) to facilitate the proper use of those hardware layer (1712) components. In one or more embodiments of the invention, the OS (208) includes a kernel module (230). In one embodiment of the invention, the kernel module (230) is software executing in the OS (208) that monitors data (which may include read and write requests) traversing the OS (208) and may intercept, modify, and/or otherwise alter that data based on one or more conditions. In one embodiment of the invention, the kernel module (230) is capable of redirecting data received by the OS (208) by intercepting and modifying that data to specify a recipient different than normally specified by the OS (208).

In one or more embodiments of the invention, the hardware layer (1712) is a collection of physical components configured to perform the operations of the client application node (1700) and/or otherwise execute the software of the client application node (1700) (e.g., those of the containers (202, 1701), applications (e.g., 212), etc.).

In one embodiment of the invention, the hardware layer (1712) includes one or more communication interface(s) (not shown). In one embodiment of the invention, a communication interface is a hardware component that provides capabilities to interface the client application node (1700) with one or more devices (e.g., a client, another node in the CSI (104), etc.) and allow for the transmission and receipt of data (including metadata) with those device(s). The communication interface(s) may include the same functionality as described with respect to communication interface(s) (232) in FIG. 2A. Further, the communication interface(s) includes the necessary physical connections to permit components in the client application node to interact with the offload component(s) (1702). Additional detail about the interaction between the offload component(s) and the other components in the client application node (1700) are provided below.

In one embodiment of the invention, the hardware layer (1712) further includes one or more processor(s) (not shown) (which is the same or substantially the same functionality as the processors described in FIG. 2A), persistent storage (236), and memory (238).

In one embodiment of the invention, the hardware layer (1712) further includes one or more offload component(s) (1702). Each offload component (1702) includes processing component(s) (1704), processor(s) (not shown), storage (1706), one or more external communication interface(s) (1708), and one or more internal communication interface(s) (1710). Further, the offload component (1702) includes functionality to execute a modified client FS container (1712). Each of these components is described below.

In one embodiment of the invention, the one or more processor(s) (not shown). In one embodiment of the invention, a processor may be an integrated circuit(s) for processing instructions (e.g., those of the containers (1712) and applications executing with the containers (1712). In one embodiment of the invention, processor(s) may be one or more processor cores or processor micro-cores. Further, in one or more embodiments of the invention, one or more processor(s) may include a cache (not shown) (as described).

In addition to the aforementioned processors, in one embodiment of the invention, the processing component(s) (1704) is a group of electronic circuits with a single core or multiple cores that are configured to execute instructions to perform one or more advanced data services (described below). In one embodiment of the invention, the processing components (1704) may be implemented using a Complex Instruction Set (CISC) Architecture or a Reduced Instruction Set (RISC) Architecture. In one embodiment of the invention, the processing component may be (or include) a graphics processing unit (GPU) or data processing unit (DPU). In one embodiment of the invention, one or more of the processing components may be specialized processing components used, e.g., for encryption, compression, or any other function.

In one embodiment of the invention, the processor(s) (not shown) in the offload component (1702) is able to offload some or all of the processing related to the advanced data services to one or more processing components (1704) (see additional detail below).

In one embodiment of the invention, storage (1706) may include memory (e.g., memory similar to the memory described in 238 in FIG. 2A), persistent storage (e.g., persistent storage similar to the memory described in 236 in FIG. 2A), cache (not shown), any other volatile storage, any other non-volatile storage, or any combination thereof.

In one embodiment of the invention, one or more external communication interface(s) (1708) includes the same functionality as described above with respect to communications interface (232).

In one embodiment of the invention, one or more internal communication interface(s) (1710) corresponds to any combination of hardware that enables the offload component to communicate with the other components of the client application node. For example, the offload component may be implemented as a printed circuit board (PCB), where each of the aforementioned components are mounted on the PCB; further, in this implementation, the internal communication interface (1710) may include a Peripheral Connect Interface Express (PCIe) interconnect to allow the offload component to be "plugged-in" to a PCIe slot (not shown) in the hardware layer (1712) (e.g., as part of the communication interface(s) in the hardware layer).

In one embodiment of the invention, the modified client FS container (1712) is software executing on the offload component (1702). The modified client FS container (1712) may be an independent software instance that executes within a larger container management software instance (not shown) (e.g., Docker®, Kubernetes®, etc.). In embodiments in which the modified client FS container (1712) is executing as an isolated software instance, the modified client FS container (1712) may establish a semi-isolated virtual environment, inside the container, in which to execute one or more applications (e.g., bi-directional bridging component B (1716), FS client (240), and memory hypervisor (242), described below).

Referring to FIG. 17B, FIG. 17B focuses on the communication that occurs between the bi-directional bridging component (e.g., 1714A) in the client bridging container (1701) and the bi-directional bridging component (e.g., bi-directional bridging component B (1716)) in the modified FS container (1712). Other components of the client application node (1700) and other components of the modified FS container (1712) are omitted from FIG. 17B for clarity. As discussed above, the client bridging container acts a logical connection between the offload component (1702) and the OS (208). More specifically, from the perspective of the OS (208) (including the kernel module (230)), it is interacting with the modified FS container (1712) in the same manner that is was interacting with the client FS container (206). However, the OS (208) is in-fact interacting with the client bridging container (1701) (which again appears to the OS (208) like the client FS container (206)). Accordingly, the client bridging container (1701) receives the same requests that have been described with respect to the requests that client FS container (206) receives (as described in FIGS. 6-16). Instead of the client bridging container (1701) directly processing these requests (as the client FS container did in FIGS. 6-16), the bi-directional bridging component (e.g., 1714A) in the client bridging container (1701) transmits (or otherwise provides) the requests it receives from the OS (208) to the offload component (1702).

The bi-directional bridging component (e.g., 1714B) in the modified client FS container (1710) receives these requests and provides them to the FS client (240) executing therein. From the perspective of the FS client (240), the requests it receives from the bi-directional bridging component (e.g., 1714B) appear to be requests from the OS (208). Said another way, the client FS (240) interacts with the bi-directional bridging component (e.g., 1714B) in the same manner that it interacts with the OS (208). Further, the FS client (240) interacts with the memory hypervisor module (1718) in the same or substantially the same manner as it interacts with the memory hypervisor module (242) (described above) and interacts with the metadata nodes (e.g., 300) in the same or substantially the same manner as described above.

In one embodiment of the invention, the bi-directional bridging components (e.g., 1714A, 1714B) communicate using Remote Procedure Call (RPC) transactions on transport layers capable of Remote Direct Memory Access (RDMA). In this embodiment both the client application node (excluding the offload component) and the offload component itself each have the necessary hardware components and software components to implement RPC over RDMA to facilitate the passing of requests (and other information) between the bi-directional bridging components (e.g., 1714A, 1714B). Other communication protocols and/or mechanisms may be used to facilitate the passing of requests (and other information) between the bi-directional bridging components (e.g., 1714A, 1714B) without departing from the invention.

Continuing with the discussion of FIG. 17B, the memory hypervisor module (1718) performs the same or substantially the same functions as the memory hypervisor module (242) as described above. However, the memory hypervisor module (1718) issues the I/O requests it generates using the external communication interface(s) (1708) on the offload components. Further, when the processing of the aforementioned I/O request corresponds to processing a read request, the data that is obtained from the storage pool is temporarily stored in the storage (1706) of the offload component and then transferred (via the internal communication interface(s) (1710) (using any appropriate protocol) to the memory (238) of the client application node (1700). Once the data is transferred to the memory (238), the application (212) is provided with the necessary information from the OS (208) to enable the application (212) to directly read or otherwise manipulate the data in the memory (238). The OS (208) receives the aforementioned information via the aforementioned bi-directional bridging components. In another embodiment of the invention, the offload component (1702) and the client application node (1700) may have access to a shared memory (which is either in the memory (238) or the storage (1706)). In this scenario, the data from the storage pool may be directly copied to the shared memory and the application may interact with the data within the shared memory.

When the processing of the aforementioned I/O request corresponds to processing a write request, then the offload component may access the data that is to be written to the storage pool via shared memory (discussed above) or may obtain the copy of the data from the client application node and then locally store the data in the storage (1706) prior to the data being written to the storage pool.

If the processing of a read or write I/O request requires additional processing of the data (see e.g., FIGS. 8-16), then the data may be processed by the processing component(s) (1704) in the offload component (1702) and the result of the processing may be stored locally on the offload component or in shared memory (which may be located on either the offload component or the memory (238)).

As discussed above, both the OS (208) and the FS client (240), in FIGS. 17A-17B, interact with each other as-if they are implemented in the architecture shown in FIG. 2A. To enable these components to interact in this manner, the bi-directional bridging components (e.g., 1714A, 1714B) not only enable requests (and data and/or metadata) to flow from the OS to the FS client, the bi-directional bridging components (e.g., 1714A, 1714B) also permit the flow of requests (and data and/or metadata) from the FS client to the OS. For example, if the FS client receives a request to recall or invalidate a previously obtained data layout, then the modified FS container may remove the data layout from its cache and also, via the bi-directional bridging components (e.g., 1714A, 1714B) instruct the OS (208) to invalidate the appropriate portions of its cache so that the application (212) is no longer interacting with the data associated with the recalled or invalidated data layout.

FIG. 17B shows an embodiment in which there is a single offload component in the client application node. However, referring to FIG. 17C, the bi-directional bridging component (e.g., 1724) in the client bridging container (1720) may be connected to multiple offload components in the client application node (1700) via individual bi-directional bridging components (e.g., bi-directional bridging component E (e.g., 1726), bi-directional bridging component F (e.g., 1728)). Other components of the client application node (1700) and other components of the modified FS containers (1722A, 1722B) are omitted from FIG. 17C for clarity.

Continuing with the discussion of FIG. 17C, in this embodiment, the OS (208) continues to operate as-if it is interacting with a single client FS container (206); however, OS is in-fact interacting with a single client bridging container (1720) that is interacting with multiple modified client FS containers (e.g., modified client FS container A (1722A), modified client FS container (1722B)). Said another way, the processing of the requests issued by the OS is distributed across the multiple client FS containers (e.g., 1722A, 1722B). In scenarios in which there are multiple client FS containers, the client bridging container (1720) may be augmented to: (i) manage load balancing and/or routing of requests from the OS to the appropriate client FS container and (ii) track whether a given client FS container is operational (i.e., the offload component on which the client FS container is executing has not failed) and take steps to transition the processing of requests directed to a failed client FS container to an active client FS container.

With respect to managing the load balancing and/or routing of requests from the OS to the appropriate client FS container, a load balancing component (1730) that implements a hashing function (such as a consistent hashing function) that is based on the [file, offset] associated with the request from the OS. In this manner, all requests related to a particular [file, offset] are processed by the same offload component. As a result, all metadata (e.g., data layouts) that are obtained for a particular [file, offset] (e.g., as part of the performance of FIGS. 6-16) is only stored on the offload component associated with the [file, offset]. The hash function may be applied on inputs other than [file, offset] to distribute the requests between the offload components without departing from the invention.

Once the load balancing component (1730) determines to which offload component (i.e., the target offload component) to route the request, this information is provided to the bi-directional bridging component (e.g., bi-directional bridging component D, (1724)). The bi-directional bridging component (e.g., 1724) may track which [file, offset]s are managed by each of the offload components. This information may be updated as requests with new [file, offset]s are received by the client bridging container and when an offload component fails (discussed below).

Continuing with the discussion of FIG. 17C, the bi-directional bridging component (e.g., 1724), upon receipt of the information from the load balancing component may then determine whether the target offload component is active (i.e., has not failed) and if, the target offload component is active, forward the request to the target offload component.

The bi-directional bridging components (e.g., 1724, 1726, 1728) may collectively implement any polling and/or heartbeat based mechanism to enable the bi-directional bridging component on the client bridging container (e.g., 1724) to periodically determine whether a given offload component is available.

If the target component is not active, then the bi-directional bridging component (e.g., 1724) requests that the load balancing component identify a new target offload component. Once the new target offload component is identified, the bi-directional bridging component (e.g., 1724) uses the information that it has previously tracked about which [file, offset]s the failed target offload component was handling (hereafter referred to a state information) to instruct the new target offload component to obtain metadata corresponding to the state information from the metadata node. For example, the new target offload component may issue one or more requests to the metadata node to obtain data layouts for all [file, offset]s specified in the state information. Once the metadata has been received, the bi-directional bridging component (e.g., 1724) forwards the request from the OS to the new target component for processing. The state information is also used to update one or more data structures in the bi-directional bridging component (e.g., 1724) to reflect that the new target offload component is how managing requests related to the [file, offset]s in the state information. The bi-directional bridging component (e.g., 1724) may temporarily store and/or queue requests to the failed offload component while the aforementioned transition to the new target offload component is being performed.

In one embodiment of the invention, when new offload components are added to the client application node, the load balancing component (1730) is notified and subsequently takes the presence of the new offload components into account when determine where to route new requests (i.e., requests associated with [File, offset]s that have not previously been routed to another offload component).

Offload Components using Advanced Data Services

As discussed above, if the processing of a read or write I/O request requires additional processing of the data (see e.g., FIGS. 8-16), then the data may be processed by the processing component(s) (1704) in the offload component (1702) and the result of the processing may be stored locally on the offload component or in shared memory (which may be located on either the offload component or the memory (238)).

In one embodiment of the invention, the modified client FS container (1712) includes functionality to discover the advanced data services (if any) that are provided by the processing components (1704) (if any) that are present on the offload component (1702). The advanced data services provided by the processing component(s) may include, but is not limited to, encryption, decryption, calculation of CRC values, etc. A given processing component may include specialized hardware and/or firmware to provide one or more advanced data services. Further, some processing components may include functionality to provide multiple advanced data services, while other processing components are only able to provide a single advanced data service.

At the end of the discovery process, the modified client FS container (1712) includes an inventory of the processing components (if any) and the advanced data service(s) that each processing component provides.

At a later point in time the modified FS container may be configured such that read and/or write requests are required to be processed using one or more advanced data features (e.g., encryption, decryption, calculation of CRC values, calculation of fingerprints). For example, all write requests need to be processed in accordance with FIG. 13 (which requires deduplication and encryption). Once the advanced data features that are required are identified, the modified FS client container (1712), using the inventory, determines whether there are processing components on the offload component (1702) that can perform some or all of the required advanced data features.

If there are processing components that can perform some or all of the required advanced data features, these processing components are identified. The modified client FS container then determines an advanced data processing feature order and generates an advanced data services pipeline. The advanced data services pipeline specifies the order in which various advanced data features are performed by the corresponding processing components or the processors (not shown) in the hardware layer (1712) of the offload component.

If the processing components (1704) include functionality to meet all of the advance data feature requirements, then the advanced data services pipeline only includes processing by the processing components. However, if the processing components (1704) do not include functionality to meeting all of the advance data feature requirements, then the advanced data services pipeline includes a combination of processing components and the processor(s) on the offload component.

Example 1

The following is a non-limiting example of an advanced data services pipeline. Turning to the example, consider a scenario in which there are three processing components: (i) processing component A, which provides encryption services, (ii) processing component B, which provides fingerprint generation services (e.g., for deduplication), and (iii) processing component C, which provides CRC value generation. Further, assume in this scenario, that for all write requests a CRC value needs to be calculated, the data needs to be deduplicated, and the data needs to be encrypted. In this example, because the modified FS client container has discovered the three aforementioned processing components and that all three processing components are required, the following advanced data services pipeline may be generated: [processing component B]→[processing component C]→[processing component A]. Further, the advanced data services pipeline may also specify that processing by processing component B and processing component C may be performed in parallel prior to the processing by processing component A.

When a write request is received, the modified client FS container offloads the generation of the CRC value, the generation of the fingerprint, and the encryption of the data to the processing components based on the advanced data services pipeline. In this example, the results generated by the individual processing components are provided back to the modified client FS container (and/or made available to modified client FS container, e.g., via shared memory). The modified client FS container may then complete the processing of the write requests as described above. By offloading the generation of the CRC value, the generation of the fingerprint, and the encryption of the data, the processor on the offload component can utilize its processing cycles to perform other tasks.

End of Example 1

Example 2

The following is a second non-limiting example of an advanced data services pipeline. Turning to the example, consider a scenario in which there are two processing components: (i) processing component A, which provides fingerprint generation services, and (ii) processing component B, which provides CRC value generation. Further, assume that in this scenario, that for all write requests a CRC value needs to be calculated, the data needs to be deduplicated, and the data needs to be encrypted. In this example, because the modified FS client container has discovered the two aforementioned processing components and that all of the aforementioned processing components do not provide advanced data services to support off of the advanced data processing features that are required, the following advanced data services pipeline may be generated: [processing component A]→[processing component B→[processor on offload component]. Further, the advanced data services pipeline may also specify that processing by processing component A and processing component B may be performed in parallel prior to the processing by the processor of the offload component.

When a write request is received, the modified client FS container offloads the generation of the CRC value and the generation of the fingerprint to the processing components based on the advanced data services pipeline. In this example, the results generated by the individual processing components are provided back to the modified client FS container (and/or made available to modified client FS container, e.g., via shared memory). The modified client FS container may then complete the processing of the write requests as described above (including the encryption of the data). By offloading the generation of the CRC value and the generation of the fingerprint, the processor on the offload component can utilize its processing cycles to perform other tasks.

End of Example 2

GPU Support Using GPU Module

Figure 17D:
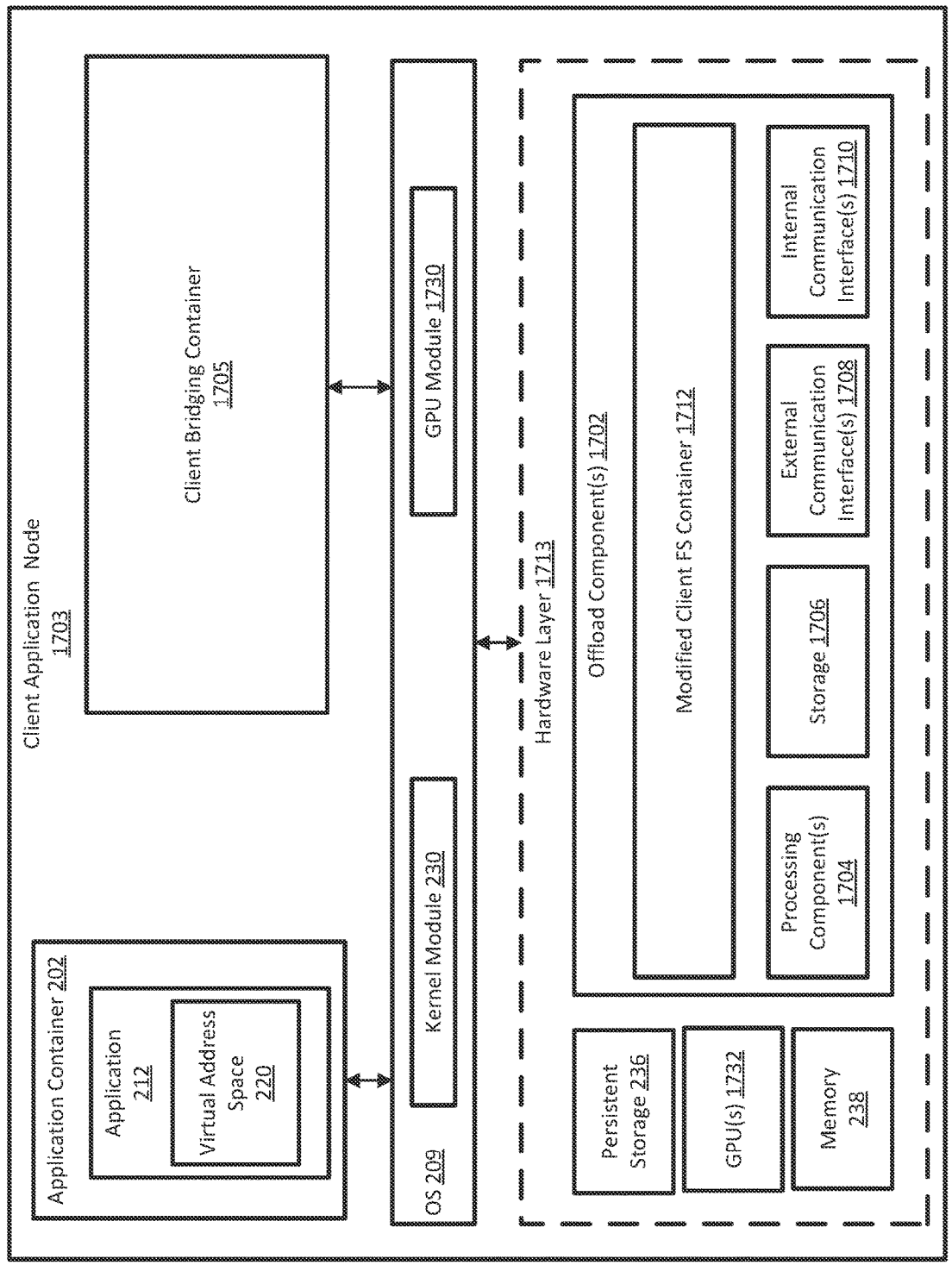

FIG. 17D shows a client application node implementing one or more offload components in accordance with one or more embodiments of the invention. In one embodiment of the invention, client application node (1703) includes one or more application container(s) (e.g., application container (202)), a client bridging container (1705), an operating system (OS) (209), and a hardware layer (1713). Each of these components is described below.

In one or more embodiments of the invention, the client application node (1703) (or one or more components therein) is configured to perform all, or a portion, of the functionality described in FIGS. 6-16.

In one or more embodiments of the invention, the application container (202) includes one or more applications (e.g., application (212)). In one or more embodiments of the invention, each application (212) includes a virtual address space (e.g., virtual address space (220)).

In one or more embodiments of the invention, the client bridging container (1705) is software executing on the client application node (1703). The client bridging container (1705) may be an independent software instance that executes within a larger container management software instance (not shown) (e.g., Docker®, Kubernetes®, etc.). In embodiments in which the client bridging container (1705) is executing as an isolated software instance, the client bridging container (1705) may establish a semi-isolated virtual environment, inside the container, in which to execute an application (e.g., the bi-directional bridging component A (1714), described below). In one embodiment of the invention, the client bridging container (1705) may be executing in "user space" (e.g., a layer of the software that utilizes low-level system components for the execution of applications) of the OS (209). The client bridging container (1705) logically connects the application container (202) to the offload component(s) (1702). Additional detail about the operation of the client bridging container is provided in FIGS. 17B-17C.

In one or more embodiments of the invention, an OS (209) is software executing on the client application node (1700). In one embodiment of the invention, an OS (208) coordinates operations between software executing in "user space" (e.g., containers (202, 1701), applications (212)) and one or more components of the hardware layer (1713) to facilitate the proper use of those hardware layer (1713) components. In one or more embodiments of the invention, the OS (209) includes a kernel module (230) and a GPU module (1730). In one embodiment of the invention, the kernel module (230) is software executing in the OS (209) that monitors data (which may include read and write requests) traversing the OS (209) and may intercept, modify, and/or otherwise alter that data based on one or more conditions. In one embodiment of the invention, the kernel module (230) is capable of redirecting data received by the OS (209) by intercepting and modifying that data to specify a recipient different than normally specified by the OS (209).

In one embodiment of the invention, the GPU module (1730) is software executing in the OS (209) that manages the mappings between the virtual address space and physical addresses in the GPU memory (not shown) that the GPU(s) (1732) is using. Said another way, the application executing in the application container may be GPU-aware and, as such, store data directly within the GPU memory. The application may interact with the GPU memory using virtual addresses. The GPU module (1730) maintains a mapping between the virtual addresses used by the application and the corresponding physical address of the data located in the GPU memory. In one embodiment of the invention, prior to the application using the GPU memory, the GPU module may register all or a portion of the GPU memory with the RDMA engine (which implements RDMA) within the external communication interface(s) (1708). This registration allows the data stored within the registered portion of the GPU memory to be directly accessed by the RDMA engine and transferred to the storage nodes (see e.g., FIG. 2A). Because the GPU manages the memory allocated to the GPU, the modified client FS module needs to be able to interact with the GPU module in order for the memory hypervisor module to issue write requests to the storage nodes. In particular, while the memory hypervisor module obtains information related to the physical location(s) in the storage node(s) on which to write the data it needs the physical address(es) of data in the memory so that it can issue the appropriate write requests to store this data in the storage node(s). Without the physical addresses of the source data within the GPU memory, the memory hypervisor module does not have sufficient information to locate the data in the memory that is the subject of the write request.

Continuing with the discussion of FIG. 17D, in one or more embodiments of the invention, the hardware layer (1713) is a collection of physical components configured to perform the operations of the client application node (1700) and/or otherwise execute the software of the client application node (1700) (e.g., those of the containers (202, 1701), applications (e.g., 212), etc.).

In one embodiment of the invention, the hardware layer (1713) includes one or more communication interface(s) (not shown). In one embodiment of the invention, a communication interface is a hardware component that provides capabilities to interface the client application node (1700) with one or more devices (e.g., a client, another node in the CSI (104), etc.) and allow for the transmission and receipt of data (including metadata) with those device(s). The communication interface(s) may include the same functionality as described with respect to communication interface(s) (232) in FIG. 2A. Further, the communication interface(s) includes the necessary physical connections to permit components in the client application node to interact with the offload component(s) (1702). Additional detail about the interaction between the offload component(s) and the other components in the client application node (1700) are provided below.

In one embodiment of the invention, the hardware layer (1713) further includes one or more processor(s) (not shown) (which is the same or substantially the same functionality as the processors described in FIG. 2A), persistent storage (236), one or more GPU(s) (1732), and memory (238).

In one embodiment of the invention, the GPUs (1732) are a type of processors that includes a significantly larger number of cores than the processors discussed above. The GPUs (126) may utilize the cores to perform a large number of processes in parallel. The processes performed by the GPUs may include basic arithmetic operations. The GPUs may perform additional types of processes without departing from the invention.

In one or more embodiments of the invention, the GPUs include computing resources that allow the GPUs to perform the functions described throughout this application. The computing resources may include cache, GPU memory (e.g., dynamic random access memory (DRAM)), and the cores discussed above. The cores may be capable of processing one or more threads at a time and temporarily storing data in the cache and/or local memory during the processing. A thread is a process performed on data by a core of the GPUs.

In one embodiment of the invention, the hardware layer (1713) further includes one or more offload component(s) (1702). Each offload component (1712) includes processing component(s) (1704), storage (1706), one or more external communication interface(s) (1708), and one or more internal communication interface(s) (1710). Further, the offload component (1702) includes functionality to execute a modified client FS container (1712). Each of these components is described below.

In one embodiment of the invention, the processing component(s) (1704) is a group of electronic circuits with a single core or multiple cores that are configured to execute instructions. In one embodiment of the invention, the processing components (1704) may be implemented using a Complex Instruction Set (CISC) Architecture or a Reduced Instruction Set (RISC) Architecture. In one embodiment of the invention, the processing component may be (or include) a graphics processing unit (GPU) or data processing unit (DPU). In one embodiment of the invention, one or more of the processing components may be specialized processing components used, e.g., for encryption, compression, or any other function.

In one embodiment of the invention, storage (1706) may include memory (e.g., memory similar to the memory described in 238 in FIG. 2A), persistent storage (e.g., persistent storage similar to the memory described in 236 in FIG. 2A), cache (not shown), any other volatile storage, any other non-volatile storage, or any combination thereof.

In one embodiment of the invention, one or more external communication interface(s) (1708) includes the same functionality as described above with respect to communications interface (232).

In one embodiment of the invention, one or more internal communication interface(s) (1710) corresponds to any combination of hardware that enables the offload component to communicate with the other components of the client application node. For example, the offload component may be implemented as a printed circuit board (PCB), where each of the aforementioned components are mounted on the PCB; further, in this implementation, the internal communication interface (1710) may include a Peripheral Connect Interface Express (PCIe) interconnect to allow the offload component to be "plugged-in" to a PCIe slot (not shown) in the hardware layer (1713) (e.g., as part of the communication interface(s) in the hardware layer).

In one embodiment of the invention, the modified client FS container (1712) is software executing on the offload component (1702). The modified client FS container (1712) may be an independent software instance that executes within a larger container management software instance (not shown) (e.g., Docker®, Kubernetes®, etc.). In embodiments in which the modified client FS container (1712) is executing as an isolated software instance, the modified client FS container (1712) may establish a semi-isolated virtual environment, inside the container, in which to execute one or more applications (e.g., bi-directional bridging component B (1716), FS client (240), and memory hypervisor (242), described above).

In one or more embodiments of the invention, the application container (202) may utilize the processing of a GPU (1732). In such scenarios, the data that is to be processed by the GPU is copied (or otherwise stored) in the portion of the GPU memory. The GPU module then tracks the mappings between the virtual address associated with the data and the physical location of the data in the portion of the GPU memory.

In scenarios in which the data is associated with a write request, the modified FS container (1712) includes functionality to issue a call to the GPU module to obtain the physical location of the data that is the subject of the write request. The following is a non-limiting example of a sequence to issue such a call to the GPU module.

Turning to the example, initially the application issues a write request, where the write request specifies a virtual address (which corresponds to a physical location in the GPU memory) along with a [file, offset]. In this example, the virtual address corresponds to the location within the GPU memory in which the source data is currently stored and the [file, offset] represents a location within the storage nodes in which the source data will be stored. As discussed above, the [file, offset] is ultimately translated to one or more physical locations in the storage pool. The virtual address and the [file, offset] are provided to the client bridging container (1705), which ultimately transmits this request to the offload component (1702). At some point after the application (212) issues the write request and prior to the offload component (1702) receiving the write request, the write request is analyzed to determine whether the data that is the subject of the write request is in a portion of GPU memory. If the data that is the subject of the write request is located in a portion of GPU memory, then the write request is tagged (or otherwise augmented) to reflect that the data that is the subject of the write request in GPU memory. The analysis to determine whether to tag or otherwise augment the write request may be performed by a library located in the application container (202). However, other components in FIG. 17D may perform the aforementioned tag and/or augmentation without departing from the invention.

Once the offload component (1713) receives the augmented write request, the processing of the augmented write request follows the same (or substantially the same) path as described above in, e.g., FIGS. 7, 9, 11, and 13, until the memory hypervisor module needs to issue the write request. At this stage, the memory hypervisor knows the target of the write request (which was derived from [file, offset]) but only knows the virtual address of the source data for the write request (i.e., the data that is currently located in the GPU memory). Thus, when the memory hypervisor module receives an augmented write request (or information that indicates that it triggered the write request for which it is ultimately issuing one or more I/O requests is an augmented write request), it issues a callback request to the client bridging container. The callback request includes the virtual address of the data that is the subject of the write request.

In response to receiving the callback request, the client bridging component issues a mapping call to the GPU module, where the mapping call includes the virtual address. In response to receiving the mapping call, the GPU module provides a mapping response, which includes the physical address(es) of the memory that is storing the data corresponding to the virtual address.

The client bridging container receives the mapping response and then generates a callback response, which includes the physical address(es) specified in the mapping response. The callback response is then transmitted to the modified client FS client (1712) (or more specifically to the memory hypervisor module (1718)). At this stage, the memory hypervisor module has information about the source data for the write request (i.e., the physical address in GPU memory in which the source data resides) and the target of the write request (which was derived using the data layout and [SOV, offset] (see e.g., FIG. 7, step 706). Using this information, the memory hypervisor module may issue one or more I/O requests result in data being transmit directly transmitted from the memory allocated to the GPU to the appropriate storage nodes.

Thus, embodiments of the invention enable the use of an offload component in conjunction with a GPU that is external to the offload component, where the GPU is managed by a GPU module. The embodiments utilize a callback mechanism that enables the client bridging container (1705) to proxy a call that originated at the modified client FS container (1712) to the GPU module (1730), receives a response from the GPU module, and then ultimately provides that response to the memory hypervisor module to enable it to issue the write request.

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:

1. A method for storing data, the method comprising:
receiving, by an offload component in a client application node, an augmented write request originating from an application executing in an application container on the client application node, wherein the augmented write request is associated with data and wherein the offload component is located in a hardware layer of the client application node; and
processing, by the offload component, the augmented write request by a file system (FS) client and a memory hypervisor module executing in a modified client FS container on the offload component, wherein processing the augment write request results in at least a portion of the data being written to a location in a storage pool,
wherein the data is stored at a physical address in a graphics processing unit (GPU) memory in a GPU on the client application node that is managed by a GPU module executing on the client application node,
wherein processing the augmented write request triggers the offload component to issue a callback request to obtain the physical address, wherein the physical address is used to process the augmented write request.

2. The method of claim wherein the GPU module executes in an operating system of the client application node.

3. The method of claim 1, wherein the application issues a write request specifying a virtual address corresponding to the data and wherein the client application node modifies the write request to generate the augmented write request, wherein the augmented write request specifies the virtual address, and wherein the application interacts with the data in the GPU memory using the virtual address.

4. The method of claim 1, wherein the data is associated with a virtual address and the physical address, wherein the augmented write request specifies the virtual address, wherein the callback request specifies the virtual address, wherein the GPU module maintains a mapping between the virtual address and the physical address.

5. The method of claim 4, wherein the GPU module establishes the mapping prior to the application utilizing the virtual address.

6. The method of claim 1, wherein a client bridging container in the client application node:
receives the callback request;
generates a mapping request on the callback request;
issues the mapping request to the GPU module;
receives a mapping response from the GPU module, which specifies the physical address; and
transmits a callback response to the offload component, which specifies the physical address.

7. A non-transitory computer readable medium comprising instructions which, when executed by a processor, enables the processor to perform a method for storing data, the method comprising:
receiving, by an offload component in a client application node, an augmented write request originating from an application executing in an application container on the client application node, wherein the augmented write request is associated with data and wherein the offload component is located in a hardware layer of the client application node; and
processing, by the offload component, the augmented write request by a file system (FS) client and a memory hypervisor module executing in a modified client FS container on the offload component, wherein processing the augment write request results in at least a portion of the data being written to a location in a storage pools,
wherein the data is stored at a physical address in a graphics processing unit (GPU) memory in a GPU on the client application node that is managed by a GPU module executing on the client application node,
wherein processing the augmented write request triggers the offload component to issue a callback request to obtain the physical address, wherein the physical address is used to process the augmented write request.

8. The non-transitory computer readable medium of claim 7, wherein the GPU module executes in an operating system of the client application node.

9. The non-transitory computer readable medium of claim 7, wherein the application issues a write request specifying a virtual address corresponding to the data and wherein the client application node modifies the write request to generate the augmented write request, wherein the augmented write request specifies the virtual address, and wherein the application interacts with the data in the GPU memory using the virtual address.

10. The non-transitory computer readable medium of claim 7, wherein the data is associated with a virtual address and the physical address, wherein the augmented write request specifies the virtual address, wherein the callback request specifies the virtual address, wherein the GPU module maintains a mapping between the virtual address and the physical address.

11. The non-transitory computer readable medium of claim 10, wherein the GPU module establishes the mapping prior to the application utilizing the virtual address.

12. The non-transitory computer readable medium of claim 7,
wherein a client bridging container in the client application node:
receives the callback request;
generates a mapping request on the callback request;
issues the mapping request to the GPU module;
receives a mapping response from the GPU module, which specifies the physical address; and
transmits a callback response to the offload component, which specifies the physical address.

13. The non-transitory computer readable medium of claim 7 wherein the memory is external to the offload component.

14. A node, comprising:
a hardware processor;
application container executing on the hardware processor;
an offload component comprising a processor, wherein the offload component is configured to:
receive an augmented write request originating from an application executing in an application container on the node, wherein the augmented write request is associated with data and wherein the offload component is located in a hardware layer of node; and
process the augmented write request by a file system (FS) client and a memory hypervisor module executing in a modified client FS container on the offload component, wherein processing the augment write request results in at least a portion of the data being written to a location in a storage pool,
wherein the data is stored at a physical address in a graphics processing unit (GPU) memory in a GPU on the node that is managed by a GPU module executing on the node,
wherein processing the augmented write request triggers the offload component to issue a callback request to obtain the physical address, wherein the physical address is used to process the augmented write request.

15. The node of claim 14, wherein the GPU module executes in an operating system of the node.

16. The node of claim 14, wherein the application issues a write request specifying a virtual address corresponding to the data and wherein the node modifies the write request to generate the augmented write request, wherein the augmented write request specifies the virtual address, and wherein the application interacts with the data in the GPU memory using the virtual address.

17. The node of claim 14, wherein the data is associated with a virtual address and the physical address, wherein the augmented write request specifies the virtual address, wherein the callback request specifies the virtual address, wherein the GPU module maintains a mapping between the virtual address and the physical address and wherein the GPU module establishes the mapping prior to the application utilizing the virtual address.

18. The node of claim 14, wherein a client bridging container in the node:
receives the callback request;
generates a mapping request on the callback request;
issues the mapping request to the GPU module;
receives a mapping response from the GPU module, which specifies the physical address; and
transmits a callback.

* * * * *